United States Patent
Cooke et al.

(10) Patent No.: US 10,564,378 B2
(45) Date of Patent: *Feb. 18, 2020

(54) HIGH DENSITY AND BANDWIDTH FIBER OPTIC APPARATUSES AND RELATED EQUIPMENT AND METHODS

(71) Applicant: Corning Optical Communications LLC, Hickory, NC (US)

(72) Inventors: Terry Lee Cooke, Hickory, NC (US); David Lee Dean, Jr., Hickory, NC (US); Harley Joseph Staber, Coppell, TX (US); Kevin Lee Strause, Keller, TX (US); Alan William Ugolini, Hickory, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/886,342

(22) Filed: Feb. 1, 2018

(65) Prior Publication Data

US 2018/0156998 A1 Jun. 7, 2018

Related U.S. Application Data

(60) Continuation of application No. 14/660,074, filed on Mar. 17, 2015, now Pat. No. 9,910,236, which is a
(Continued)

(51) Int. Cl.
*G02B 6/44* (2006.01)
(52) U.S. Cl.
CPC .......... *G02B 6/4452* (2013.01); *G02B 6/4453* (2013.01)
(58) Field of Classification Search
None
See application file for complete search history.

(56) References Cited

U.S. PATENT DOCUMENTS

| 620,013 A | 2/1899 | Barnes |
| 864,761 A | 8/1907 | Erickson |

(Continued)

FOREIGN PATENT DOCUMENTS

| AU | 2010270959 A1 | 2/2012 |
| CA | 2029592 A1 | 5/1992 |

(Continued)

OTHER PUBLICATIONS

Extended European Search Report for European Patent Application No. 16173431.4, dated Feb. 22, 2017, 12 pages.
(Continued)

*Primary Examiner* — Michael Stahl
(74) *Attorney, Agent, or Firm* — Withrow & Terranova, P.L.L.C.

(57) ABSTRACT

High-connection density and bandwidth fiber optic apparatuses and related equipment and methods are disclosed. In certain embodiments, fiber optic apparatuses are provided and comprise a chassis defining one or more U space fiber optic equipment units. At least one of the one or more U space fiber optic equipment units may be configured to support particular fiber optic connection densities and bandwidths in a given 1-U space. The fiber optic connection densities and bandwidths may be supported by one or more fiber optic components, including but not limited to fiber optic adapters and fiber optic connectors, including but not limited to simplex, duplex, and other multi-fiber fiber optic components. The fiber optic components may also be disposed in fiber optic modules, fiber optic patch panels, or other types of fiber optic equipment.

27 Claims, 25 Drawing Sheets

Related U.S. Application Data division of application No. 13/746,938, filed on Jan. 22, 2013, now Pat. No. 9,020,320, which is a continuation of application No. 12/819,081, filed on Jun. 18, 2010, now abandoned, and a continuation-in-part of application No. 12/323,415, filed on Nov. 25, 2008, now Pat. No. 8,452,148.

(60) Provisional application No. 61/218,880, filed on Jun. 19, 2009, provisional application No. 61/197,068, filed on Oct. 23, 2008, provisional application No. 61/190,538, filed on Aug. 29, 2008.

(56) References Cited

U.S. PATENT DOCUMENTS

| | | |
|---|---|---|
| 2,528,910 A | 11/1950 | Poe |
| 2,614,685 A | 10/1952 | Miller |
| 3,057,525 A | 10/1962 | Malachick |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,646,244 A | 2/1972 | Cole |
| 3,664,514 A | 5/1972 | Drake |
| 3,683,238 A | 8/1972 | Olds et al. |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,266,853 A | 5/1981 | Hutchins et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,634,214 A | 1/1987 | Cannon, Jr. et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,889,403 A | 12/1989 | Zucker et al. |
| 4,898,448 A | 2/1990 | Cooper |
| 4,900,123 A | 2/1990 | Barlow |
| 4,911,662 A | 3/1990 | Debortoli et al. |
| 4,913,514 A | 4/1990 | Then |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,011,257 A | 4/1991 | Wettengel et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,129,842 A | 7/1992 | Morgan et al. |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |

(56) References Cited

U.S. PATENT DOCUMENTS

| | | |
|---|---|---|
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| 5,408,570 A | 4/1995 | Cook et al. |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,421,532 A | 6/1995 | Richter |
| 5,438,641 A | 8/1995 | Malacame |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,495,549 A | 2/1996 | Schneider et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,530,786 A | 6/1996 | Radliff et al. |
| 5,535,970 A | 7/1996 | Gobbi |
| 5,538,213 A | 7/1996 | Brown |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |
| 5,553,186 A | 9/1996 | Allen |
| 5,563,971 A | 10/1996 | Abendschein |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,596,670 A | 1/1997 | Debortoli et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,910 A | 9/1997 | Arnett |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,692,079 A | 11/1997 | Iso |
| 5,694,511 A | 12/1997 | Pimpinella et al. |
| 5,701,380 A | 12/1997 | Larson et al. |
| 5,704,573 A | 1/1998 | de Beers et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,734,779 A | 3/1998 | Okino |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,754,724 A | 5/1998 | Peterson et al. |
| 5,758,003 A | 5/1998 | Wheeler et al. |
| 5,758,004 A | 5/1998 | Alarcon et al. |
| 5,761,026 A | 6/1998 | Robinson et al. |
| 5,765,698 A | 6/1998 | Bullivant |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,788,087 A | 8/1998 | Orlando |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,806,687 A | 9/1998 | Ballesteros et al. |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,906,342 A | 5/1999 | Kraus |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,940,563 A | 8/1999 | Kobayashi et al. |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,956,449 A | 9/1999 | Otani et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,984,531 A | 11/1999 | Lu |
| 5,987,203 A | 11/1999 | Abel et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |

(56) References Cited

U.S. PATENT DOCUMENTS

| | | |
|---|---|---|
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,027,352 A | 2/2000 | Byrne |
| 6,041,042 A | 3/2000 | Bussiere |
| 6,044,193 A | 3/2000 | Szentesi et al. |
| 6,044,194 A | 3/2000 | Meyerhoefer |
| 6,049,963 A | 4/2000 | Boe |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,088,497 A | 7/2000 | Phillips et al. |
| 6,118,075 A | 9/2000 | Baker et al. |
| 6,118,868 A | 9/2000 | Daoud |
| 6,127,627 A | 10/2000 | Daoud |
| 6,130,983 A | 10/2000 | Cheng |
| 6,134,370 A | 10/2000 | Childers et al. |
| 6,141,222 A | 10/2000 | Toor et al. |
| 6,142,676 A | 11/2000 | Lu |
| 6,149,313 A | 11/2000 | Giebel et al. |
| 6,149,315 A | 11/2000 | Stephenson |
| 6,151,432 A | 11/2000 | Nakajima et al. |
| 6,157,766 A | 12/2000 | Laniepce et al. |
| 6,160,946 A | 12/2000 | Thompson et al. |
| 6,170,784 B1 | 1/2001 | MacDonald et al. |
| 6,172,782 B1 | 1/2001 | Kobayashi |
| 6,175,079 B1 | 1/2001 | Johnston et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,200,170 B1 | 3/2001 | Amberg et al. |
| 6,201,919 B1 | 3/2001 | Puetz et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,216,987 B1 | 4/2001 | Fukuo |
| 6,227,717 B1 | 5/2001 | Ott et al. |
| 6,229,948 B1 | 5/2001 | Blee et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 | 6/2001 | Curry et al. |
| 6,247,851 B1 | 6/2001 | Ichihara |
| 6,250,816 B1 | 6/2001 | Johnston et al. |
| 6,256,210 B1 | 7/2001 | Strijker et al. |
| 6,259,850 B1 | 7/2001 | Crosby, Jr. et al. |
| 6,259,856 B1 * | 7/2001 | Shahid .................. G02B 6/3879 385/147 |
| 6,263,141 B1 | 7/2001 | Smith |
| 6,265,680 B1 | 7/2001 | Robertson |
| 6,269,212 B1 | 7/2001 | Schiattone |
| 6,273,532 B1 | 8/2001 | Chen et al. |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,289,618 B1 | 9/2001 | Kump et al. |
| 6,292,614 B1 | 9/2001 | Smith et al. |
| 6,301,424 B1 | 10/2001 | Hwang |
| 6,305,848 B1 | 10/2001 | Gregory |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,324,575 B1 | 11/2001 | Jain et al. |
| 6,325,549 B1 | 12/2001 | Shevchuk |
| 6,327,059 B1 | 12/2001 | Bhalla et al. |
| RE37,489 E | 1/2002 | Anton et al. |
| 6,343,313 B1 | 1/2002 | Salesky et al. |
| 6,344,615 B1 | 2/2002 | Nolf et al. |
| 6,347,888 B1 | 2/2002 | Puetz |
| 6,351,587 B1 | 2/2002 | Holland |
| 6,353,696 B1 | 3/2002 | Gordon et al. |
| 6,353,697 B1 | 3/2002 | Daoud |
| 6,357,712 B1 | 3/2002 | Lu |
| 6,359,228 B1 | 3/2002 | Strause et al. |
| 6,362,422 B1 | 3/2002 | Vavrik et al. |
| 6,363,198 B1 | 3/2002 | Braga et al. |
| 6,363,200 B1 | 3/2002 | Thompson et al. |
| 6,370,309 B1 | 4/2002 | Daoud |
| 6,371,419 B1 | 4/2002 | Ohnuki |
| 6,375,129 B2 | 4/2002 | Koziol |
| 6,377,218 B1 | 4/2002 | Nelson et al. |
| 6,379,052 B1 | 4/2002 | De Jong et al. |
| 6,381,642 B1 | 4/2002 | O'Donnell et al. |
| 6,385,374 B2 | 5/2002 | Kropp |
| 6,385,381 B1 | 5/2002 | Janus et al. |
| 6,389,214 B1 | 5/2002 | Smith et al. |
| 6,392,140 B1 | 5/2002 | Yee et al. |
| 6,397,166 B1 | 5/2002 | Leung et al. |
| 6,398,149 B1 | 6/2002 | Hines et al. |
| 6,406,314 B1 | 6/2002 | Byrne |
| 6,410,850 B1 | 6/2002 | Abel et al. |
| 6,411,767 B1 | 6/2002 | Burrous et al. |
| 6,412,986 B1 | 7/2002 | Ngo et al. |
| 6,418,262 B1 | 7/2002 | Puetz et al. |
| 6,419,519 B1 | 7/2002 | Young |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,494,550 B1 | 12/2002 | Chen et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,544,075 B1 | 4/2003 | Liao |
| 6,545,611 B2 | 4/2003 | Hayashi et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,568,542 B1 | 5/2003 | Chen |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,585,423 B1 | 7/2003 | Vergeest |
| 6,587,630 B2 | 7/2003 | Spence et al. |
| 6,588,938 B1 | 7/2003 | Lampert et al. |
| 6,591,051 B2 | 7/2003 | Solheid et al. |
| 6,591,053 B2 | 7/2003 | Fritz |
| 6,592,266 B1 | 7/2003 | Hankins et al. |
| 6,597,670 B1 | 7/2003 | Tweedy et al. |
| 6,600,106 B2 | 7/2003 | Standish et al. |
| 6,600,866 B2 | 7/2003 | Gatica et al. |
| 6,601,997 B2 | 8/2003 | Ngo |

(56) References Cited

U.S. PATENT DOCUMENTS

| | | |
|---|---|---|
| 6,612,515 B1 | 9/2003 | Tinucci et al. |
| 6,612,874 B1 | 9/2003 | Stout et al. |
| 6,614,978 B1 | 9/2003 | Caveney |
| 6,614,980 B1 | 9/2003 | Mahony |
| 6,621,975 B2 | 9/2003 | Laporte et al. |
| 6,622,873 B2 | 9/2003 | Hegrenes et al. |
| 6,624,389 B1 | 9/2003 | Cox |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,669,149 B2 | 12/2003 | Akizuki |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,693,552 B1 | 2/2004 | Herzig et al. |
| 6,695,620 B1 | 2/2004 | Huang |
| 6,700,654 B2 | 3/2004 | Gerrish et al. |
| 6,701,056 B2 | 3/2004 | Burek et al. |
| 6,710,366 B1 | 3/2004 | Lee et al. |
| 6,715,619 B2 | 4/2004 | Kim et al. |
| 6,719,149 B2 | 4/2004 | Tomino |
| 6,721,482 B1 | 4/2004 | Glynn |
| 6,728,462 B2 | 4/2004 | Wu et al. |
| 6,736,670 B2 | 5/2004 | Clark et al. |
| 6,741,784 B1 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,761,585 B2 | 7/2004 | Clark et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,792,191 B1 | 9/2004 | Clapp, Jr. et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 | 11/2004 | Douglas et al. |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B2 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B2 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,856,505 B1 | 2/2005 | Venegas et al. |
| 6,863,444 B2 | 3/2005 | Anderson et al. |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,916,199 B2 | 7/2005 | Follingstad |
| 6,918,786 B2 | 7/2005 | Barker et al. |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,971,909 B2 | 12/2005 | Levesque et al. |
| 6,974,348 B2 | 12/2005 | Bentley |
| 6,980,725 B1 | 12/2005 | Swieconek |
| 6,981,893 B2 | 1/2006 | Barker et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,059,887 B1 | 6/2006 | Liu |
| 7,066,748 B2 | 6/2006 | Bricaud et al. |
| 7,066,771 B2 | 6/2006 | Clark et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,121 B1 | 1/2007 | Skarica et al. |
| 7,179,119 B2 | 2/2007 | Follingstad |

(56) References Cited

U.S. PATENT DOCUMENTS

| | | |
|---|---|---|
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,207,835 B2 | 4/2007 | Levesque et al. |
| 7,217,040 B2 | 5/2007 | Crews et al. |
| 7,218,526 B2 | 5/2007 | Mayer |
| 7,220,065 B2 | 5/2007 | Han et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,241,182 B2 | 7/2007 | Clark et al. |
| 7,244,144 B2 | 7/2007 | Follingstad |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| D565,205 S | 3/2008 | Lo et al. |
| 7,340,145 B2 | 3/2008 | Allen |
| 7,349,615 B2 | 3/2008 | Frazier et al. |
| 7,352,946 B2 | 4/2008 | Heller et al. |
| 7,352,947 B2 | 4/2008 | Phung et al. |
| 7,357,667 B2 | 4/2008 | Clark et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,376,325 B1 | 5/2008 | Cloud et al. |
| 7,391,952 B1 | 6/2008 | Ugolini et al. |
| 7,397,996 B2 | 7/2008 | Herzog et al. |
| 7,400,813 B2 | 7/2008 | Zimmel |
| 7,404,736 B2 | 7/2008 | Herbst et al. |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,435,090 B1 | 10/2008 | Schriefer et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 | 12/2008 | Ferris et al. |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,510,421 B2 | 3/2009 | Fransen et al. |
| 7,522,804 B2 | 4/2009 | Araki et al. |
| 7,523,898 B1 | 4/2009 | Barry et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,529,485 B2 | 5/2009 | Farmer et al. |
| 7,534,958 B2 | 5/2009 | McNutt et al. |
| 7,536,075 B2 | 5/2009 | Zimmel |
| 7,540,666 B2 | 6/2009 | Luther et al. |
| 7,542,645 B1 | 6/2009 | Hua et al. |
| 7,544,085 B2 | 6/2009 | Baldwin et al. |
| 7,552,899 B2 | 6/2009 | Chen et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 * | 8/2009 | Smrha ............... G02B 6/4452 385/135 |
| 7,570,861 B2 | 8/2009 | Smrha et al. |
| 7,577,331 B2 | 8/2009 | Laurisch et al. |
| 7,596,293 B2 | 9/2009 | Isenhour et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,614,903 B1 | 11/2009 | Huang |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 | 2/2010 | Bayazit et al. |
| 7,672,561 B1 | 3/2010 | Keith et al. |
| 7,676,135 B2 | 3/2010 | Chen |
| 7,689,079 B2 | 3/2010 | Burnham et al. |
| 7,689,089 B2 | 3/2010 | Wagner et al. |
| 7,694,926 B2 | 4/2010 | Allen et al. |
| 7,697,811 B2 | 4/2010 | Murano et al. |
| 7,706,294 B2 | 4/2010 | Natarajan et al. |
| 7,715,125 B2 | 5/2010 | Willey |
| 7,715,683 B2 | 5/2010 | Kowalczyk et al. |
| 7,734,138 B2 | 6/2010 | Bloodworth et al. |
| 7,740,409 B2 | 6/2010 | Bolton et al. |
| 7,743,495 B2 | 6/2010 | Mori et al. |
| 7,748,911 B2 | 7/2010 | Keenum et al. |
| 7,751,674 B2 | 7/2010 | Hill |
| 7,751,675 B2 | 7/2010 | Holmberg et al. |
| 7,756,371 B1 | 7/2010 | Burnham et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,764,859 B2 | 7/2010 | Krampotich et al. |
| 7,769,266 B2 | 8/2010 | Morris |
| 7,805,044 B2 | 9/2010 | Reagan et al. |
| 7,809,232 B2 | 10/2010 | Reagan et al. |
| 7,809,235 B2 | 10/2010 | Reagan et al. |
| 7,811,136 B1 | 10/2010 | Hsieh et al. |
| 7,822,310 B2 | 10/2010 | Castonguay et al. |
| 7,822,340 B2 | 10/2010 | Matityahu et al. |
| 7,837,495 B2 | 11/2010 | Baldwin et al. |
| 7,850,372 B2 | 12/2010 | Nishimura et al. |
| 7,853,112 B2 | 12/2010 | Zimmel et al. |

(56) References Cited

U.S. PATENT DOCUMENTS

| | | |
|---|---|---|
| 7,856,166 B2 | 12/2010 | Biribuze et al. |
| 7,862,369 B2 | 1/2011 | Gimenes et al. |
| 7,869,685 B2 | 1/2011 | Hendrickson et al. |
| 7,876,580 B2 | 1/2011 | Mayer |
| 7,899,298 B2 | 3/2011 | Cox et al. |
| 7,914,332 B2 | 3/2011 | Song et al. |
| 7,941,053 B2 | 5/2011 | Dallesasse |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,945,138 B2 | 5/2011 | Hill et al. |
| 7,970,250 B2 | 6/2011 | Morris |
| 7,991,252 B2 | 8/2011 | Cheng et al. |
| 8,009,959 B2 | 8/2011 | Barnes et al. |
| 3,014,171 A1 | 9/2011 | Kelly et al. |
| 3,020,813 A1 | 9/2011 | Clark et al. |
| 8,014,646 B2 | 9/2011 | Keith et al. |
| 8,059,932 B2 | 11/2011 | Hill et al. |
| 8,093,499 B2 | 1/2012 | Hoffer et al. |
| 8,107,785 B2 | 1/2012 | Berglund et al. |
| 8,131,126 B2 | 3/2012 | Kowalczyk et al. |
| 8,184,938 B2 | 5/2012 | Cooke et al. |
| 8,206,043 B2 | 6/2012 | Thirugnanam et al. |
| 8,206,058 B2 | 6/2012 | Vrondran et al. |
| 8,220,881 B2 | 7/2012 | Keith |
| 8,226,305 B2 | 7/2012 | Thirugnanam et al. |
| 8,249,410 B2 | 8/2012 | Andrus et al. |
| 8,251,591 B2 | 8/2012 | Barnes et al. |
| 8,270,798 B2 | 9/2012 | Dagley et al. |
| 8,280,216 B2 | 10/2012 | Cooke et al. |
| 8,285,104 B2 | 10/2012 | Davis et al. |
| 8,301,004 B2 | 10/2012 | Cooke et al. |
| 8,331,752 B2 | 12/2012 | Biribuze |
| 8,353,494 B2 | 1/2013 | Peng et al. |
| 8,369,679 B2 | 2/2013 | Wakileh et al. |
| 8,391,666 B2 | 3/2013 | Hetzer et al. |
| 8,452,148 B2 | 5/2013 | Cooke et al. |
| 8,472,773 B2 | 6/2013 | de Jong |
| 8,491,331 B2 | 7/2013 | Follingstad |
| 8,528,872 B2 | 9/2013 | Mattlin et al. |
| 8,537,477 B2 | 9/2013 | Shioda |
| 8,538,226 B2 | 9/2013 | Makrides-Saravanos et al. |
| 8,559,783 B2 | 10/2013 | Campos et al. |
| 8,712,206 B2 | 4/2014 | Cooke et al. |
| 8,824,850 B2 | 9/2014 | Garcia et al. |
| 8,861,918 B2 | 10/2014 | Vazquez et al. |
| 8,879,991 B2 | 11/2014 | Kim |
| 9,020,320 B2 | 4/2015 | Cooke et al. |
| 9,910,236 B2 * | 3/2018 | Cooke .................. G02B 6/4452 |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0014571 A1 | 2/2002 | Thompson |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0117942 A1 | 8/2002 | Audibert et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0145858 A1 | 10/2002 | Hayashi et al. |
| 2002/0150370 A1 | 10/2002 | Battey et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0022552 A1 | 1/2003 | Barker et al. |
| 2003/0036748 A1 | 2/2003 | Cooper et al. |
| 2003/0047524 A1 | 3/2003 | Sato et al. |
| 2003/0051026 A1 | 3/2003 | Carter et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0096536 A1 | 5/2003 | Clark et al. |
| 2003/0123834 A1 | 7/2003 | Burek et al. |
| 2003/0129871 A1 | 7/2003 | Follingstad |
| 2003/0134541 A1 | 7/2003 | Johnsen et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0008984 A1 | 1/2004 | Gerrish et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0038594 A1 | 2/2004 | Clark et al. |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120259 A1 | 6/2004 | Jones et al. |
| 2004/0120679 A1 | 6/2004 | Vincent et al. |
| 2004/0120681 A1 | 6/2004 | Bohle et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0219829 A1 | 11/2004 | Clark et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0256138 A1 | 12/2004 | Grubish et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0025444 A1 | 2/2005 | Barnes et al. |
| 2005/0026497 A1 | 2/2005 | Holliday |
| 2005/0036749 A1 | 2/2005 | Vogel et al. |
| 2005/0041947 A1 | 2/2005 | Barker et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0103515 A1 | 5/2005 | Fuller et al. |
| 2005/0107086 A1 | 5/2005 | Tell et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0142910 A1 | 6/2005 | Levesque et al. |
| 2005/0142932 A1 | 6/2005 | Levesque et al. |
| 2005/0178573 A1 | 8/2005 | James |
| 2005/0185912 A1 | 8/2005 | Levesque et al. |
| 2005/0191901 A1 | 9/2005 | Follingstad |
| 2005/0201073 A1 | 9/2005 | Pincu et al. |
| 2005/0215112 A1 | 9/2005 | Barker et al. |
| 2005/0232566 A1 | 10/2005 | Rapp et al. |
| 2005/0233647 A1 | 10/2005 | Denovich et al. |
| 2005/0237721 A1 | 10/2005 | Cowley et al. |
| 2005/0254757 A1 | 11/2005 | Ferretti, III et al. |
| 2005/0265013 A1 | 12/2005 | Keith et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |

(56) References Cited

U.S. PATENT DOCUMENTS

| | | |
|---|---|---|
| 2006/0018448 A1 | 1/2006 | Stevens et al. |
| 2006/0018622 A1 | 1/2006 | Caveney |
| 2006/0025011 A1 | 2/2006 | Follingstad |
| 2006/0029353 A1 | 2/2006 | Bolster et al. |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0062538 A1 | 3/2006 | Araki et al. |
| 2006/0063421 A1 | 3/2006 | Barker et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0103270 A1 | 5/2006 | Bergesch et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0134972 A1 | 6/2006 | Barker et al. |
| 2006/0147171 A1 | 7/2006 | Dofher |
| 2006/0147172 A1 | 7/2006 | Luther et al. |
| 2006/0153517 A1 | 7/2006 | Reagan et al. |
| 2006/0154513 A1 | 7/2006 | Barker et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0194470 A1 | 8/2006 | Caveney |
| 2006/0194471 A1 | 8/2006 | Clark et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0228940 A1 | 10/2006 | Follingstad |
| 2006/0269194 A1 | 11/2006 | Luther et al. |
| 2006/0269205 A1 | 11/2006 | Zimmel |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0020991 A1 | 1/2007 | Murano |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047891 A1 | 3/2007 | Bayazit et al. |
| 2007/0047893 A1 | 3/2007 | Kramer et al. |
| 2007/0047894 A1 | 3/2007 | Holmberg et al. |
| 2007/0047896 A1 | 3/2007 | Kowalczyk et al. |
| 2007/0053385 A1 | 3/2007 | Tollbom |
| 2007/0058641 A1 | 3/2007 | Cicchetti et al. |
| 2007/0086723 A1 | 4/2007 | Sasaki et al. |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0190853 A1 | 8/2007 | Caveney |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2007/0298652 A1 | 12/2007 | Clark et al. |
| 2008/0009182 A1 | 1/2008 | Follingstad |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0037209 A1 | 2/2008 | Niazi et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085092 A1 | 4/2008 | Barnes |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0108253 A1 | 5/2008 | Clark et al. |
| 2008/0112681 A1 | 5/2008 | Battey et al. |
| 2008/0115956 A1 | 5/2008 | Fransen et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145011 A1 | 6/2008 | Register |
| 2008/0145013 A1 | 6/2008 | Escoto et al. |
| 2008/0146079 A1 | 6/2008 | Spisany et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175541 A1 | 7/2008 | Lu et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0240653 A1 | 10/2008 | King et al. |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0034912 A1 | 2/2009 | Sepe, Jr. |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0110391 A1 | 4/2009 | Matityahu et al. |
| 2009/0121092 A1 | 5/2009 | Keith |
| 2009/0129033 A1 | 5/2009 | Smrha et al. |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180737 A1 | 7/2009 | Burnham et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |

(56) References Cited

U.S. PATENT DOCUMENTS

| | | |
|---|---|---|
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257718 A1 | 10/2009 | Nishimura et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0290843 A1 | 11/2009 | Reagan et al. |
| 2009/0297099 A1 | 12/2009 | Benjamin et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0183270 A1 | 7/2010 | Davis et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0215330 A1 | 8/2010 | Sokolowski et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0058786 A1 | 3/2011 | Zimmel |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0235985 A1 | 9/2011 | Cote et al. |
| 2011/0249950 A1 | 10/2011 | Chapa Ramirez et al. |
| 2011/0262096 A1 | 10/2011 | Fabrykowski et al. |
| 2011/0268404 A1 | 11/2011 | Cote et al. |
| 2011/0268405 A1 | 11/2011 | Cote et al. |
| 2011/0268406 A1 | 11/2011 | Giraud et al. |
| 2011/0268407 A1 | 11/2011 | Cowen et al. |
| 2011/0268408 A1 | 11/2011 | Giraud et al. |
| 2011/0268409 A1 | 11/2011 | Giraud et al. |
| 2011/0268410 A1 | 11/2011 | Giraud et al. |
| 2011/0268411 A1 | 11/2011 | Giraud et al. |
| 2011/0268412 A1 | 11/2011 | Giraud et al. |
| 2011/0268413 A1 | 11/2011 | Cote et al. |
| 2011/0268414 A1 | 11/2011 | Giraud et al. |
| 2011/0274402 A1 | 11/2011 | Giraud et al. |
| 2011/0280535 A1 | 11/2011 | Womack |
| 2011/0280537 A1 | 11/2011 | Cowen et al. |
| 2012/0020629 A1 | 1/2012 | Shiratori et al. |
| 2012/0025683 A1 | 2/2012 | Mattlin et al. |
| 2012/0051707 A1 | 3/2012 | Barnes et al. |
| 2012/0057836 A1 | 3/2012 | Andrzejewski et al. |
| 2012/0057838 A1 | 3/2012 | Hill et al. |
| 2012/0106897 A1 | 5/2012 | Cline et al. |
| 2012/0106899 A1 | 5/2012 | Choi |
| 2012/0106911 A1 | 5/2012 | Cooke et al. |
| 2012/0134639 A1 | 5/2012 | Giraud et al. |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0056599 A1 | 3/2013 | Baker et al. |
| 2013/0058616 A1 | 3/2013 | Cote et al. |
| 2013/0072053 A1 | 3/2013 | Fabrykowski et al. |
| 2013/0077927 A1 | 3/2013 | O'Connor |
| 2013/0134115 A1 | 5/2013 | Hernandez-Ariguznaga |
| 2013/0214108 A1 | 8/2013 | Irudayaraj et al. |
| 2013/0243386 A1 | 9/2013 | Pimentel et al. |
| 2013/0251326 A1 | 9/2013 | Cooke et al. |
| 2013/0266282 A1 | 10/2013 | Cote et al. |
| 2013/0308908 A1 | 11/2013 | Isenhour et al. |
| 2013/0308915 A1 | 11/2013 | Buff et al. |
| 2013/0308916 A1 | 11/2013 | Buff et al. |
| 2013/0328258 A1 | 12/2013 | Mutsuno |
| 2014/0003782 A1 | 1/2014 | Blackwell, Jr. et al. |
| 2014/0010510 A1 | 1/2014 | Blackard |
| 2014/0029907 A1 | 1/2014 | Isenhour et al. |
| 2014/0037251 A1 | 2/2014 | Isenhour et al. |
| 2014/0079366 A1 | 3/2014 | Rodriguez et al. |
| 2014/0112628 A1 | 4/2014 | Keenum et al. |
| 2014/0226946 A1 | 8/2014 | Cooke et al. |
| 2015/0027967 A1 | 1/2015 | Vazquez et al. |
| 2015/0185429 A1 | 7/2015 | Cooke et al. |
| 2017/0038549 A1* | 2/2017 | Smrha ............... G02B 6/4452 |
| 2017/0131504 A1 | 5/2017 | Cooke et al. |
| 2017/0131505 A1 | 5/2017 | Cooke et al. |
| 2017/0131506 A1 | 5/2017 | Cooke et al. |

(56) References Cited

U.S. PATENT DOCUMENTS

| | | | |
|---|---|---|---|
| 2017/0131508 A1 | 5/2017 | Cooke et al. | |
| 2017/0160505 A1 | 6/2017 | Cooke et al. | |

FOREIGN PATENT DOCUMENTS

| | | |
|---|---|---|
| CA | 2186314 A1 | 4/1997 |
| CA | 2765835 A1 | 1/2011 |
| CH | 688705 A5 | 1/1998 |
| CN | 1471649 A | 1/2004 |
| CN | 1690745 A | 11/2005 |
| CN | 2849745 Y | 12/2006 |
| CN | 102460258 A | 5/2012 |
| CN | 202693880 U | 1/2013 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4112871 A1 | 10/1992 |
| DE | 4231181 C1 | 8/1993 |
| DE | 4321815 A1 | 1/1995 |
| DE | 20115940 U1 | 1/2002 |
| DE | 10338848 A1 | 3/2005 |
| DE | 202005009932 U1 | 11/2005 |
| DE | 202007000556 U1 | 10/2007 |
| DE | 102007024476 A1 | 11/2008 |
| DE | 202010009385 U1 | 9/2010 |
| EP | 29512 A1 | 6/1981 |
| EP | 0105597 A2 | 4/1984 |
| EP | 0250900 A2 | 1/1988 |
| EP | 0349290 A1 | 1/1990 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0730178 A2 | 9/1996 |
| EP | 0776557 B1 | 6/1997 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1162485 A2 | 12/2001 |
| EP | 1203974 A2 | 5/2002 |
| EP | 1280363 A2 | 1/2003 |
| EP | 1289319 A2 | 3/2003 |
| EP | 1310816 A2 | 5/2003 |
| EP | 1316829 A2 | 6/2003 |
| EP | 1367308 A1 | 12/2003 |
| EP | 1621907 A1 | 2/2006 |
| EP | 1557061 B1 | 3/2006 |
| EP | 1777563 A1 | 4/2007 |
| EP | 2060942 A2 | 5/2009 |
| EP | 2159613 A2 | 3/2010 |
| FR | 1586331 A | 2/1970 |
| FR | 2123728 A5 | 9/1972 |
| FR | 2378378 A1 | 8/1978 |
| GB | 2241591 A | 9/1991 |
| GB | 2277812 A | 11/1994 |
| GB | 2367379 A | 4/2002 |
| GB | 2377839 A | 1/2003 |
| JP | 3060994 A | 3/1991 |
| JP | 3172806 A | 7/1991 |
| JP | 3281378 A | 12/1991 |
| JP | 5045541 A | 2/1993 |
| JP | 06018749 A | 1/1994 |
| JP | 7308011 A | 11/1995 |
| JP | 7318761 A | 12/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | H09178998 A | 7/1997 |
| JP | H09197139 A | 7/1997 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10332945 A | 12/1998 |
| JP | 10339817 A | 12/1998 |
| JP | 11023858 A | 1/1999 |
| JP | H11202146 A | 7/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001119177 A | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002032153 A | 1/2002 |
| JP | 2002077236 A | 3/2002 |
| JP | 2002116337 A | 4/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003149458 A | 5/2003 |
| JP | 2003169026 A | 6/2003 |
| JP | 2003215353 A | 7/2003 |
| JP | 2003344701 A | 12/2003 |
| JP | 2004086060 A | 3/2004 |
| JP | 3516765 B2 | 4/2004 |
| JP | 2004118091 A | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361890 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 2005165158 A | 6/2005 |
| JP | 2005181600 A | 7/2005 |
| JP | 2005257937 A | 9/2005 |
| JP | 2005338618 A | 12/2005 |
| JP | 2006507606 A | 3/2006 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 2006276782 A | 10/2006 |
| JP | 2006292924 A | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 2007093760 A | 4/2007 |
| JP | 2007511959 A | 5/2007 |
| JP | 3934052 B2 | 6/2007 |

(56) References Cited

FOREIGN PATENT DOCUMENTS

| | | | |
|---|---|---|---|
| JP | 2007179046 A | 7/2007 |
| JP | 3964191 B2 | 8/2007 |
| JP | 3989853 B2 | 10/2007 |
| JP | 4026244 B2 | 12/2007 |
| JP | 2007324441 A | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 2008533583 A | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009515242 A | 4/2009 |
| JP | 2009115962 A | 5/2009 |
| JP | 2009229506 A | 10/2009 |
| JP | 2012065019 A | 3/2012 |
| KR | 20110037404 A | 4/2011 |
| WO | 9000261 A1 | 1/1990 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 9959295 A1 | 11/1999 |
| WO | 9963628 A1 | 12/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 2003014943 A1 | 2/2003 |
| WO | 03044902 A1 | 5/2003 |
| WO | 2004041525 A2 | 5/2004 |
| WO | 2004052066 A1 | 6/2004 |
| WO | 2005020400 A1 | 3/2005 |
| WO | 2005069448 A1 | 7/2005 |
| WO | 2005091030 A1 | 9/2005 |
| WO | 2005107275 A1 | 11/2005 |
| WO | 2006012389 A1 | 2/2006 |
| WO | 2006076062 A | 7/2006 |
| WO | 2006091850 A1 | 8/2006 |
| WO | 2006108024 A1 | 10/2006 |
| WO | 2007050515 A1 | 5/2007 |
| WO | 2007079074 A2 | 7/2007 |
| WO | 2007089682 A2 | 8/2007 |
| WO | 2007149215 A2 | 12/2007 |
| WO | 2008027201 A2 | 3/2008 |
| WO | 2008063054 A2 | 5/2008 |
| WO | 2008074013 A2 | 6/2008 |
| WO | 2008113054 A2 | 9/2008 |
| WO | 2008157248 A1 | 12/2008 |
| WO | 2009026688 A1 | 3/2009 |
| WO | 2009029485 A1 | 3/2009 |
| WO | 2009030360 A1 | 3/2009 |
| WO | 2009032245 A1 | 3/2009 |
| WO | 2009091465 A2 | 7/2009 |
| WO | 2009120280 A2 | 10/2009 |
| WO | 2010024842 A1 | 3/2010 |
| WO | 2010024847 A2 | 3/2010 |
| WO | 2010036549 A1 | 4/2010 |
| WO | 2010080745 A1 | 7/2010 |
| WO | 2011005461 A1 | 1/2011 |

OTHER PUBLICATIONS

Decision for Reexamination for Chinese Patent Application No. 200980134014.X, dated Oct. 10, 2016, 15 pages.
Extended European Search Report for European Patent Application No. 10790017.7, dated Oct. 22, 2012, 6 pages.
International Search Report and Written Opinion for PCT/US2009/004548, dated Mar. 19, 2010, 18 pages.
International Search Report and Written Opinion for PCT/US10/035529, dated Jul. 23, 2010, 10 pages.
International Search Report and Written Opinion for PCT/US2010/038580, dated Aug. 18, 2010, 8 pages.
International Search Report and Written Opinion for PCT/US2010/039225, dated Oct. 14, 2010, 17 pages.
International Preliminary Report on Patentability for PCT/US2009/004549, dated Mar. 1, 2011, 10 pages.
International Preliminary Report on Patentability for PCT/US2009/004548, dated Mar. 1, 2011, 8 pages.
International Preliminary Report on Patentability for PCT/US2010/035529, dated Dec. 1, 2011, 9 pages.
English Translation of the First Office Action for Chinese Patent Application No. 2009101715265, dated Jan. 31, 2012, 10 pages.
English Translation of the First Office Action for Chinese Patent Application No. 200980134014X, dated Oct. 16, 2012, 7 pages.
English Translation of the First Office Action for Chinese Patent Application No. 200980134013.5, dated Nov. 5, 2012, 3 pages.
English Translation of the First Office Action for Chinese Patent Application No. 201080022305.2, dated Feb. 25, 2013, 8 pages.
English Translation of the First Office Action for Chinese Patent Application No. 2010800314136, dated Feb. 27, 2013, 9 pages.
Notification of Reason for Rejection for Japanese Patent Application No. 2011-524964, dated Sep. 17, 2013, 8 pages.
English Translation of the Second Office Action for Chinese Patent Application No. 200980134013.5, dated Sep. 26, 2013, 9 pages.
English Translation of the Second Office Action for Chinese Patent Application No. 201080031413.6, dated Dec. 31, 2013, 10 pages.
English Translation of the Second Office Action for Chinese Patent Application No. 201080022305.2, dated Jan. 16, 2014, 5 pages.
Notification of Reason for Rejection for Japanese Patent Application No. 2012-516180, dated Feb. 24, 2014, 4 pages.
English Translation of the First Office Action for Chinese Patent Application No. 201080031967.6, dated Jan. 15, 2014, 6 pages.
Notification of Reason for Rejection for Japanese Patent Application No. 2012-512020, dated Mar. 3, 2014, 5 pages.
Examination Report for European Patent Application No. 10778368.0, dated Jan. 13, 2014, 4 pages.
Patent Examination Report No. 1 for Australian Patent Application No. 2010260251, dated Jun. 12, 2014, 3 pages.
English Translation of the Third Office Action for Chinese Patent Application No. 200980134013.5, dated Jun. 9, 2014, 5 pages.
Patent Examination Report No. 1 for Australian Patent Application No. 2009286118, dated Jun. 26, 2014, 3 pages.
Patent Examination Report No. 1 for Australian Patent Application No. 2010249538, dated Jun. 26, 2014, 4 pages.
Decision for Final Rejection for Japanese Patent Application No. 2011-524964, dated Jul. 14, 2014, 6 pages.
English Translation of the Third Office Action for Chinese Patent Application No. 201080022305.2, dated Oct. 8, 2014, 5 pages.
English Translation of Decision of Rejection for Chinese Patent Application No. 201080031413.6, dated Sep. 2, 2014, 10 pages.
Notification of Reason for Rejection for Japanese Patent Application No. 2012-516180, dated Sep. 22, 2014, 3 pages.
English Translation of the Second Office Action for Chinese Patent Application No. 201080031967.6, dated Oct. 17, 2014, 7 pages.
English Translation of the Notification of the Office Rejection for Chinese Patent Application No. 200980134013.5, dated Feb. 16, 2015, 10 pages.
Examination Report for European Patent Application No. 09789091.7, dated May 8, 2015, 3 pages.
Examination Report for European Patent Application No. 10778368.0, dated May 13, 2015, 4 pages.
Summons to Attend Oral Proceedings for European Patent Application No. 10790017.7, dated Dec. 3, 2015, 7 pages.

(56) References Cited

OTHER PUBLICATIONS

Extended European Search Report for European Patent Application No. 15189567.9, dated Jan. 28, 2016, 9 pages.
Office Action for Canadian Patent Application No. 2734718, dated Oct. 7, 2015, 7 pages.
English Translation of Notification for Reexamination for Chinese Patent Application No. 201080031413.6, dated Feb. 24, 2016, 8 pages.
English Translation of Notification of Reexamination for Chinese Patent Application No. 200980134013.5, dated Mar. 14, 2016, 9 pages.
Office Action for Canadian Patent Application No. 2760818, dated Apr. 19, 2016, 3 pages.
Patent Examination Report No. 1 for Australian Patent Application No. 2015210380, dated May 3, 2016, 2 pages.
Office Action for Canadian Patent Application No. 2765837, dated May 17, 2016, 3 pages.
English Translation of Notification of Reexamination for Chinese Patent Application No. 200980135014.X, dated Feb. 29, 2016, 8 pages.
Extended European Search Report for European Patent Application No. 15184772.0, dated Jun. 14, 2016, 14 pages.
Patent Examination Report No. 1 for Australian Patent Application No. 2015203580, dated Jul. 4, 2016, 2 pages.
Extended European Patent Application No. 16176271.1, dated Sep. 29, 2016, 12 pages.
Partial European Search Report for European Patent Application No. 16173431.4, dated Oct. 20, 2016, 8 pages.
Non-Final Office Action for U.S. Appl. No. 13/663,975, dated Aug. 1, 2018, 24 pages.
Notice of Allowance for U.S. Appl. No. 15/412,839, dated Aug. 14, 2018, 7 pages.
Non-Final Office Action for U.S. Appl. No. 15/412,839, dated Jun. 14, 2018, 7 pages.
Notice of Allowance for U.S. Appl. No. 15/412,900, dated Aug. 14, 2018, 7 pages.
International Search Report for PCT/US2011/030446 dated Jul. 14, 2011, 2 pages.
International Search Report for PCT/US2011/030448 dated Jul. 20, 2011, 2 pages.
International Search Report for PCT/US2011/030466 dated Aug. 5, 2011, 2 pages.
Non-final Office Action for U.S. Appl. No. 13/649,417 dated Feb. 13, 2014, 10 pages.
Final Office Action for U.S. Appl. No. 13/649,417 dated Jun. 25, 2014, 9 pages.
Notice of Allowance for U.S. Appl. No. 13/649,417 dated Sep. 8, 2014, 7 pages.
Non-final Office Action for U.S. Appl. No. 12/956,446 dated Dec. 5, 2014, 12 pages.
Advisory Action for U.S. Appl. No. 13/663,975 dated Dec. 24, 2014, 7 pages.
Author Unknown, "Living Hinge—From Wikipedia, the free encyclopedia," Retrieved from the internet on Mar. 19, 2015, http://en.eikipedia.org/wiki/Living_Hinge, 3 pages.
Bigo, Sebastien, et al., "10.2Tbit/s (256x42.7Gbit/s PDM/WDM) transmission over 100km TeraLight fiber with 1.28 bit/s/Hz spectral efficiency," Optical Fiber Communication Conference, Mar. 17-22, 2001, 3 pages.
McEachern, "Gigabit Networking on the Public Transmission Network," IEEE Communications Magazine, Apr. 1992, IEEE, pp. 70-78.
Author Unknown, "U-Space System for Brocade 48000," Product Specifications, LAN-904-EN, Apr. 2008, Communications Supply Corporation, pp. 1-16.
Patent Examination Report No. 1 for Australian Patent Application No. 2015242945, dated Sep. 1, 2016, 5 pages.
Translation of the Notification of the Office Rejection for Chinese Patent Application No. 200980134014.X, dated Dec. 18, 2014, 8 pages.
Translation of the Second Office Action for Chinese Patent Application No. 200980134014.X, dated Jul. 17, 2013, 8 pages.
Translation of Notification of Reason for Rejection for Japanese Patent Application No. 2011-524963, dated Jul. 14, 2014, 3 pages.
Translation of Notification of Reason for Rejection for Japanese Patent Application No. 2011-524963, dated Sep. 17, 2013, 4 pages.
English Translation of Second Office Action for Chinese Patent Application No. 201080018761.X, dated Apr. 3, 2015, 5 pages.
English Translation of Second Office Action for Chinese Patent Application No. 201180022996.0, dated Jul. 28, 2015, 10 pages.
English Translation of Search Report for Chinese Patent Application No. 201280009252.X, dated Jun. 25, 2015, 2 pages.
English Translation of Search Report for Chinese Patent Application No. 201280010672.X, dated Dec. 15, 2014, 2 pages.
English Translation of Notification of Reason for Rejection for Japanese Patent Application No. 2012-516298, dated Jul. 6, 2015, 6 pages.
Examination Report for European Patent Application No. 10707153.2, dated Mar. 25, 2015, 6 pages.
Examination Report for European patent application 09789090.9-1562 dated Aug. 2, 2013, 4 pages.
Examination Report for European patent application 09789090.9-1562 dated Feb. 25, 2014, 5 pages.
Examination Report for European patent application 09789090.9-1562 dated Oct. 2, 2014, 6 pages.
Examination Report for European patent application 09789090.9-1562 dated May 5, 2015, 5 pages.
Examination Report for European patent application 09789090.9-1562 dated Dec. 18, 2015, 4 pages.
Partial European Search Report for European Patent Application 15184772.0, dated Jan. 22, 2016, 7 pages.
Patent Examination Report No. 1 for Australian patent application 2011245168 dated Sep. 9, 2014, 3 pages.
English Translation of Notice on the First Office Action for Chinese patent application 201180021566.7 dated Jul. 3, 2014, 7 pages.
English Translation of Notice on the Second Office Action for Chinese patent application 201180021566.7 dated May 26, 2015, 7 pages.
International Search Report for PCT/US2011/057582 dated Jan. 27, 2012, 3 pages.
International Search Report and Written Opinion for PCT/US2011/034581 dated Jul. 13, 2011, 13 pages.
Advisory Action for U.S. Appl. No. 12/394,114 dated Jan. 16, 2015, 3 pages.
Notice of Allowance and Examiner-Initiated Interview Summary for U.S. Appl. No. 12/947,883 dated Jan. 13, 2015, 11 pages.
Non-final Office Action for U.S. Appl. No. 12/818,986 dated Jan. 5, 2015, 21 pages.
Notice of Allowance for U.S. Appl. No. 13/649,417 dated Jan. 8, 2015, 7 pages.
Non-final Office Action for U.S. Appl. No. 12/946,217 dated Dec. 29, 2014, 50 pages.
Notice of Allowance and Examiner-Initiated Interview Summary for U.S. Appl. No. 12/940,585 dated Feb. 27, 2015, 16 pages.
Notice of Allowance for U.S. Appl. No. 12/953,101 dated Feb. 20, 2015, 9 pages.
Final Office Action for U.S. Appl. No. 12/819,065 dated Mar. 12, 2015, 13 pages.
Examiner's Answer to the Appeal Brief for U.S. Appl. No. 12/946,139 mailed Feb. 5, 2015, 12 pages.
Notice of Allowance for U.S. Appl. No. 12/707,889 dated Feb. 17, 2015, 7 pages.
Non-final Office Action for U.S. Appl. No. 13/902,012 dated Feb. 17, 2015, 9 pages.
Non-final Office Action for U.S. Appl. No. 13/081,856 dated Feb. 9, 2015, 8 pages.
Non-final Office Action for U.S. Appl. No. 13/901,074 dated May 30, 2015, 8 pages.
Notice of Allowance for U.S. Appl. No. 12/947,883 dated May 21, 2015, 11 pages.
Final Office Action for U.S. Appl. No. 12/940,699 dated Jun. 1, 2015, 10 pages.

(56) References Cited

OTHER PUBLICATIONS

Non-final Office Action for U.S. Appl. No. 13/663,949 dated May 5, 2015, 19 pages.
Non-final Office Action for U.S. Appl. No. 13/952,014 dated Jul. 30, 2015, 9 pages.
Final Office Action for U.S. Appl. No. 12/818,986 dated Jul. 23, 2015, 24 pages.
Non-final Office Action for U.S. Appl. No. 12/956,446 dated Jul. 31, 2015, 14 pages.
Notice of Allowance for U.S. Appl. No. 13/902,012 dated Aug. 5, 2015, 8 pages.
Final Office Action for U.S. Appl. No. 12/946,217, dated Jul. 16, 2015, 50 pages.
Non-final Office Action for U.S. Appl. No. 12/394,114 dated Aug. 12, 2015, 8 pages.
Non-final Office Action for U.S. Appl. No. 12/953,039 dated Sep. 3, 2015, 8 pages.
Final Office Action for U.S. Appl. No. 13/081,856 dated Sep. 8, 2015, 10 pages.
Examiner's Answer to the Appeal Brief for U.S. Appl. No. 13/663,975 mailed Oct. 5, 2015, 14 pages.
Non-final Office Action for U.S. Appl. No. 12/819,065 dated Aug. 26, 2015, 13 pages.
Final Office Action for U.S. Appl. No. 13/567,288 dated May 8, 2015, 13 pages.
Non-final Office Action for U.S. Appl. No. 14/263,751 dated Oct. 30, 2015, 6 pages.
Decision on Appeal for U.S. Appl. No. 12/953,118, mailed Apr. 5, 2016, 11 pages.
Notice of Allowance for U.S. Appl. No. 12/953,118, dated Apr. 8, 2016, 8 pages.
Final Office Action for U.S. Appl. No. 13/663,949 dated Dec. 23, 2015, 24 pages.
Final Office Action for U.S. Appl. No. 14/263,751 dated Jun. 8, 2016, 6 pages.
Decision on Appeal for U.S. Appl. No. 12/953,134 mailed Jun. 24, 2016, 6 page.
Decision on Appeal for U.S. Appl. No. 12/952,912 mailed Jun. 28, 2016, 8 pages.
Non-final Office Action for U.S. Appl. No. 12/940,699 dated Jul. 1, 2016, 10 pages.
Non-final Office Action for U.S. Appl. No. 13/901,074 dated Jun. 22, 2016, 8 pages.
Decision on Appeal for U.S. Appl. No. 12/946,139, mailed Oct. 13, 2016, 8 pages.
Notice of Allowance for U.S. Appl. No. 12/953,118, dated Aug. 1, 2016, 7 pages.
Non-Final Office Action for U.S. Appl. No. 14/660,074, dated Sep. 15, 2016, 13 pages.
Notice of Allowance for U.S. Appl. No. 14/512,899, dated Mar. 1, 2017, 9 pages.
Non-Final Office Action for U.S. Appl. No. 14/512,899, dated Aug. 16, 2016, 8 pages.
Panduit Corp. (Petitioner) V. *Corning Optical Communications LLC*, Declaration of Casimer Decusatis in Support of Petition for Inter Partes Review of U.S. Pat. No. 8,452,148, dated Aug. 31, 2016, 62 pages.
Panduit Corp. (Petitioner) V. *Corning Optical Communications LLC*, Patent Owner's Preliminary Response, Case IPR2016-01703, U.S. Pat. No. 8,452,148 B2, dated Dec. 6, 2016, 42 pages.
Panduit Corp. (Petitioner) V. *Corning Optical Communications LLC* (Patent Owner), Decision for Institution of Inter Partes Review, Case IPR2016-01703, U.S. Pat. No. 8,452,148, Paper No. 7, dated Mar. 2, 2017, 30 pages.
Panduit Corp. (Petitioner) V. *Corning Optical Communications LLC* (Patent Owner), Petition for Inter Partes Review of U.S. Pat. No. 8,452,148, dated Aug. 31, 2016, 83 pages.

Panduit Corp. (Petitioner) V. *Corning Optical Communications LLC* (Patent Owner), Declaration of Casimer Decusatis in Support of Petition for Inter Partes Review of U.S. Pat. No. 8,184,938, dated Aug. 31, 2016, 56 pages.
Panduit Corp. (Petitioner) V. *Corning Optical Communications LLC* (Patent Owner), Petition for Inter Partes Review of U.S. Pat. No. 8,184,938, dated Aug. 31, 2016, 73 pages.
Panduit Corp. (Petitioner) V. *Corning Optical Communications LLC* (Patent Owner), Patent Owner's Preliminary Response, Case IPR2016-01709, U.S. Pat. No. 8,184,938, B2, dated Dec. 6, 2016, 36 pages.
Panduit Corp. (Petitioner) V. *Corning Optical Communications LLC* (Patent Owner), Decision for Institution of Inter Partes Review, Case IPR2016-01709, U.S. Pat. No. 8,184,938 B2, Paper No. 7, dated Mar. 1, 2017, 30 pages.
Panduit Corp. (Petitioner) V. *Corning Optical Communications LLC* (Patent Owner), Patent Owner's Preliminary Response, Case IPR2017-00009, U.S. Pat. No. 9,020,320 B2, dated Jan. 18, 2017, 33 pages.
Panduit Corp. (Petitioner) V. *Corning Optical Communications LLC* (Patent Owner), Petition for Inter Partes Review of U.S. Pat. No. 9,020,320, dated Oct. 4, 2016, 88 pages.
Panduit Corp. (Petitioner) V. *Corning Optical Communications LLC* (Patent Owner), Declaration of Casimer Decusatis in Support of Petition for Inter Partes Review of U.S. Pat. No. 9,020,320, dated Sep. 30, 2016, 113 pages.
Panduit Corp. (Petitioner) V. *Corning Optical Communications LLC* (Patent Owner), Declaration of Casimer Decusatis in Support of Petition for Inter Partes Review of U.S. Pat. No. 8,538,226, dated Oct. 6, 2016, 67 pages.
Panduit Corp. (Petitioner) V. *Corning Optical Communications LLC* (Patent Owner), Petition for Inter Partes Review of U.S. Pat. No. 8,538,226, dated Oct. 6, 2016, 87 pages.
Panduit Corp. (Petitioner) V. *Corning Optical Communications LLC* (Patent Owner), Patent Owner's Preliminary Response, Case IPR2017-00029, U.S. Pat. No. 8,538,226 B2, dated Jan. 13, 2017, 34 pages.
Panduit Corp. (Petitioner) V. *Corning Optical Communications LLC* (Patent Owner), Declaration of Casimer Decusatis in Support of, Petition for Inter Partes Review of U.S. Pat. No. 8,712,206, dated Dec. 22, 2016, 117 pages.
Panduit Corp. (Petitioner) V. *Corning Optical Communications LLC*, Petition for Inter Partes Review of U.S. Pat. No. 8,712,206, dated Dec. 22, 2016, 89 pages.
Author Unknown, "Cabinets, Racks, Panels, and Associated Equipment," EIA/ECA-310-E Standard, Dec. 2005, Electronic Industries Alliance, Arlington, Virginia, 26 pages.
Author Unknown, "Fiber Optic Connector Intermateability Standard—Type LC ," TIA/EIA-604-10A, FOCIS 10, Mar. 2002, Telecommunications Industry Association, Arlington, Virginia, 36 pages.
Author Unknown, "Fiber Optic Connector Intermateability Standard—Type MPO ," TIA/EIA-604-5-A, FOCIS-5, Sep. 2001, Telecommunications Industry Association, Arlington, Virginia, 24 pages.
Panduit Corp. (Petitioner) V. *Corning Optical Communications LLC* (Patent Owner), Decision Denying Institution of Inter Partes Review, Case IPR2017-00528, U.S. Pat. No. 8,712,206 B2, dated May 31, 2017, 28 pages.
Final Office Action for U.S. Appl. No. 14/660,074, dated May 18, 2017, 4 pages.
Notice of Allowance for U.S. Appl. No. 12/952,912, dated Mar. 29, 2017, 9 pages.
Non-Final Office Action for U.S. Appl. No. 15/412,900, dated Apr. 10, 2017, 10 pages.
Non-Final Office Action for U.S. Appl. No. 15/413,883, dated Mar. 17, 2017, 8 pages.
Non-Final Office Action for U.S. Appl. No. 15/413,919, dated Mar. 14, 2017, 9 pages.
Office Action for Canadian Patent Application No. 2765912, dated Apr. 5, 2017, 4 pages.
Office Action for Canadian Patent Application No. 2765837, dated Apr. 26, 2017, 3 pages.
Examination Report No. 1 for Australian Patent Application No. 2017221853, dated Mar. 16, 2018, 4 pages.

(56) References Cited

OTHER PUBLICATIONS

Decision on Appeal for Japanese Patent Application No. 2012-516347, mailed Jul. 15, 2017, 8 pages.
Office Action for Canadian Patent Application No. 2765912, dated Mar. 9, 2018, 3 pages.
Notification of Grant for Japanese Patent Application No. 2012512020, dated Oct. 27, 2015, 4 pages.
Notice of Acceptance for Australian Patent Application No. 2009208086, dated Apr. 24, 2015, 2 pages.
Patent Examination Report No. 1 for Australian Patent Application No. 2009208086, dated Jul. 12, 2014, 3 pages.
Author Unknown, "Fibre Frame Solutions," Fibre Connectivity Solutions, 6356_au, Jun. 2007, ADC Krone, 123 pages.
Bulow, Knut, "ADC licenses Lx.5 SFF connector to Amphenol," Cabling, Install, Aug. 10, 2001, 1 page.
Author Unkown, "ADC Features New Fiber Optic Products at ECOC 2004," Business Wire, Sep. 6, 2004, 3 pages.
Author Unknown, "ADC FasTerm Multimode LX.5 Connector," Installation Instructions, ADCP-90-422, Issue 2, Apr. 2001, ADC Telecommunications, Inc., 25 pages.
Author Unknown, "FDM Series Fiber Distribution and Splice Modules," User Manual, ADCP-90-138, Issue 3, Oct. 2002, ADC Telecommunications, Inc., 34 pages.
Author Unkown, "ADC Next Generation Frame 96 & 144 Position Fiber Termination Block," User Manual, ADCP-90-287, Issue 2, May 2009, ADC Telecommunications, Inc., 42 pages.
Author Unknown, "Small-Form-Factor Connector," Product Data Sheet, 100082PR, Sep. 2001, ADC Telecommunications, Inc., 4 pages.
Author Unknown, "AFD Outside Plant Connector Modules," User Manual, ADCP-93-303, Issue 1, Jun. 2000, ADC Telecommunications, Inc., 14 pages.
Author Unknown, "Suhner Fiberoptic LX.5 Connector Family," Product Data Sheet, Jan. 3, 2000, Huber and Suhner, 4 pages.
Author Unknown, "OmniReach FTTP Solutions," Product Data Sheet 1276559, Apr. 2004, ADC Telecommunications, Inc., 12 pages.
Author Unknown, "Fiber Optic Cassettes," Product Search Results, Apr. 25, 2018, Panduit, 17 pages.
Author Unknown, "Pro Patch: Fiber Optical Normal Through Panel," Product Data Page, www.clarkwire.com/Propatchopticalnormalthroughpanel.htm, accessed Apr. 25, 2018, 2 pages.
Non-Final Office Action for U.S. Appl. No. 15/412,900, dated May 10, 2018, 6 pages.
Non-Final Office Action for U.S. Appl. No. 15/413,883, dated May 9, 2018, 6 pages.
Non-Final Office Action for U.S. Appl. No. 15/413,962, dated May 2, 2018, 6 pages.
Non-Final Rejection dated Sep. 7, 2010, for U.S. Appl. No. 12/323,423, 18 pages.
Notice of Allowance for U.S. Appl. No. 12/323,423 dated Jan. 24, 2012, 8 pages.
Examiner's Answer dated Mar. 4, 2011, for U.S. Appl. No. 12/323,415, 11 pages.
Final Rejection dated Jun. 25, 2010, for U.S. Appl. No. 12/323,415, 10 pages.
Non-Final Rejection dated Aug. 5, 2011, for U.S. Appl. No. 12/323,415, 41 pages.
Non-final Office Action for U.S. Appl. No. 12/323,415 dated Apr. 23, 2012, 11 pages.
Non-Final Rejection dated Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 dated Mar. 8, 2011, 8 pages.
Non-final Office Action for U.S. Appl. No. 11/320,062 dated Jan. 15, 2010, 11 pages.
Non-final Office Action for U.S. Appl. No. 12/320,062 dated Sep. 30, 2010, 7 pages.
Final Office Action for U.S. Appl. No. 11/439,086 dated Feb. 4, 2010, 14 pages.
Non-final Office Action for U.S. Appl. No. 11/439,086 dated May 3, 2010, 11 pages.
Non-final Office Action for U.S. Appl. No. 11/439,086 dated Sep. 21, 2009, 10 pages.
Final Office Action for U.S. Appl. No. 12/079,481 dated Mar. 18, 2010, 10 pages.
Non-final Office Action for U.S. Appl. No. 12/079,481 dated Dec. 26, 2008, 9 pages.
Non-final Office Action for U.S. Appl. No. 12/079,481 dated Sep. 16, 2009, 10 pages.
Notice of Allowance for U.S. Appl. No. 12/079,481 dated Jun. 3, 2010, 6 pages.
Notice of Allowance for U.S. Appl. No. 12/079,481 dated Oct. 4, 2010, 4 pages.
Final Office Action for U.S. Appl. No. 12/394,114 dated Dec. 22, 2011, 8 pages.
Non-final Office Action for U.S. Appl. No. 12/394,114 dated Mar. 16, 2012, 8 pages.
Non-final Office Action for U.S. Appl. No. 12/394,114 dated Sep. 1, 2011, 7 pages.
Non-final Office Action for U.S. Appl. No. 12/323,373 dated May 3, 2012, 7 pages.
Non-final Office Action for U.S. Appl. No. 11/809,474 dated Apr. 8, 2008, 13 pages.
Non-final Office Action for U.S. Appl. No. 11/809,474 dated Nov. 13, 2008, 10 pages.
Notice of Allowance for U.S. Appl. No. 11/809,474 dated Jul. 6, 2009, 6 pages.
Final Office Action for U.S. Appl. No. 11/320,031 dated Mar. 8, 2011, 8 pages.
Non-final Office Action for U.S. Appl. No. 11/320,031 dated Jan. 5, 2010, 16 pages.
Non-final Office Action for U.S. Appl. No. 11/320,031 dated Sep. 30, 2010, 7 pages.
Notice of Allowance for U.S. Appl. No. 11/320,031 dated Nov. 15, 2011, 7 pages.
Non-final Office Action for U.S. Appl. No. 12/157,622 dated Mar. 31, 2009, 9 pages.
Non-final Office Action for U.S. Appl. No. 12/157,622 dated Oct. 15, 2009, 9 pages.
Notice of Allowance for U.S. Appl. No. 12/157,622 dated Apr. 22, 2010, 4 pages.
Non-final Office Action for U.S. Appl. No. 12/323,395 dated Dec. 8, 2011, 7 pages.
Non-final Office Action for U.S. Appl. No. 12/415,454 dated Mar. 2, 2012, 5 pages.
Non-final Office Action for U.S. Appl. No. 12/415,454 dated Sep. 6, 2011, 7 pages.
Notice of Allowance for U.S. Appl. No. 12/415,454 dated Jan. 13, 2012, 5 pages.
Non-final Office Action for U.S. Appl. No. 12/576,769 dated Feb. 2, 2012, 23 pages.
Notice of Allowance for U.S. Appl. No. 12/415,454 dated Jun. 19, 2012, 5 pages.
Non-final Office Action for U.S. Appl. No. 13/603,894 dated Oct. 3, 2013, 9 pages.
International Search Report for PCT/US2009/066779 dated Aug. 27, 2010, 3 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high," product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.

(56) References Cited

OTHER PUBLICATIONS

"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 dated Oct. 4, 2012, 6 pages.
Non-final Office Action for U.S. Appl. No. 12/819,081 dated Aug. 21, 2012, 12 pages.
International Search Report for PCT/US2010/038986 dated Aug. 18, 2010, 1 page.
Final Office Action for U.S. Appl. No. 12/394,114 dated Oct. 25, 2012, 8 pages.
Non-final Office Action for U.S. Appl. No. 12/915,682 dated Oct. 24, 2012, 8 pages.
Non-final Office Action for U.S. Appl. No. 12/818,986 dated Feb. 3, 2012, 12 pages.
Final Office Action for U.S. Appl. No. 12/818,986 dated Oct. 18, 2012, 13 pages.
Non-final Office Action for U.S. Appl. No. 12/952,960 dated Oct. 4, 2012, 11 pages.
Non-final Office Action for U.S. Appl. No. 12/953,134 dated Sep. 25, 2012, 8 pages.
Non-final Office Action for U.S. Appl. No. 12/953,039 dated Jan. 11, 2013, 6 pages.
Non-final Office Action for U.S. Appl. No. 12/952,912 dated Dec. 28, 2012, 9 pages.
Non-final Office Action for U.S. Appl. No. 12/953,118 dated Jan. 7, 2013, 9 pages.
Non-final Office Action for U.S. Appl. No. 12/953,536 dated Jan. 2, 2013, 20 pages.
Non-final Office Action for U.S. Appl. No. 12/707,889 dated Jan. 2, 2013, 7 pages.
European Search Report for patent application 10790017.7 dated Nov. 8, 2012, 7 pages.
Examination Report for European patent application 09789090.9-2216 dated Aug. 29, 2011, 4 pages.
Examination Report for European patent application 09789090.9-2216 dated Mar. 30, 2012, 6 pages.
Written Opinion of the International Searching Authority for International patent application PCT/US2009004548, dated Apr. 5, 2011, 6 pages.
European Search Report for European patent application 09789090.9-2217 dated Jan. 24, 2013, 5 pages.
Non-final Office Action for U.S. Appl. No. 12/946,139 dated Jul. 26, 2012, 12 pages.
Final Office Action for U.S. Appl. No. 12/946,139 dated Feb. 15, 2013, 17 pages.
Non-final Office Action for U.S. Appl. No. 12/751,884 dated Feb. 15, 2013, 5 pages.
Non-final Office Action for U.S. Appl. No. 12/394,114 dated Feb. 27, 2013, 8 pages.
Non-final Office Action for U.S. Appl. No. 12/819,065 dated Mar. 4, 2013, 7 pages.
Final Office Action for U.S. Appl. No. 12/952,960 dated Mar. 7, 2013, 13 pages.
Notice of Allowance for U.S. Appl. No. 12/732,487 dated Mar. 19, 2013, 11 pages.
Non-final Office Action for U.S. Appl. No. 12/953,134 dated Mar. 21, 2013, 9 pages.
Final Office Action for U.S. Appl. No. 12/641,617 dated May 10, 2013, 21 pages.
Notice of Allowance for U.S. Appl. No. 13/090,621 dated Apr. 22, 2013, 8 pages.
Final Office Action for U.S. Appl. No. 12/953,039 dated May 1, 2013, 8 pages.
Final Office Action for U.S. Appl. No. 12/953,118 dated May 3, 2013, 11 pages.
Final Office Action for U.S. Appl. No. 12/915,682 dated Apr. 18, 2013, 9 pages.
Advisory Action for U.S. Appl. No. 12/952,960 dated May 15, 2013, 2 pages.
Non-final Office Action for U.S. Appl. No. 12/952,960 dated Jun. 20, 2013, 13 pages.
Non-final Office Action for U.S. Appl. No. 12/953,536 dated Jun. 6, 2013, 21 pages.
Non-final Office Action for U.S. Appl. No. 11/820,300 dated Apr. 25, 2012, 10 pages.
Final Office Action for U.S. Appl. No. 12/871,052 dated Jul. 1, 2013, 12 pages.
Non-final Office Action for U.S. Appl. No. 12/940,699 dated Jun. 26, 2013, 9 pages.
Notice of Allowance for U.S. Appl. No. 13/090,621 dated Jun. 25, 2013, 8 pages.
Non-final Office Action for U.S. Appl. No. 12/956,475 dated Oct. 4, 2012, 7 pages.
Non-final Office Action for U.S. Appl. No. 13/302,067 dated Jun. 7, 2013, 13 pages.
Final Office Action for U.S. Appl. No. 12/771,473 dated Jul. 19, 2013, 7 pages.
Notice of Allowance for U.S. Appl. No. 12/751,884 dated Jul. 17, 2013, 8 pages.
Non-final Office Action for U.S. Appl. No. 12/940,585 dated Aug. 16, 2013, 14 pages.
Final Office Action for U.S. Appl. No. 12/953,134 dated Aug. 23, 2013, 11 pages.
Ex parte Quayle Action for U.S. Appl. No. 12/953,164 mailed Aug. 16, 2013, 5 pages.
Non-final Office Action for U.S. Appl. No. 12/732,487 dated Jul. 17, 2013, 22 pages.
Advisory Action for U.S. Appl. No. 12/953,039 dated Jul. 12, 2013, 3 pages.
Advisory Action for U.S. Appl. No. 12/953,118 dated Jul. 12, 2013, 3 pages.
Advisory Action for U.S. Appl. No. 12/641,617 dated Jul. 29, 2013, 3 pages.
Final Office Action for U.S. Appl. No. 12/952,912 dated Aug. 30, 2013, 15 pages.
Advisory Action for U.S. Appl. No. 12/771,473 dated Oct. 2, 2013, 3 pages.
Notice of Allowance for U.S. Appl. No. 12/641,617 dated Sep. 4, 2013, 9 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
Notice of Allowance for U.S. Appl. No. 12/871,052 dated Sep. 18, 2013, 9 pages.
Non-final Office Action for U.S. Appl. No. 12/953,039 dated Sep. 12, 2013, 8 pages.
Non-final Office Action for U.S. Appl. No. 12/946,139 dated Oct. 2, 2013, 18 pages.
Final Office Action for U.S. Appl. No. 12/394,114 dated Oct. 4, 2013, 10 pages.
Non-final Office Action for U.S. Appl. No. 12/818,986 dated Oct. 4, 2013, 19 pages.
Non-final Office Action for U.S. Appl. No. 13/901,074 dated Oct. 9, 2013, 6 pages.
Advisory Action for U.S. Appl. No. 12/953,134 dated Nov. 4, 2013, 3 pages.
Final Office Action for U.S. Appl. No. 12/952,960 dated Oct. 29, 2013, 8 pages.
Notice of Allowance for U.S. Appl. No. 13/292,130 dated Oct. 18, 2013, 9 pages.

(56) References Cited

OTHER PUBLICATIONS

International Search Report and Written Opinion for PCT/US2011/035683 dated Sep. 8, 2011, 15 pages.
International Search Report and Written Opinion for PCT/US2010/039218 dated Oct. 27, 2010, 13 pages.
First Office Action for Chinese patent application 201080032453.2 dated Mar. 26, 2013, 6 pages.
Chinese Search Report for Chinese patent application 201080032453.2 dated May 15, 2013, 2 pages.
First Office Action for Chinese patent application 201080031621.6 dated Sep. 26, 2013, 9 pages.
Chinese Search Report for Chinese patent application 201080031621.6 dated Sep. 13, 2013, 2 pages.
Ramdas, "Modern File Systems and Storage," Proceedings of the 2nd International SANE Conference, May 22-25, 2000, MECC, Maastricht, The Netherlands, Copyright Rodney R. Ramdas, 10 pages.
International Search Report and Written Opinion for PCT/US2011/035684 dated Jul. 1, 2011, 11 pages.
International Search Report and Written Opinion for PCT/US11/61754 dated Mar. 26, 2012, 9 pages.
Author Unknown, "144 Fiber Patch Panel 1U," Technical Data, ADTEK Group Limited, 2009, 2 pages.
Advisory Action for U.S. Appl. No. 12/394,114 dated Jan. 2, 2014, 3 pages.
Notice of Allowance for U.S. Appl. No. 12/871,052 dated Dec. 24, 2013, 9 pages.
Final Office Action for U.S. Appl. No. 12/953,039 dated Dec. 27, 2013, 10 pages.
Advisory Action for U.S. Appl. No. 12/952,960 dated Jan. 8, 2014, 3 pages.
Advisory Action for U.S. Appl. No. 12/952,912 dated Nov. 26, 2013, 3 pages.
Examiner's Answer to the Appeal Brief for U.S. Appl. No. 12/953,118 mailed Dec. 3, 2013, 6 pages.
Non-final Office Action for U.S. Appl. No. 13/597,549 dated Jan. 14, 2014, 9 pages.
Final Office Action for U.S. Appl. No. 12/732,487 dated Dec. 6, 2013, 24 pages.
Final Office Action for U.S. Appl. No. 12/956,446 dated Dec. 23, 2013, 12 pages.
Non-final Office Action for U.S. Appl. No. 12/953,536 dated Dec. 17, 2013, 21 pages.
Non-final Office Action for U.S. Appl. No. 12/819,065 dated Dec. 3, 2013, 8 pages.
International Search Report and Written Opinion for PCT/US2011/062353 dated Apr. 10, 2012, 15 pages.
International Search Report for PCT/US2013/041268 dated Aug. 20, 2013, 5 pages.
Notice of Allowance for U.S. Appl. No. 13/292,130 dated Feb. 14, 2014, 7 pages.
Final Office Action for U.S. Appl. No. 12/707,889 dated Feb. 11, 2014, 17 pages.
Non-final Office Action for U.S. Appl. No. 12/940,699 dated Feb. 3, 2014, 10 pages.
Notice of Allowance for U.S. Appl. No. 12/952,960 dated Feb. 13, 2014, 7 pages.
Notice of Allowance and Applicant-Initiated Interview Summary for U.S. Appl. No. 12/771,473 dated Feb. 27, 2014, 8 pages.
Non-final Office Action for U.S. Appl. No. 13/081,856 dated Nov. 26, 2013, 11 pages.
Non-final Office Action for U.S. Appl. No. 13/663,975 dated Jan. 31, 2014, 18 pages.
Non-final Office Action for U.S. Appl. No. 12/394,114 dated Mar. 21, 2014, 9 pages.
Final Office Action for U.S. Appl. No. 12/940,585 dated Mar. 18, 2014, 15 pages.
Non-final Office Action for U.S. Appl. No. 12/953,101 dated Apr. 3, 2014, 9 pages.
Advisory Action for U.S. Appl. No. 12/953,039 dated Mar. 6, 2014, 3 pages.
Advisory Action for U.S. Appl. No. 12/956,446 dated Mar. 20, 2014, 3 pages.
Final Office Action for U.S. Appl. No. 13/603,894 dated Mar. 20, 2014, 15 pages.
Notice of Allowance for U.S. Appl. No. 12/417,325 dated Aug. 22, 2012, 7 pages.
International Search Report for PCT/US2010/023901 dated Jun. 11, 2010, 3 pages.
Notice of Allowance for U.S. Appl. No. 12/576,769 dated May 31, 2012, 9 pages.
Non-final Office Action for U.S. Appl. No. 12/576,806 dated Dec. 13, 2011, 6 pages.
Notice of Allowance for U.S. Appl. No. 12/576,806 dated Apr. 18, 2012, 5 pages.
Non-final Office Action for U.S. Appl. No. 13/688,675 dated Jan. 31, 2014, 13 pages.
Non-final Office Action for U.S. Appl. No. 12/946,217 dated Jul. 26, 2012, 25 pages.
Final Office Action for U.S. Appl. No. 12/946,217 dated Mar. 18, 2013, 48 pages.
Non-final Office Action for U.S. Appl. No. 12/946,217 dated Oct. 3, 2013, 47 pages.
Final Office Action for U.S. Appl. No. 12/946,217 dated Apr. 25, 2014, 40 pages.
Non-final Office Action for U.S. Appl. No. 13/833,876 dated Apr. 24, 2014, 7 pages.
Notice of Allowance for U.S. Appl. No. 12/953,536 dated May 20, 2014, 9 pages.
Advisory Action for U.S. Appl. No. 12/707,889 dated Jun. 11, 2014, 4 pages.
Advisory Action for U.S. Appl. No. 12/940,585 dated Jun. 17, 2014, 3 pages.
Advisory Action for U.S. Appl. No. 12/947,883 dated Jun. 19, 2014, 3 pages.
Non-final Office Action for U.S. Appl. No. 12/732,487 dated Jun. 20, 2014, 24 pages.
Non-final Office Action for U.S. Appl. No. 13/621,958 dated Jun. 20, 2014, 13 pages.
Non-final Office Action for U.S. Appl. No. 12/952,960 dated Jun. 26, 2014, 13 pages.
Non-final Office Action for U.S. Appl. No. 13/746,938 dated Jul. 11, 2014, 9 pages.
Non-final Office Action for U.S. Appl. No. 12/751,895 dated May 20, 2014, 9 pages.
Final Office Action for U.S. Appl. No. 12/953,039 dated Jul. 25, 2014, 10 pages.
Notice of Allowance for U.S. Appl. No. 12/953,536 dated Aug. 28, 2014, 9 pages.
Final Office Action for U.S. Appl. No. 13/901,074 dated Sep. 5, 2014, 7 pages.
Final Office Action for U.S. Appl. No. 13/663,975 dated Aug. 14, 2014, 42 pages.
Corrected Notice of Allowance for U.S. Appl. No. 13/533,093 dated Sep. 2, 2014, 7 pages.
Examiner's Answer to the Appeal for U.S. Appl. No. 12/952,912 mailed Sep. 11, 2014, 15 pages.
Advisory Action and Examiner-Initiated Interview Summary for U.S. Appl. No. 13/081,856 dated Sep. 16, 2014, 4 pages.
Notice of Allowance for U.S. Appl. No. 13/455,646 dated Sep. 26, 2014, 9 pages.
Non-Final Office Action for U.S. Appl. No. 13/663,949 dated Sep. 25, 2014, 21 pages.
Non-Final Office Action for U.S. Appl. No. 13/688,675 dated Sep. 30, 2014, 9 pages.
Advisory Action for U.S. Appl. No. 12/953,039 dated Oct. 3, 2014, 3 pages.
Notice of Allowance for U.S. Appl. No. 13/597,549 dated Oct. 3, 2014, 8 pages.
Decision on Appeal for U.S. Appl. No. 11/320,062 mailed Aug. 14, 2014, 8 pages.

(56) References Cited

OTHER PUBLICATIONS

Final Office Action for U.S. Appl. No. 12/953,101 dated Oct. 20, 2014, 14 pages.
Notice of Allowance for U.S. Appl. No. 13/533,093 dated Oct. 17, 2014, 9 pages.
Notice of Allowance for U.S. Appl. No. 12/732,487 dated Oct. 7, 2014, 8 pages.
Non-Final Office Action for U.S. Appl. No. 13/567,288 dated Oct. 8, 2014, 7 pages.
Advisory Action for U.S. Appl. No. 12/818,986 dated Oct. 15, 2014, 5 pages.
Examiner's Answer to the Appeal Brief for U.S. Appl. No. 12/953,134 mailed Aug. 1, 2014, 7 pages.
Final Office Action for U.S. Appl. No. 12/394,114 dated Oct. 31, 2014, 10 pages.
Non-final Office Action for U.S. Appl. No. 12/940,699 dated Oct. 28, 2014, 9 pages.
Non-final Office Action for U.S. Appl. No. 12/953,039 dated Nov. 12, 2014, 8 pages.
Notice of Allowance for U.S. Appl. No. 12/952,960 dated Nov. 10, 2014, 7 pages.
Notice of Allowance for U.S. Appl. No. 13/081,856 dated Oct. 29, 2014, 10 pages.
Notice of Allowance for U.S. Appl. No. 13/833,876 dated Nov. 7, 2014, 7 pages.
Advisory Action for U.S. Appl. No. 13/901,074 dated Nov. 24, 2014, 3 pages.
Notice of Allowance for U.S. Appl. No. 12/751,895 dated Nov. 19, 2014, 8 pages.
Final Office Action for U.S. Appl. No. 12/953,003 dated Feb. 12, 2015, 14 pages.
Final Office Action for U.S. Appl. No. 12/953,039 dated Feb. 23, 2015, 9 pages.
Annex to Form PCT/ISA/2006, Communication Relating to the Results of the Partial International Search, for PCT/US2009/004549 dated Feb. 10, 2010, 2 pages.
Annex to Form PCT/ISA/206, Communication Relating to the Results of the Partial International Search, for PCT/US2009/004548 dated Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 dated Jul. 23, 2010, 2 pages.
International Search Report for PCT/US10/35563 dated Jul. 23, 2012, 1 page.
International Search Report for PCT/US2008/002514 dated Aug. 8, 2008, 2 pages.
International Search Report for PCT/US2008/010317 dated Mar. 4, 2008, 2 pages.
International Search Report for PCT/US2009/001692 dated Nov. 24, 2009, 5 pages.
International Search Report for PCT/US2010/024888 dated Jun. 23, 2010, 5 pages.
International Search Report for PCT/US2010/027402 dated Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 dated Apr. 25, 2008, 1 page.
International Search Report for PCT/US09/57069 dated Mar. 24, 2010, 2 pages.
International Search Report for PCT/US2009/057244 dated Nov. 9, 2009 3 pages.
International Search Report for PCTUS2009004548 dated Mar. 19, 2010, 5 pages.
International Search Report for PCTUS2009004549 dated Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 dated Aug. 25, 2011, 8 pages.
Advisory Action for U.S. Appl. No. 12/221,117 dated Aug. 24, 2011, 3 pages.
Examiner's Answer to Appeal Brief for U.S. Appl. No. 12/221,117 mailed Mar. 29, 2012, 16 pages.
Final Office Action for U.S. Appl. No. 12/221,117 dated Feb. 19, 2010, 7 pages.
Final Office Action for U.S. Appl. No. 12/221,117 dated Jun. 10, 2011, 8 pages.
Non-final Office Action for U.S. Appl. No. 12/221,117 dated Jul. 14, 2010, 7 pages.
Non-final Office Action for U.S. Appl. No. 12/221,117 dated Jun. 9, 2009, 5 pages.
Non-final Office Action for U.S. Appl. No. 12/221,117 dated Dec. 21, 2010, 7 pages.
Advisory Action for U.S. Appl. No. 12/394,483 dated Feb. 16, 2012, 3 pages.
Final Office Action for U.S. Appl. No. 12/394,483 dated Dec. 6, 2011, 14 pages.
Non-final Office Action for U.S. Appl. No. 12/394,483 dated Jun. 17, 2011, 11 pages.
Advisory Action for U.S. Appl. No. 12/950,234 dated Dec. 21, 2011, 3 pages.
Non-final Office Action for U.S. Appl. No. 12/950,234 dated Jun. 17, 2011, 7 pages.
Non-final Office Action for U.S. Appl. No. 12/950,234 dated Mar. 12, 2012, 10 pages.
Final Office Action for U.S. Appl. No. 12/950,234 dated Oct. 14, 2011, 10 pages.
Advisory Action dated May 12, 2011, for U.S. Appl. No. 12/323,423, 3 pages.
Final Rejection dated Mar. 3, 2011, for U.S. Appl. No. 12/323,423, 17 pages.
Non-Final Rejection dated Aug. 5, 2011, for U.S. Appl. No. 12/323,423, 13 pages.
Notice of Allowance for U.S. Appl. No. 15/413,883, dated Sep. 14, 2018, 8 pages.
Notice of Allowance for U.S. Appl. No. 15/413,962, dated Oct. 12, 2018, 8 pages.
International Search Report for PCT/US2012/023622 dated Mar. 9, 2012, 4 pages.

(56) References Cited

OTHER PUBLICATIONS

International Search Report for PCT/US2012/023635 dated Sep. 14, 2012, 3 pages.
International Search Report for PCT/US2012/023626 dated May 22, 2012, 4 pages.
Notice of Allowance for U.S. Appl. No. 13/951,916 dated Dec. 16, 2013, 12 pages.
International Preliminary Report on Patentability for PCT/US2012/052958 dated Mar. 13, 2014, 14 pages.
Non-final Office Action for U.S. Appl. No. 12/947,883 dated Sep. 6, 2013, 9 pages.
Final Office Action for U.S. Appl. No. 12/947,883 dated Mar. 31, 2014, 13 pages.
International Search Report for PCT/US2012/052958 dated Mar. 1, 2013, 7 pages.
International Search Report for PCT/US2013/041266 dated Aug. 20, 2013, 4 pages.
Non-final Office Action for U.S. Appl. No. 13/621,958 dated Feb. 13, 2014, 10 pages.
Non-final Office Action for U.S. Appl. No. 13/663,949 dated Feb. 3, 2014, 19 pages.
Non-final Office Action for U.S. Appl. No. 12/953,003 dated Apr. 14, 2014, 13 pages.
Non-final Office Action for U.S. Appl. No. 12/953,039 dated Apr. 15, 2014, 8 pages.
Final Office Action for U.S. Appl. No. 12/946,139 dated Apr. 22, 2014, 18 pages.
Final Office Action for U.S. Appl. No. 13/597,549 dated Apr. 24, 2014, 10 pages.
Final Office Action for U.S. Appl. No. 13/901,074 dated May 9, 2014, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 dated Jun. 29, 2012, 3 pages.
Advisory Action for U.S. Appl. No. 12/417,325 dated Jun. 12, 2012, 3 pages.
Final Office Action for U.S. Appl. No. 12/417,325 dated Apr. 16, 2012, 6 pages.
Final Office Action for U.S. Appl. No. 12/417,325 dated Feb. 7, 2012, 7 pages.
Non-final Office Action for U.S. Appl. No. 12/417,325 dated Jun. 15, 2011, 6 pages.
Notice of Allowance for U.S. Appl. No. 12/487,929 dated Sep. 12, 2012, 4 pages.
Notice of Allowance for U.S. Appl. No. 12/487,929 dated Jun. 13, 2012, 8 pages.
Advisory Action for U.S. Appl. No. 12/487,929 dated Apr. 17, 2012, 3 pages.
Final Office Action for U.S. Appl. No. 12/487,929 dated Feb. 14, 2012, 6 pages.
Final Office Action for U.S. Appl. No. 12/487,929 dated Dec. 5, 2011, 7 pages.
Non-final Office Action for U.S. Appl. No. 12/487,929 dated May 23, 2011, 7 pages.
Notice of Allowance for U.S. Appl. No. 12/415,253 dated Mar. 11, 2011, 7 pages.
Non-final Office Action for U.S. Appl. No. 12/415,253 dated Jul. 12, 2010, 11 pages.
Final Office Action for U.S. Appl. No. 12/415,253 dated Apr. 16, 2010, 9 pages.
Non-final Office Action for U.S. Appl. No. 12/415,253 dated Sep. 30, 2009, 8 pages.
Non-final Office Action for U.S. Appl. No. 12/641,617 dated Oct. 5, 2012, 21 pages.
Final Office Action for U.S. Appl. No. 12/630,938 dated Jun. 1, 2012, 18 pages.
Non-final Office Action for U.S. Appl. No. 12/630,938 dated Dec. 19, 2011, 15 pages.
Non-final Office Action for U.S. Appl. No. 12/751,884 dated Jul. 2, 2012, 9 pages.
Non-final Office Action for U.S. Appl. No. 12/871,052 dated Aug. 13, 2012, 8 pages.
Decision on Appeal for U.S. Appl. No. 12/221,117 mailed Jul. 1, 2014, 7 pages.
Notice of Allowance for U.S. Appl. No. 12/221,117 dated Jul. 16, 2014, 7 pages.
Final Office Action for U.S. Appl. No. 13/081,856 dated Jul. 2, 2014, 8 pages.
Final Office Action for U.S. Appl. No. 12/818,986 dated Jul. 18, 2014, 27 pages.
Non-final Office Action for U.S. Appl. No. 12/819,065 dated Jul. 18, 2014, 10 pages.
Notice of Allowance for U.S. Appl. No. 13/455,646 dated Jun. 2, 2014, 9 pages.
Notice of Allowance for U.S. Appl. No. 13/597,549 dated Jul. 8, 2014, 8 pages.
Notice of Allowance for U.S. Appl. No. 13/533,093 dated Jul. 8, 2014, 9 pages.
Notice of Allowance for U.S. Appl. No. 13/688,675 dated Jan. 26, 2015, 7 pages.
Australian Examination Report 2010263057 dated Oct. 13, 2014, 3 Pgs.
Bigo et al. "10.2Tbit/s (256×42.7Gbit/s PDM/WDM) transmission over 100km TeraLight Fiber with 1.28bit/sHz spectral efficiency", PD25-1-3, XP001075812A.
English Translation of Chinese Office Action/Search Report 2010800314136 dated Feb. 4, 2013.
English Translation of Japanese Office Action 2012516347 dated Feb. 24, 2014, 4 Pgs.
J. McEachern, "Gigabit Networking on the Public Transmission Network", IEEE Communications Magazine, pp. 70-78, Apr. 1992.
"U-Space System for Brocade 48000"", Product Specifications LAN-904-EN, pp. 1-16, Apr. 2008. Retrieved from http://www.gocsc.com/UserFiles/File/Corning/USpaceSystemBrocadecsc.pdf.
Non-Final Office Action for U.S. Appl. No. 15/412,839, dated Mar. 9, 2017, 9 pages.
*Panduit Corp.* (Petitioner) V. *Corning Optical Communications LLC* (Patent Owner), Final Written Decision, Case IPR2016-01703, U.S. Pat. No. 8,452,148 B2, dated Feb. 27, 2018, 44 pages.
*Panduit Corp.* (Petitioner) V. *Corning Optical Communications LLC* (Patent Owner), Final Written Decision, Case IPR2016-01709, U.S. Pat. No. 8,184,938 B2, dated Feb. 27, 2018, 41 pages.
Notice of Allowance for U.S. Appl. No. 13/663,975, dated Oct. 4, 2017, 8 pages.
Final Office Action for U.S. Appl. No. 15/412,839, dated Nov. 3, 2017, 14 pages.
Final Office Action for U.S. Appl. No. 15/412,900, dated Oct. 6, 2017, 15 pages.
Final Office Action for U.S. Appl. No. 15/413,883, dated Oct. 6, 2017, 13 pages.
Final Office Action for U.S. Appl. No. 15/413,919, dated Oct. 6, 2017, 14 pages.
Non-Final Office Action for U.S. Appl. No. 15/413,962, dated Mar. 24, 2017, 9 pages.
Final Office Action for U.S. Appl. No. 15/413,962, dated Oct. 10, 2017, 16 pages.
Notice of Allowance for U.S. Appl. No. 14/512,899, dated Jun. 28, 2017, 9 pages.
Decision on Appeal for U.S. Appl. No. 13/663,975, mailed Aug. 24, 2017, 6 pages.
Easton et al., "High-density optical connectivity in the data center," Cabling: Installation & Maintenance, Feb. 1, 2010, www.cablinginstall.com/articles/print/volume-18/issue-2/features/-high-density-optical.htm, PennWell Corporation, Tusla, Oklahoma, 15 pages.
Final Office Action for U.S. Appl. No. 13/663,975, dated Jan. 10, 2019, 24 pages.
Non-Final Office Action for U.S. Appl. No. 15/886,402, dated Jan. 10, 2019, 17 pages.
Notice of Allowance for U.S. Appl. No. 15/413,919, dated Feb. 21, 2019, 7 pages.

(56) References Cited

OTHER PUBLICATIONS

Advisory Action for U.S. Appl. No. 16/663,975, dated Jun. 13, 2019, 5 pages.
Notice of Allowance for U.S. Appl. No. 15/413,919, dated Apr. 18, 2019, 7 pages.
Non-Final Office Action for U.S. Appl. No. 16/376,529, dated May 23, 2019, 5 pages.
Notice of Allowance for U.S. Appl. No. 16/376,542, dated Jun. 13, 2019, 7 pages.

* cited by examiner

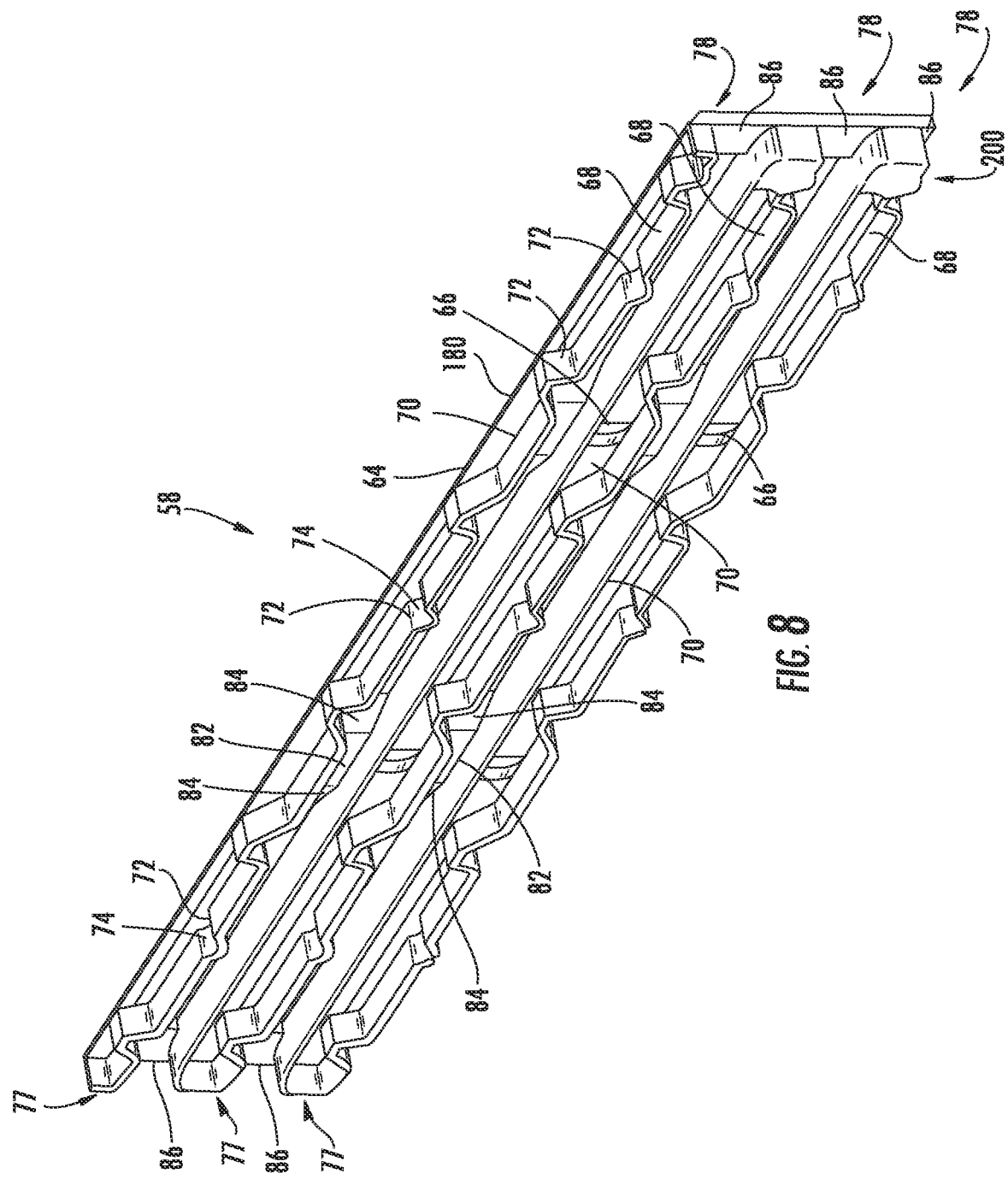

HIGH DENSITY AND BANDWIDTH FIBER OPTIC APPARATUSES AND RELATED EQUIPMENT AND METHODS

PRIORITY APPLICATIONS

This application is a continuation of U.S. patent application Ser. No. 14/660,074 filed Mar. 17, 2015, now issued as U.S. Pat. No. 9,910,236, which is a divisional application of U.S. patent application Ser. No. 13/746,938 filed Jan. 22, 2013, now issued as U.S. Pat. No. 9,020,320, which is: a continuation application of U.S. patent application Ser. No. 12/819,081 filed Jun. 18, 2010, which claims the benefit of U.S. Provisional Application Ser. No. 61/218,880 filed on Jun. 19, 2009, and in which U.S. patent application Ser. No. 13/746,938 is a continuation-in-part application of U.S. patent application Ser. No. 12/323,415 filed Nov. 25, 2008, now issued as U.S. Pat. No. 8,452,148, which claims priority to U.S. Provisional Application Ser. No. 61/197,068 filed Oct. 23, 2008 and U.S. Provisional Application Ser. No. 61/190,538 filed Aug. 29, 2008; the entire contents of all of which are herein incorporated by reference in their entireties.

BACKGROUND

Field of the Disclosure

The technology of the disclosure relates to fiber optic connection density and bandwidth provided in fiber optic apparatuses and equipment.

Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide "live fiber" from one connection point to another connection point. In this regard, fiber optic equipment is located in data distribution centers or central offices to support interconnections. For example, the fiber optic equipment can support interconnections between servers, storage area networks (SANs), and other equipment at data centers. Interconnections may be supported by fiber optic patch panels or modules.

The fiber optic equipment 1s customized based on the application and connection bandwidth needs. The fiber optic equipment is typically included in housings that are mounted in equipment racks to optimize use of space. The data rates that can be provided by equipment in a data center are governed by the connection bandwidth supported by the fiber optic equipment. The bandwidth is governed by the number of optical fiber ports included in the fiber optic equipment and the data rate capabilities of a transceiver connected to the optical fiber ports. When additional bandwidth is needed or desired, additional fiber optic equipment can be employed or scaled in the data center to increase optical fiber port count. However, increasing the number of optical fiber ports can require more equipment rack space in a data center. Providing additional space for fiber optic equipment increases costs. A need exists to provide fiber optic equipment that provides a foundation in data centers for migration to high density patch fields and ports and greater connection bandwidth capacity to provide a migration path to higher data rates while minimizing the space needed for such fiber optic equipment.

SUMMARY OF THE DETAILED DESCRIPTION

Embodiments disclosed in the detailed description include high-density and connection bandwidth fiber optic apparatuses and related equipment and methods. In certain embodiments, fiber optic apparatuses comprising a chassis are provided. the chassis may be configured to support a fiber optic connection density of at least ninety-eight (98), at least one hundred twenty (120) per U space, or at least one hundred forty-four (144) fiber optic connections per U space based on using at least one simplex or duplex fiber optic component. In other disclosed embodiments, the chassis may be configured to support a fiber optic connection density of at least four hundred thirty-four (434) or at least five hundred seventy-six (576) fiber optic connections per U space based on using at least one twelve (12) fiber, fiber optic component. In other disclosed embodiments, the at least one of the chassis may be configured to support a fiber optic connection density of at least eight hundred sixty-six (866) per U space or at least one thousand one hundred fifty-two (1152) fiber optic connections per U space based on using at least one twenty-four (24) fiber, fiber optic component. Methods of providing and supporting the aforementioned fiber optic connections densities are also provided.

In other embodiments, fiber optic apparatuses comprising a chassis may be configured to support a full-duplex connection bandwidth of at least nine hundred sixty-two (962) Gigabits per second per U space, at least one thousand two hundred (1200) Gigabits per second, or at least one thousand four hundred forty (1440) Gigabits per second per U space based on using at least one simplex or duplex fiber optic component. In other disclosed embodiments, the chassis may be configured to support a full-duplex connection bandwidth of at least four thousand three hundred twenty-two (4322) Gigabits per second per U space, at least four thousand eight hundred (4800) Gigabits per second, or at least five thousand seven hundred sixty (5760) Gigabits per second per U space based on using at least one twelve (12) fiber, fiber optic component. In another disclosed embodiment, the chassis may be configured to support a full-duplex connection bandwidth of at least eight thousand six hundred forty-two (8642) Gigabits per second per U space. Methods of providing and supporting the aforementioned fiber optic connection bandwidths are also provided.

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 8 is a left perspective view of an exemplary tray guide disposed in the chassis of FIG. 1 configured to receive fiber optic equipment trays of FIG. 6 capable of supporting one or more fiber optic modules;

DETAILED DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include high-density fiber optic modules and fiber optic module housings and related equipment. In certain embodiments, the width and/or height of the front opening of fiber optic modules and/or fiber optic module housings can be provided according to a designed relationship to the width and/or height, respectively, of a front side of the main body of the fiber optic modules and fiber optic module housings to support fiber optic components or connections. In this manner, fiber optic components can be installed in a given percentage or area of the front side of the fiber optic module to provide a high density of fiber optic connections for a given fiber optic component type(s). In another embodiment, the front openings of the fiber optic modules and/or fiber optic module housings can be provided to support a designed connection density of fiber optic components or connections for a given width and/or height of the front opening of the fiber optic module and/or fiber optic module housing. Embodiments disclosed in the detailed description also include high connection density and bandwidth fiber optic apparatuses and related equipment. In certain embodiments, fiber optic apparatuses are provided and comprise a chassis defining one or more U space fiber optic equipment units, wherein at least one of the one or more U space fiber optic equipment units is configured to support a given fiber optic connection density or bandwidth in a 1-U space, and for a given fiber optic component type(s).

Figure 1:
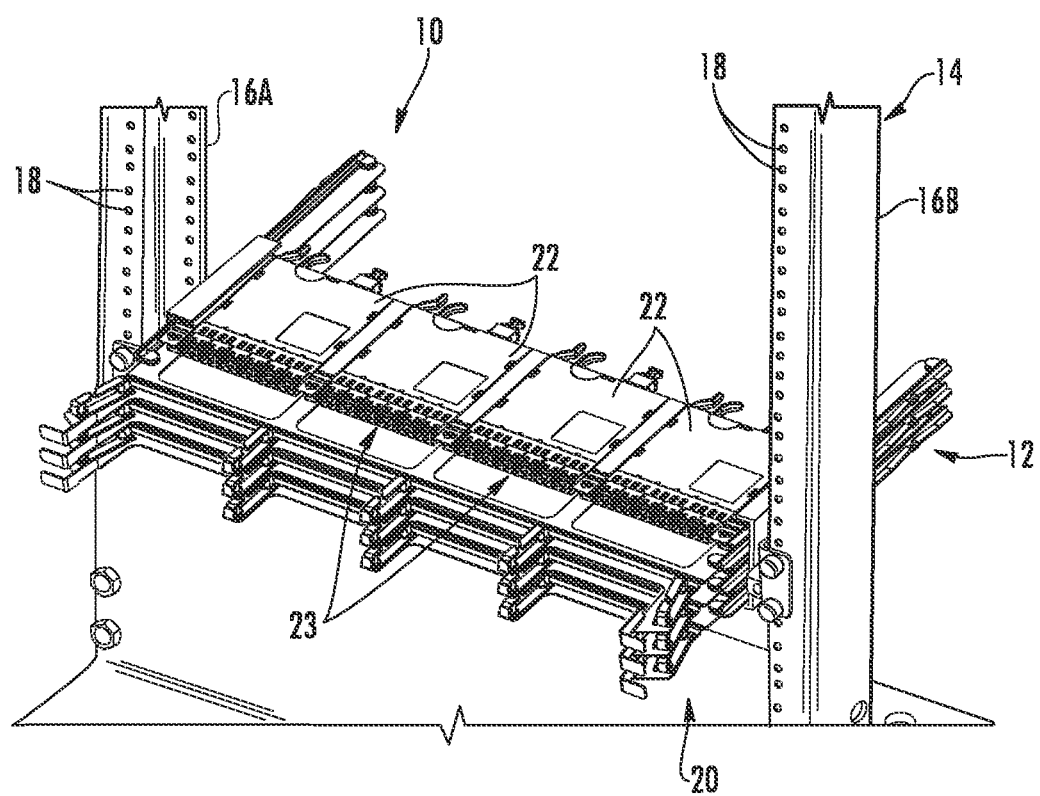
FIG. 1 is a front perspective view of an exemplary fiber optic equipment rack with an installed exemplary 1-U size chassis supporting high-density fiber optic modules to provide a given fiber optic connection density and bandwidth capability, according to one embodiment.

In this regard, FIG. 1 illustrates exemplary 1-U size fiber optic equipment 10 from a front perspective view. The fiber optic equipment 10 supports high-density fiber optic modules that support a high fiber optic connection density and bandwidth in a 1-U space, as will be described in greater detail below. The fiber optic equipment 10 may be provided at a data distribution center or central office to support cable-to-cable fiber optic connections and to manage a plurality of fiber optic cable connections. As will be described in greater detail below, the fiber optic equipment 10 has one or more fiber optic equipment trays that each support one or more fiber optic modules. However, the fiber optic equipment 10 could also be adapted to support one or more fiber optic patch panels or other fiber optic equipment that supports fiber optic components and connectivity.

The fiber optic equipment 10 includes a fiber optic equipment chassis 12 ("chassis 12"). The chassis 12 is shown as being installed in a fiber optic equipment rack 14. The fiber optic equipment rack 14 contains two vertical rails 16A, 16B that extend vertically and include a series of apertures 18 for facilitating attachment of the chassis 12 inside the fiber optic equipment rack 14. The chassis 12 is attached and supported by the fiber optic equipment rack 14 in the form of shelves that are stacked on top of each other within the vertical rails 16A, 16B. As illustrated, the chassis 12 is attached to the vertical rails 16A, 16B. The fiber optic equipment rack 14 may support 1-U-sized shelves, with "U" equal to a standard 1.75 inches in height and nineteen (19) inches in width. In certain applications, the width of "U" may be twenty-three (23) inches. Also, the term fiber optic equipment rack 14 should be understood to include structures that are cabinets as well. In this embodiment, the chassis 12 is 1-U in size; however, the chassis 12 could be provided in a size greater than 1-U as well.

As will be discussed in greater detail later below, the fiber optic equipment 10 includes a plurality of extendable fiber optic equipment trays 20 that each carries one or more fiber optic modules 22. The chassis 12 and fiber optic equipment trays 20 support fiber optic modules 22 that support high-density fiber optic modules and a fiber optic connection density and bandwidth connections in a given space, including in a 1-U space. FIG. 1 shows exemplary fiber optic components 23 disposed in the fiber optic modules 22 that support fiber optic connections. For example, the fiber optic components 23 may be fiber optic adapters or fiber optic connectors. As will also be discussed in greater detail later below, the fiber optic modules 22 in this embodiment can be provided such that the fiber optic components 23 can be disposed through at least eighty-five percent (85%) of the width of the front side or face of the fiber optic module 22, as an example. This fiber optic module 22 configuration may provide a front opening of approximately 90 millimeters (mm) or less wherein fiber optic components can be disposed through the front opening and at a fiber optic connection density of at least one fiber optic connection per 7.0 mm of width of the front opening of the fiber optic modules 22 for simplex or duplex fiber optic components 23. In this example, six (6) duplex or twelve (12) simplex fiber optic components may be installed in each fiber optic module 22. The fiber optic equipment trays 20 in this embodiment support up to four (4) of the fiber optic modules 22 in approximately the width of a 1-U space, and three (3) fiber optic equipment trays 20 in the height of a 1-U space for a total of twelve (12) fiber optic modules 22 in a 1-U space. Thus, for example, if six (6) duplex fiber optic components were disposed in each of the twelve (12) fiber optic modules 22 installed in fiber optic equipment trays 20 of the chassis 12 as illustrated in FIG. 1, a total of one hundred forty-four (144) fiber optic connections, or seventy-two (72) duplex channels (i.e., transmit and receive channels), would be supported by the chassis 12 in a 1-U space. If five (5) duplex fiber optic adapters are disposed in each of the twelve (12) fiber optic modules 22 installed in fiber optic equipment trays 20 of the chassis 12, a total of one hundred twenty (120) fiber optic connections, or sixty (60) duplex channels, would be supported by the chassis 12 in a 1-U space. The chassis 12 also supports at least ninety-eight (98) fiber optic components in a 1-U space wherein at least one of the fiber optic components is a simplex or duplex fiber optic component.

If multi-fiber fiber optic components were installed in the fiber optic modules 22, such as MPO components for example, higher fiber optic connection density and bandwidths would be possible over other chassis 12 that use similar fiber optic components. For example, if up to four (4) twelve (12) fiber MPO fiber optic components were disposed in each fiber optic module 22, and twelve (12) of the fiber optic modules 22 were disposed in the chassis 12 in a 1-U space, the chassis 12 would support up to five hundred seventy-six (576) fiber optic connections in a 1-U space. If up to four (4) twenty-four (24) fiber MPO fiber optic components were disposed in each fiber optic module 22, and twelve (12) of the fiber optic modules 22 were disposed in the chassis 12, up to one thousand one hundred fifty-two (1152) fiber optic connections in a 1-U space.

Figure 2:
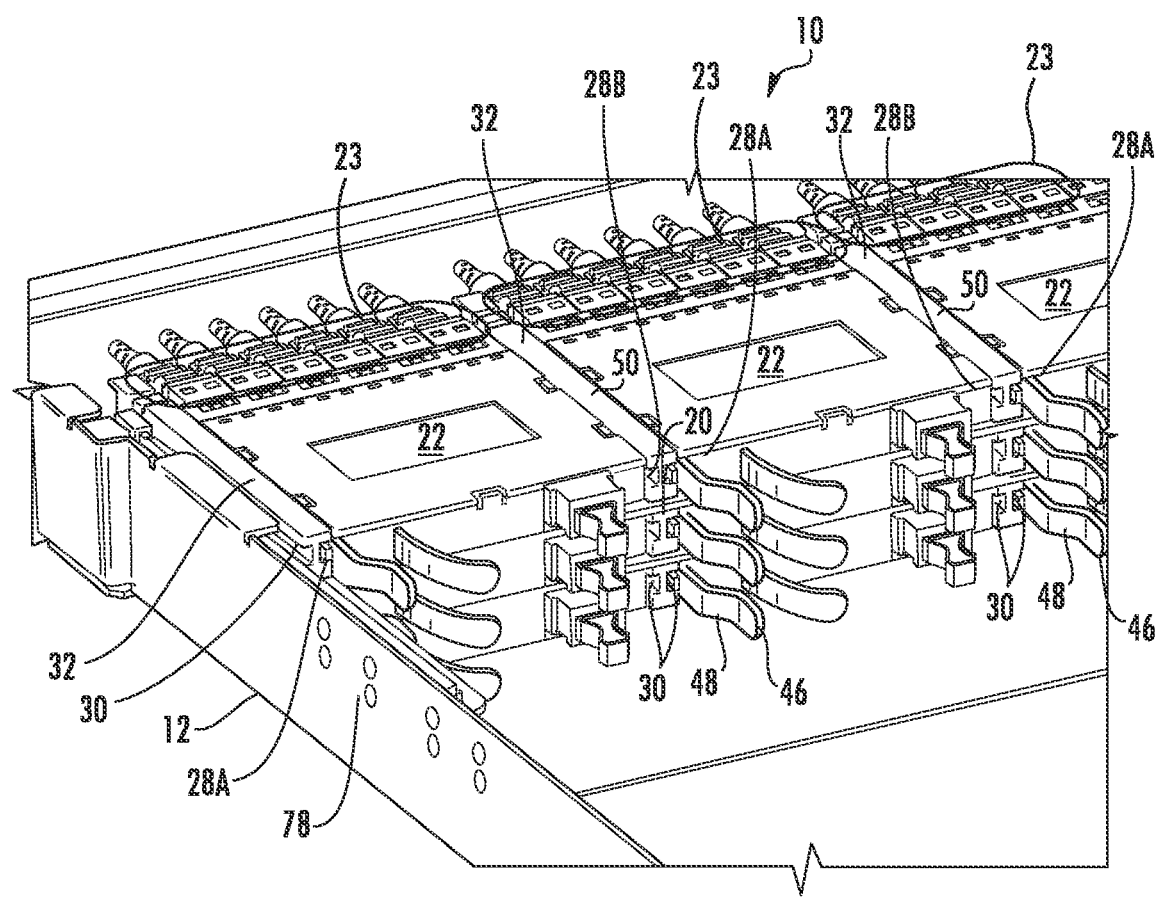
FIG. 2 is a rear perspective close-up view of the chassis of FIG. 1 with fiber optic modules installed in fiber optic equipment trays installed in the fiber optic equipment.
Figure 4:
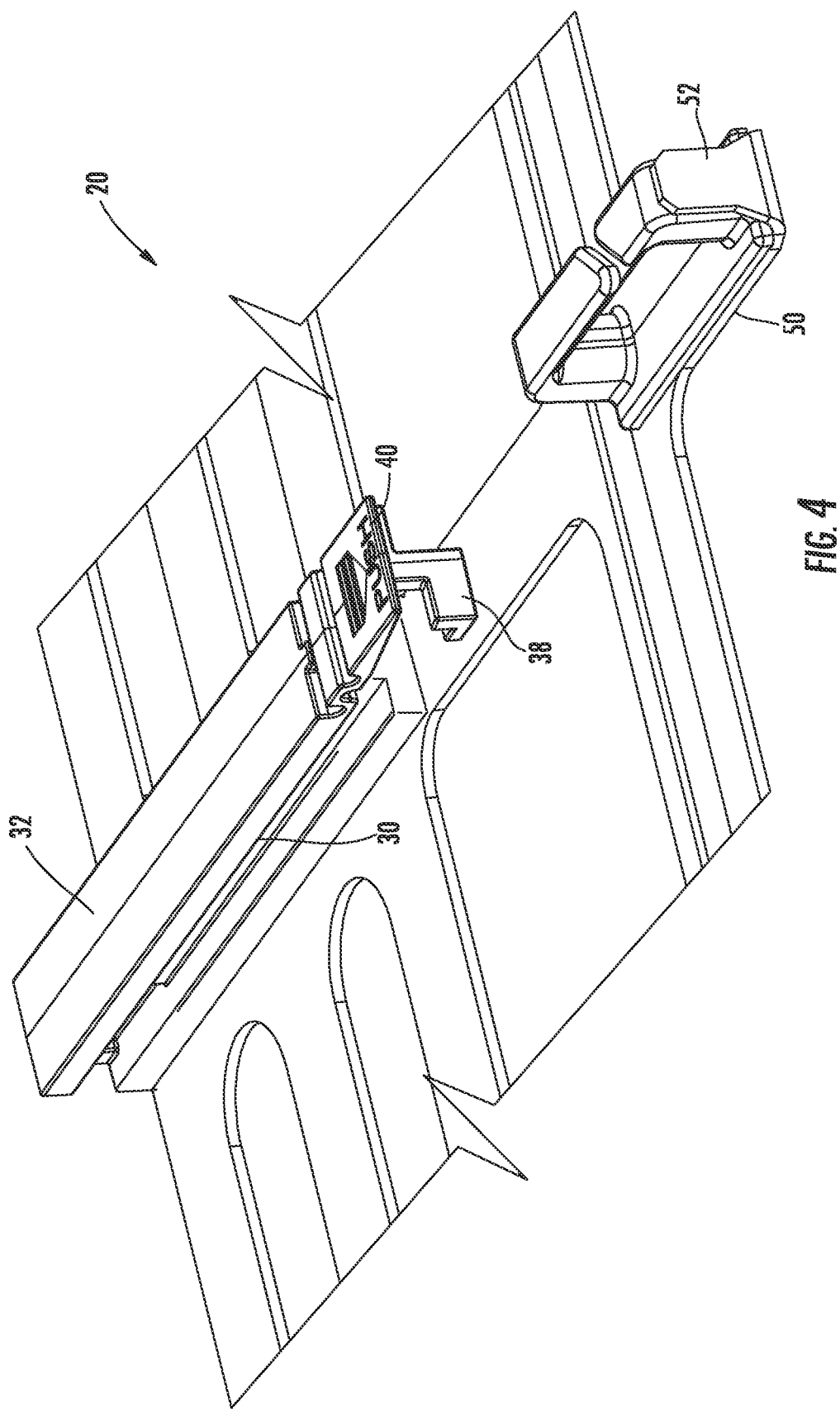
FIG. 4 is a close-up view of the fiber optic equipment tray of FIG. 3 without fiber optic modules installed.
Figure 5:
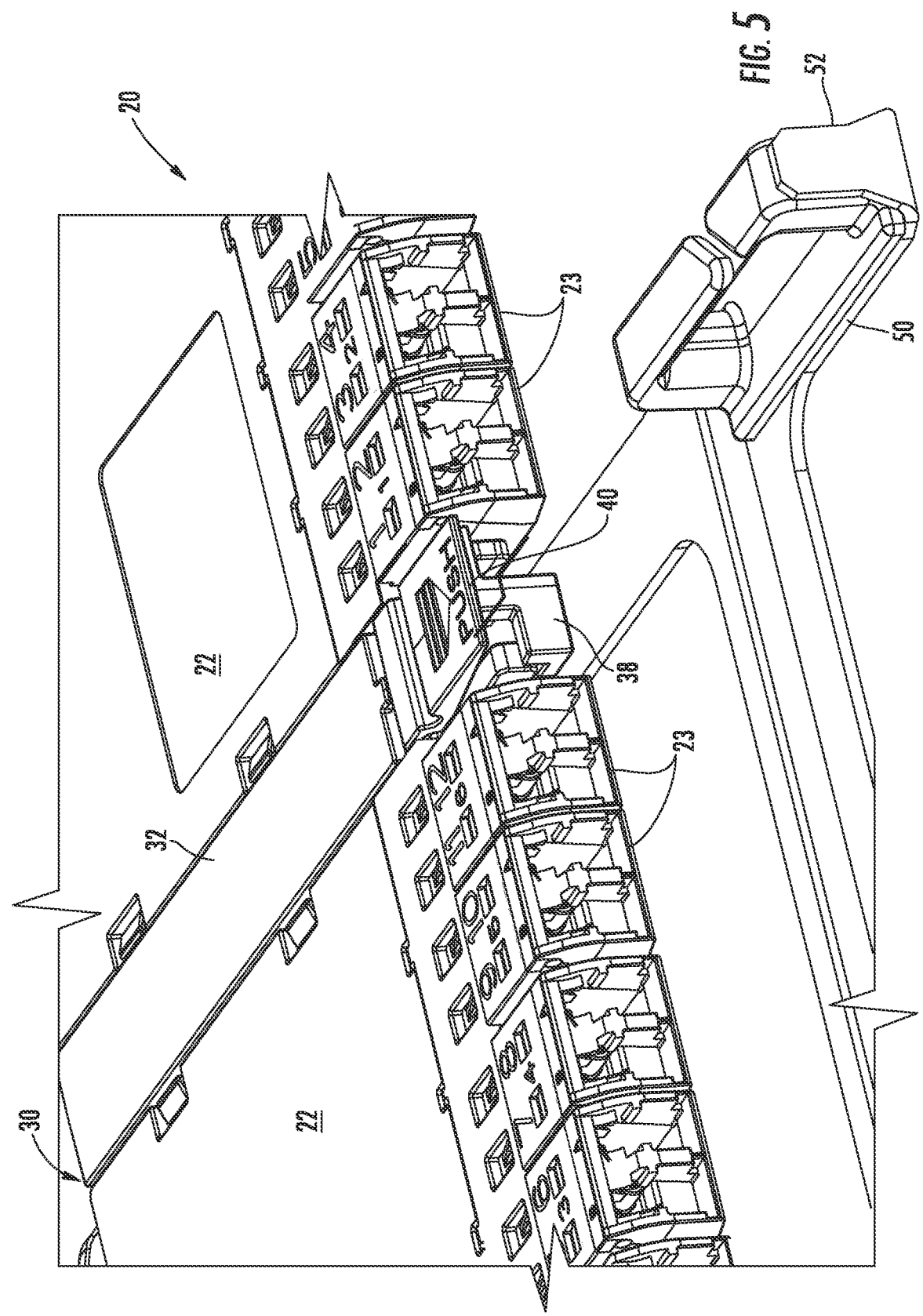
FIG. 5 is a close-up view of the fiber optic equipment tray of FIG. 3 with fiber optic modules installed.
Figure 6:
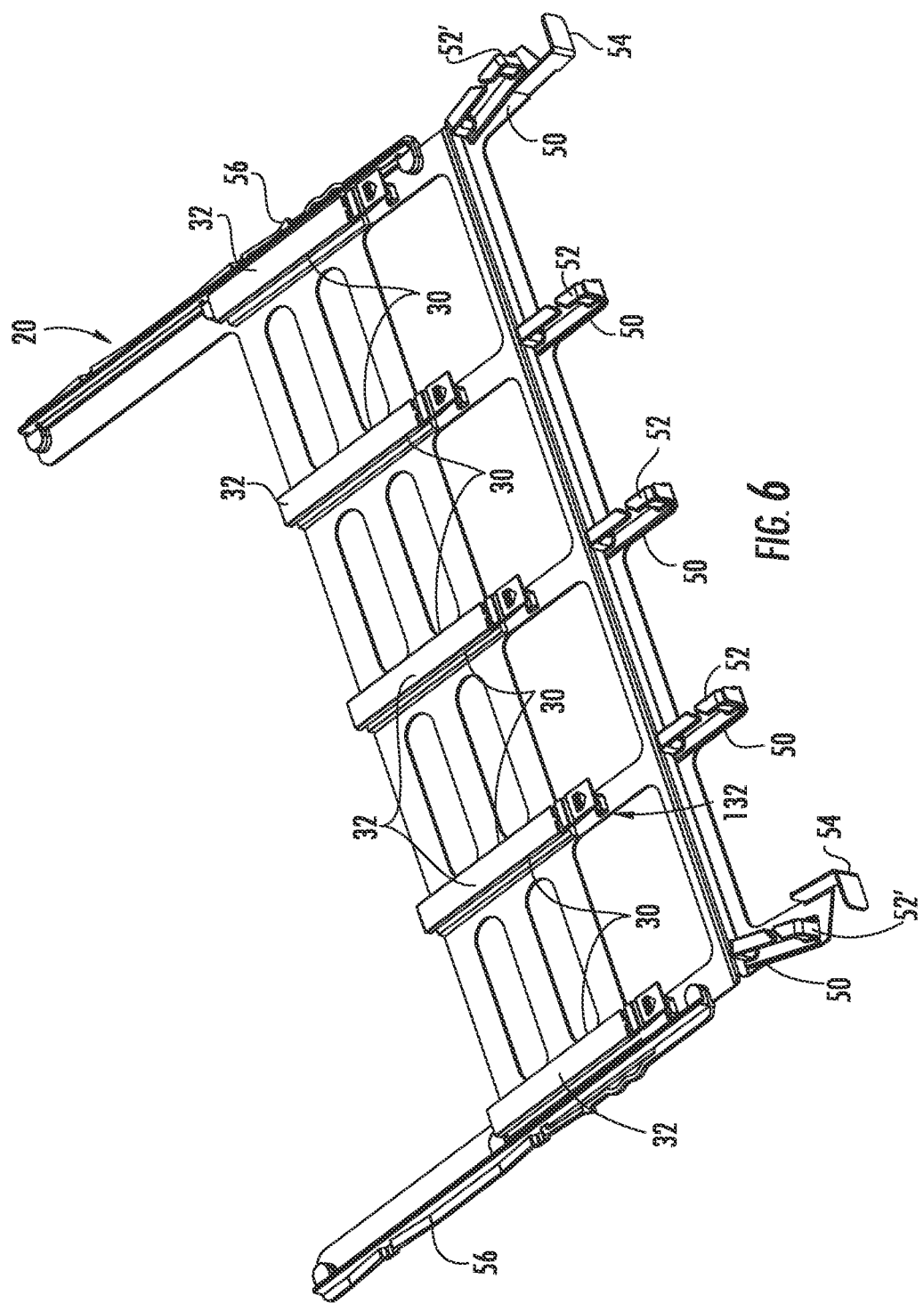
FIG. 6 is a front perspective view of the fiber optic equipment tray of FIG. 3 without fiber optic modules installed.

FIG. 2 is a rear perspective close-up view of the chassis 12 of FIG. 1 with fiber optic modules 22 loaded with fiber optic components 23 and installed in fiber optic equipment trays 20 installed in the chassis 12. Module rails 28A, 28B are disposed on each side of each fiber optic module 22. The module rails 28A, 28B are configured to be inserted within tray channels 30 of module rail guides 32 disposed in the fiber optic equipment tray 20, as illustrated in more detail in FIGS. 3-5. Note that any number of module rail guides 32 can be provided. The fiber optic module 22 can be installed from both a front end 34 and a rear end 36 of the fiber optic equipment tray 20 in this embodiment. If it is desired to install the fiber optic module 22 in the fiber optic equipment tray 20 from the rear end 36, a front end 33 of the fiber optic module 22 can be inserted from the rear end 36 of the fiber optic equipment tray 20. More specifically, the front end 33 of the fiber optic module 22 is inserted into the tray channels 30 of the module rail guides 32. The fiber optic module 22 can then be pushed forward within the tray channels 30 until the fiber optic module 22 reaches the front end 34 of the module rail guides 32. The fiber optic modules 22 can be moved towards the front end 34 until the fiber optic modules 22 reach a stop or locking feature disposed in the front end 34 as will described later in this application. FIG. 6 also illustrates the fiber optic equipment tray 20 without installed fiber optic modules 22 to illustrate the tray channels 30 and other features of the fiber optic equipment tray 20.

Figure 3:
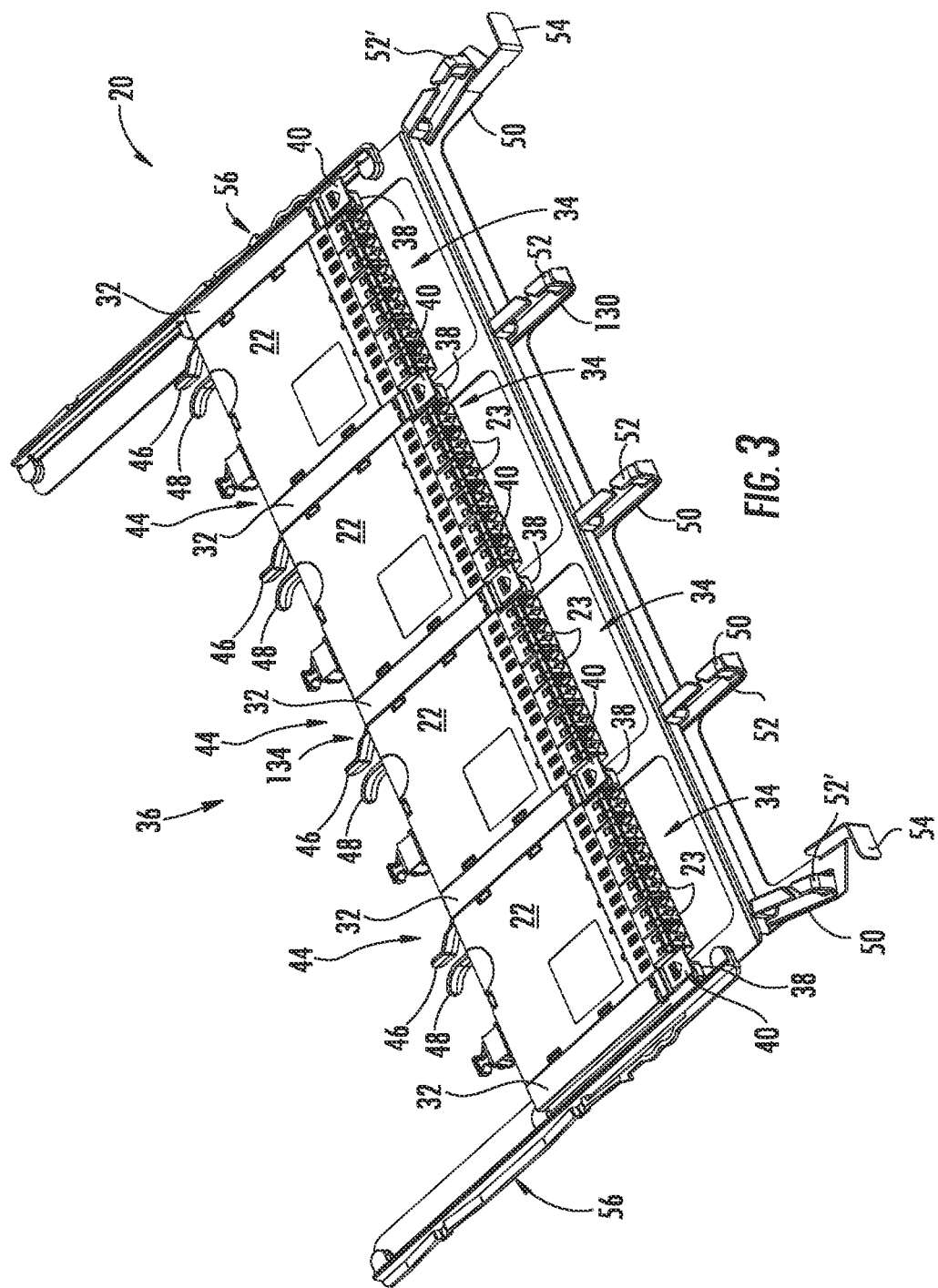
FIG. 3 is a front perspective view of one fiber optic equipment tray with installed fiber optic modules configured to be installed in the chassis of FIG. 1.

The fiber optic module 22 can be locked into place in the fiber optic equipment tray 20 by pushing the fiber optic module 22 forward to the front end 33 of the fiber optic equipment tray 20. A locking feature in the form of a front stop 38 is disposed in the module rail guides 32, as illustrated in FIG. 3 and in more detail in the close-up view in FIG. 4. The front stop 38 prevents the fiber optic module 22 from extending beyond the front end 34, as illustrated in the close-up view of the fiber optic equipment tray 20 with installed fiber optic modules 22 in FIG. 5. When it is desired to remove a fiber optic module 22 from the fiber optic equipment tray 20, a front module tab 40 also disposed in the module rail guides 32 and coupled to the front stop 38 can be pushed downward to engage the front stop 38. As a result, the front stop 38 will move outward away from the fiber optic module 22 such that the fiber optic module 22 is not obstructed from being pulled forward. The fiber optic module 22, and in particular its module rails 28A, 28B (FIG. 2), can be pulled forward along the module rail guides 32 to remove the fiber optic module 22 from the fiber optic equipment tray 20.

The fiber optic module 22 can also be removed from the rear end 36 of the fiber optic equipment tray 20. To remove the fiber optic module 22 from the rear end 36 of the fiber optic equipment tray 20, a latch 44 is disengaged by pushing a lever 46 (see FIGS. 2 and 3; see also, FIGS. 10A and 10B) inward towards the fiber optic module 22 to release the latch 44 from the module rail guide 32. To facilitate pushing the lever 46 inward towards the fiber optic module 22, a finger hook 48 is provided adjacent to the lever 46 so the lever 46 can easily be squeezed into the finger hook 48 by a thumb and index finger.

With continuing reference to FIG. 3-6, the fiber optic equipment tray 20 may also contain extension members 50. Routing guides 52 may be conveniently disposed on the extension members 50 to provide routing for optical fibers or fiber optic cables connected to fiber optic components 23 disposed in the fiber optic modules 22 (FIG. 3). The routing guides 52' on the ends of the fiber optic equipment tray 20 may be angled with respect to the module rail guides 32 to route optical fibers or fiber optic cables at an angle to the sides of the fiber optic equipment tray 20. Pull tabs 54 may also be connected to the extension members 50 to provide a means to allow the fiber optic equipment tray 20 to easily be pulled out from and pushed into the chassis 12.

Figure 7:
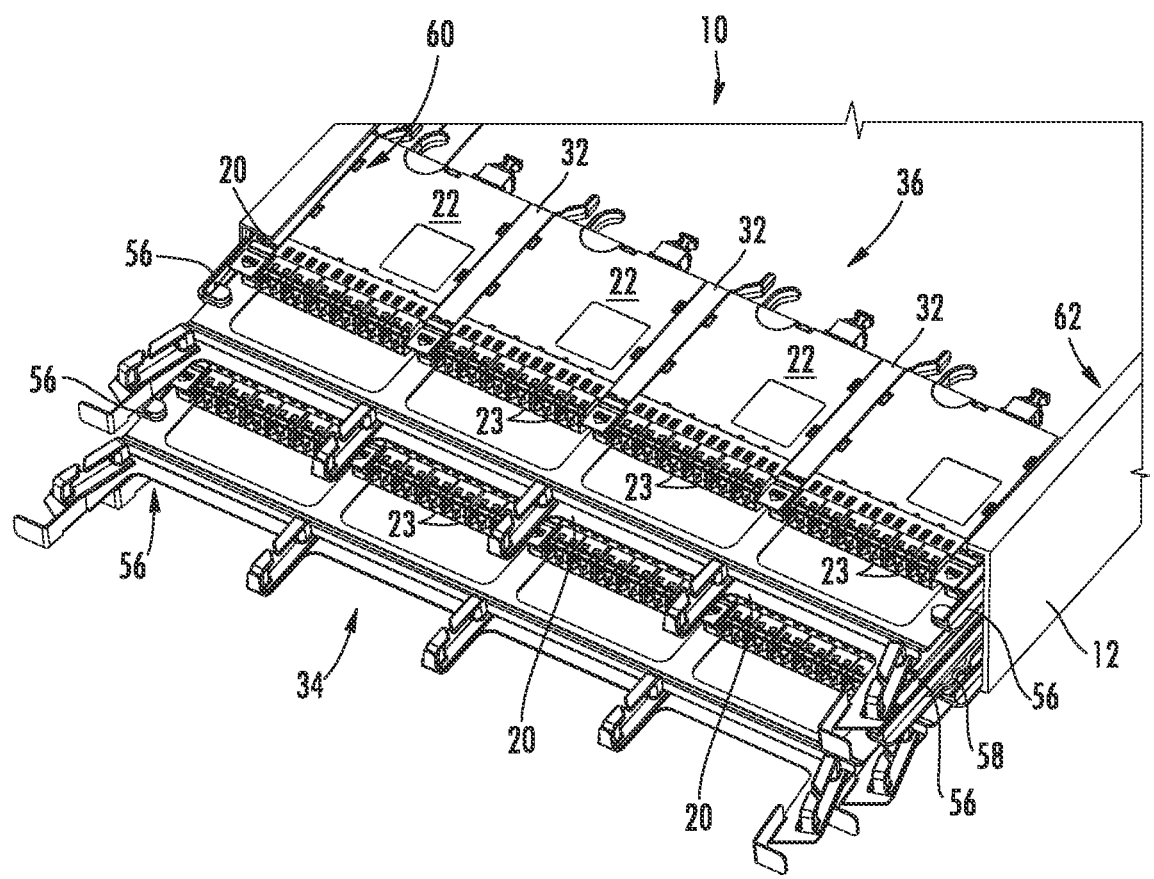
FIG. 7 is a front perspective view of fiber optic equipment trays supporting fiber optic modules with one fiber optic equipment tray extended out from the chassis of FIG. 1.

As illustrated in FIGS. 3 and 6, the fiber optic equipment tray 20 also contains tray rails 56. The tray rails 56 are configured to be received in tray guides 58 disposed in the chassis 12 to retain and allow the fiber optic equipment trays 20 to move in and out of the chassis 12, as illustrated in FIG. 7. More detail regarding the tray rails 56 and their coupling to the tray guides 58 in the chassis 12 is discussed below with regard to FIGS. 8 and 9A-9B. The fiber optic equipment trays 20 can be moved in and out of the chassis 12 by their tray rails 56 moving within the tray guides 58. In this manner, the fiber optic equipment trays 20 can be independently movable about the tray guides 58 in the chassis 12. FIG. 7 illustrates a front perspective view of one fiber optic equipment tray 20 pulled out from the chassis 12 among three (3) fiber optic equipment trays 20 disposed within the tray guides 58 of the chassis 12. The tray guides 58 may be disposed on both a left side end 60 and a right side end 62 of the fiber optic equipment tray 20. The tray guides 58 are installed opposite and facing each other in the chassis 12 to provide complementary tray guides 58 for the tray rails 56 of the fiber optic equipment trays 20 received therein. If it is desired to access a particular fiber optic equipment tray 20 and/or a particular fiber optic module 22 in a fiber optic equipment tray 20, the pull tab 54 of the desired fiber optic equipment tray 20 can be pulled forward to cause the fiber optic equipment tray 20 to extend forward out from the chassis 12, as illustrated in FIG. 7. The fiber optic module 22 can be removed from the fiber optic equipment tray 20 as previously discussed. When access is completed, the fiber optic equipment tray 20 can be pushed back into the chassis 12 wherein the tray rails 56 move within the tray guides 58 disposed in the chassis 12.

FIG. 8 is a left perspective view of an exemplary tray guide 58 disposed in the chassis 12 of FIG. 1. As discussed above, the tray guides 58 are configured to receive fiber optic equipment trays 20 supporting one or more fiber optic modules 22 in the chassis 12. The tray guides 58 allow the fiber optic equipment trays 20 to be pulled out from the chassis 12, as illustrated in FIG. 7. The tray guide 58 in this embodiment is comprised of a guide panel 64. The guide panel 64 may be constructed out of any material desired, including but not limited to a polymer or metal. The guide panel 64 contains a series of apertures 66 to facilitate attachment of the guide panel 64 to the chassis 12, as illustrated in FIG. 8. Guide members 68 are disposed in the guide panel 64 and configured to receive the tray rail 56 of the fiber optic equipment tray 20. Three (3) guide members 68 are disposed in the guide panel 64 in the embodiment of FIG. 8 to be capable of receiving up to three (3) tray rails 56 of three (3) fiber optic equipment trays 20 in a 1-U space. However, any number of guide members 68 desired may be provided in the tray guide 58 to cover sizes less than or greater than a 1-U space. In this embodiment, the guide members 68 each include guide channels 70 configured to receive and allow tray rails 56 to move along the guide channels 70 for translation of the fiber optic equipment trays 20 about the chassis 12.

Leaf springs 72 are disposed in each of the guide members 68 of the tray guide 58 and are each configured to provide stopping positions for the tray rails 56 during movement of the fiber optic equipment tray 20 in the guide members 68. The leaf springs 72 each contain detents 74 that are configured to receive protrusions 76 (FIG. 9A-9D) disposed in the tray rails 56 to provide stopping or resting positions. The tray rails 56 contain mounting platforms 75 that are used to attach the tray rails 56 to the fiber optic equipment trays 20. It may be desirable to provide stopping positions in the tray guide 56 to allow the fiber optic equipment trays 20 to have stopping positions when moved in and out of the chassis 12. Two (2) protrusions 76 in the tray rail 56 are disposed in two (2) detents 74 in the tray guide 58 at any given time. When the fiber optic equipment tray 20 is fully retracted into the chassis 12 in a first stopping position, the two (2) protrusions 76 of the tray rail 56 are disposed in the one detent 74 adjacent a rear end 77 of the guide channel 70 and the middle detent 74 disposed between the rear end 77 and a front end 78 of the guide channel 70. When the fiber optic equipment tray 20 is pulled out from the chassis 12, the two (2) protrusions 76 of the tray rail 56 are disposed in the one detent 74 adjacent the front end 78 of the guide channel 70 and the middle detent 74 disposed between the rear end 77 and the front end 78 of the guide channel 70.

Figure 9A:
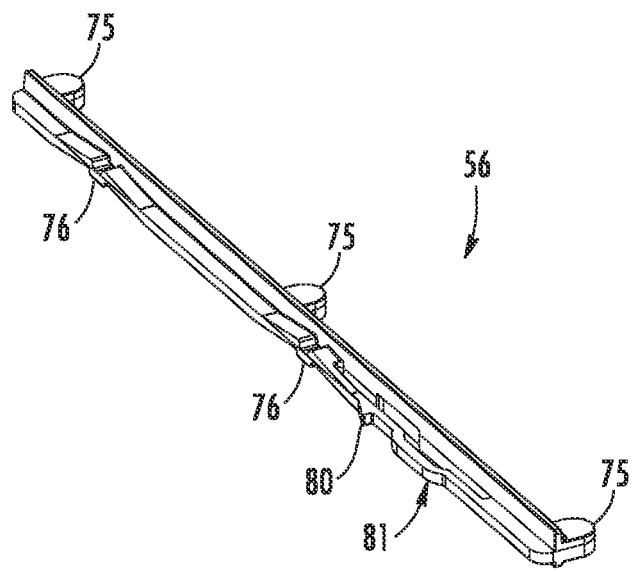
FIGS. 9A and 9B are perspective and top views, respectively, of an exemplary tray rail disposed on each side of the fiber optic equipment tray of FIG. 3 and configured to be received in the chassis of FIG. 1 by the tray guide of FIG. 8.
Figure 9B:
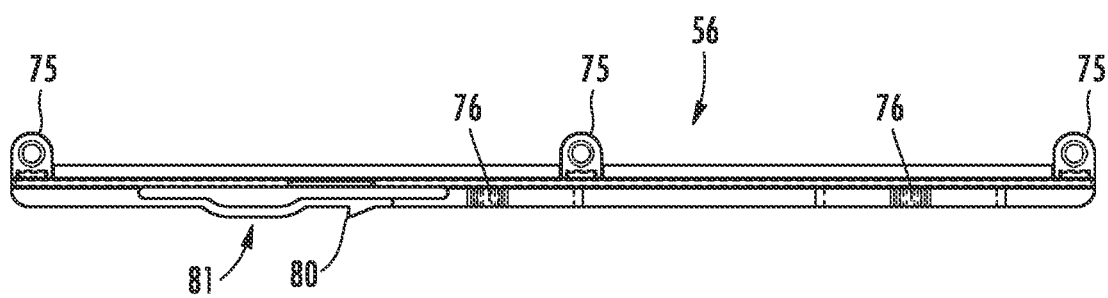

As the tray rail 56 is pulled within the guide channel 70, a protrusion 80 disposed in the tray rail 56 and illustrated in FIGS. 9A and 9B is biased to pass over transition members 82 disposed between the leaf springs 72, as illustrated in FIG. 8. The protrusion 80 is provided in a leaf spring 81 disposed in the tray rail 56, as illustrated in FIGS. 9A and 9B. The transition members 82 have inclined surfaces 84 that allow the protrusion 80 to pass over the transition members 82 as the fiber optic equipment tray 20 is being translated with the guide channel 70. As the protrusion 80 contains the transition members 82, the force imparted onto the protrusion 80 causes the leaf spring 81 to bend inward to allow the protrusion 80 to pass over the transition member 82. To prevent the tray rail 56 and thus the fiber optic equipment tray 20 from being extended beyond the front end 78 and rear end 77 of the guide channel 70, stopping members 86 are disposed at the front end 78 and rear end 77 of the guide channel 70. The stopping members 86 do not have an inclined surface; thus the protrusion 80 in the tray rail 56 abuts against the stopping member 86 and is prevented from extending over the stopping member 86 and outside of the front end 78 of the guide channel 70.

Against the background of the above disclosed embodiment of a 1-U chassis 12 and fiber optic equipment trays 20 and fiber optic modules 22 that can installed therein, the form factor of the fiber optic module 22 will now be described. The form factor of the fiber optic module 22 allows a high density of fiber optic components 23 to be disposed within a certain percentage area of the front of the fiber optic module 22 thus supporting a particular fiber optic connection density and bandwidth for a given type of fiber optic component 23. When this fiber optic module 22 form factor is combined with the ability to support up to twelve (12) fiber optic modules 22 in a 1-U space, as described by the exemplary chassis 12 example above, a higher fiber optic connection density and bandwidth is supported and possible.

Figure 10A:
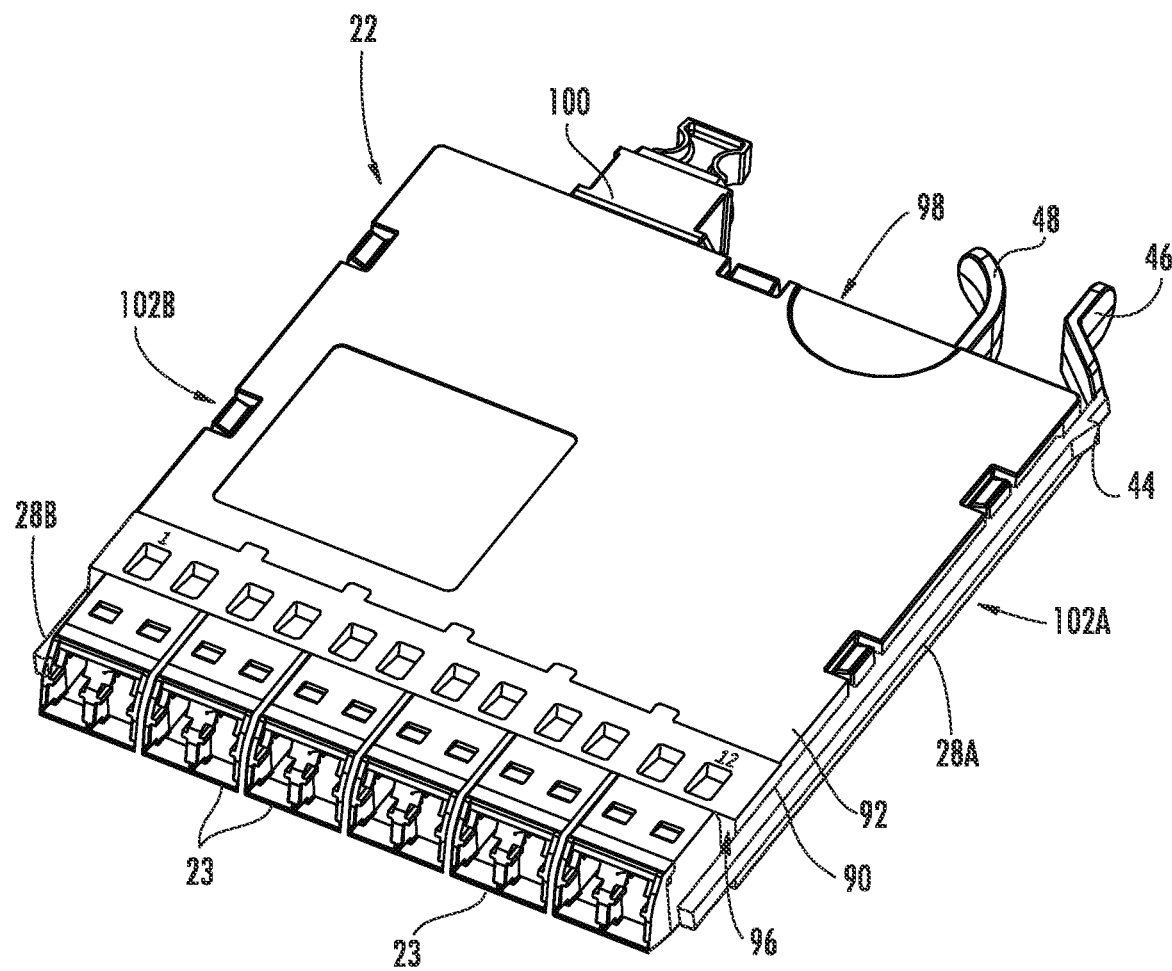
FIGS. 10A and 10B are front right and left perspective views, respectively, of an exemplary fiber optic module that can be disposed in the fiber optic equipment trays of FIG. 3.
Figure 10B:
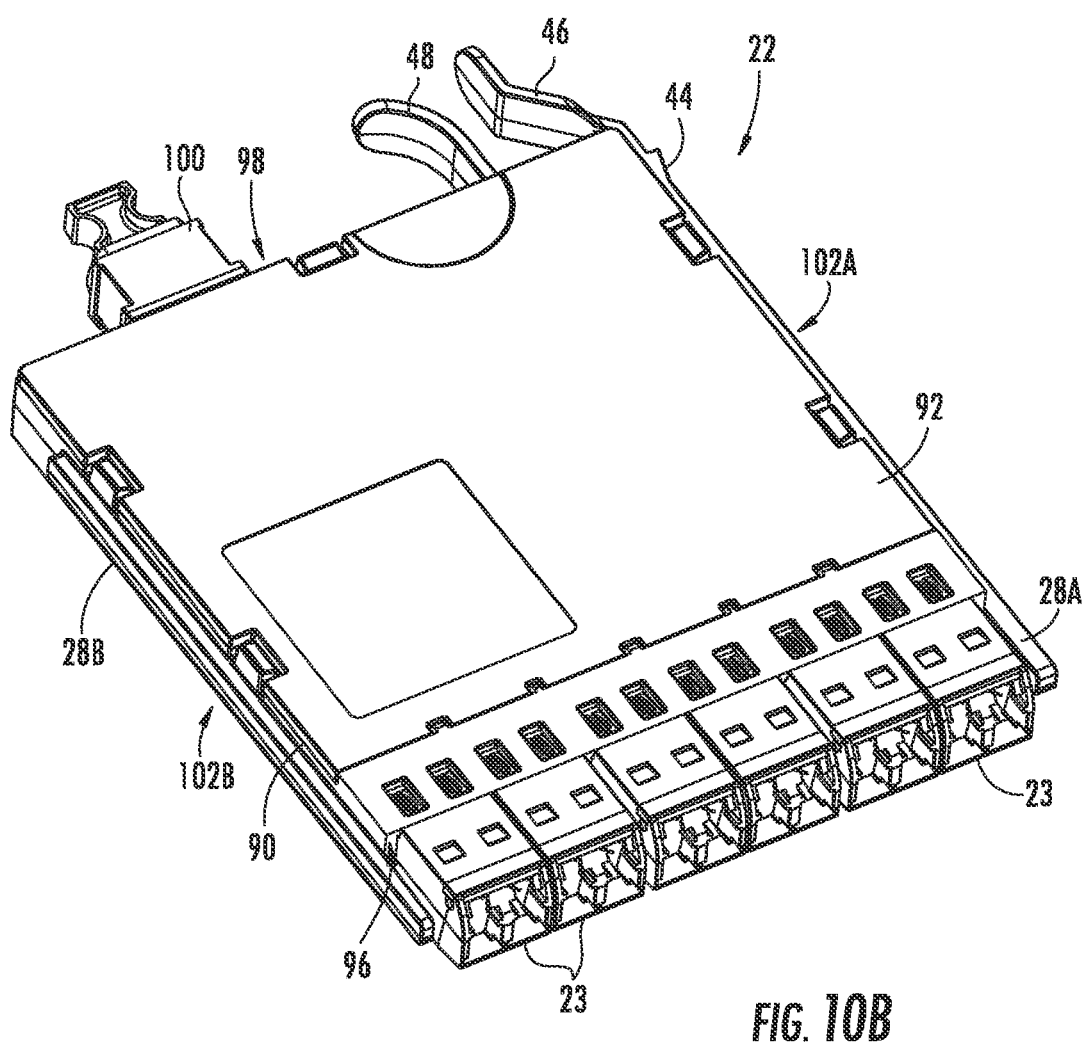

In this regard, FIGS. 10A and 10B are right and left perspective views of the exemplary fiber optic module 22. As discussed above, the fiber optic module 22 can be installed in the fiber optic equipment trays 20 to provide fiber optic connections in the chassis 12. The fiber optic module 22 is comprised of a main body 90 receiving a cover 92. An internal chamber 94 (FIG. 11) disposed inside the main body 90 and the cover 92 and is configured to receive or retain optical fibers or a fiber optic cable harness, as will be described in more detail below. The main body 90 is disposed between a front side 96 and a rear side 98 of the main body 90. Fiber optic components 23 can be disposed through the front side 96 of the main body 90 and configured to receive fiber optic connectors connected to fiber optic cables (not shown). In this example, the fiber optic components 23 are duplex LC fiber optic adapters that are configured to receive and support connections with duplex LC fiber optic connectors. However, any fiber optic connection type desired can be provided in the fiber optic module 22. The fiber optic components 23 are connected to a fiber optic component 100 disposed through the rear side 98 of the main body 90. In this manner, a connection to the fiber optic component 23 creates a fiber optic connection to the fiber optic component 100. In this example, the fiber optic component 100 is a multi-fiber MPO fiber optic adapter equipped to establish connections to multiple optical fibers (e.g., either twelve (12) or twenty-four (24) optical fibers). The fiber optic module 22 may also manage polarity between the fiber optic components 23, 100.

The module rails 28A, 28B are disposed on each side 102A, 102B of the fiber optic module 22. As previously discussed, the module rails 28A, 28B are configured to be inserted within the module rail guides 32 in the fiber optic equipment tray 20, as illustrated in FIG. 3. In this manner, when it is desired to install a fiber optic module 22 in the fiber optic equipment tray 20, the front side 96 of the fiber optic module 22 can be inserted from either the front end 33 or the rear end 36 of the fiber optic equipment tray 20, as previously discussed.

Figure 11:
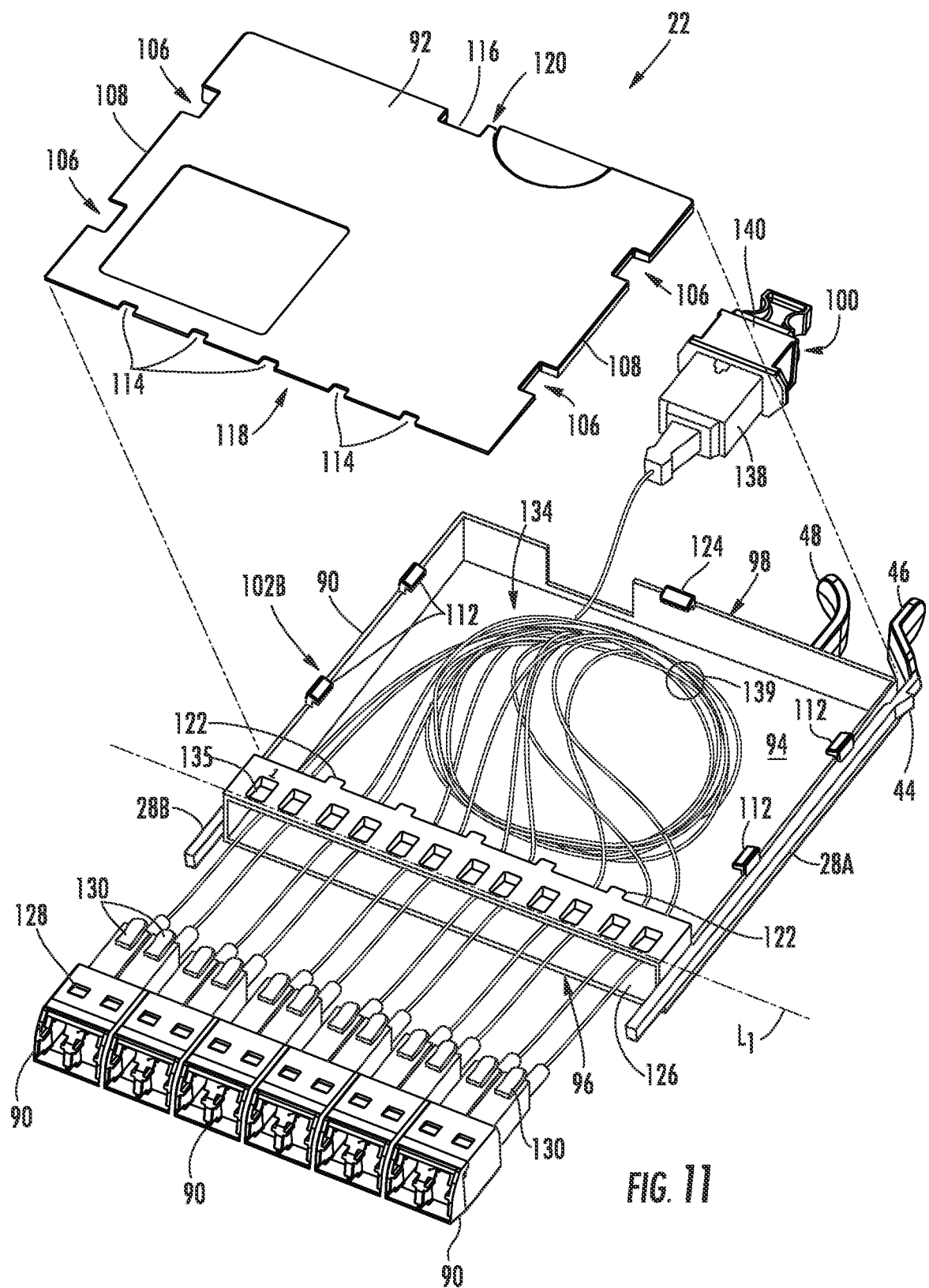
FIG. 11 is a perspective, exploded view of the fiber optic module in FIGS. 10A and 10B.
Figure 12:
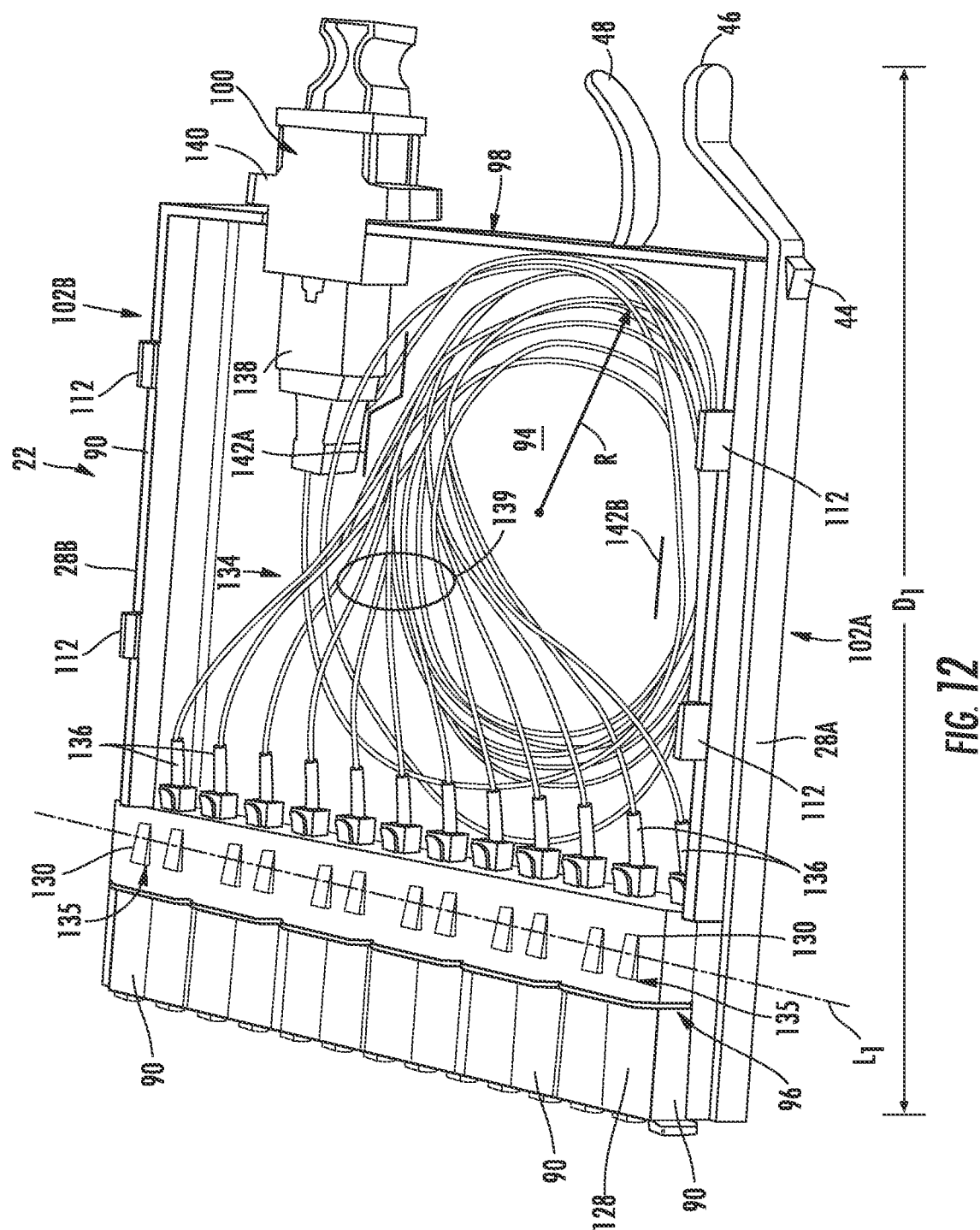
FIG. 12 is a perspective top view of the fiber optic module of FIG. 11 with the cover removed and showing a fiber optic harness installed therein.

FIG. 11 illustrates the fiber optic module 22 in an exploded view with the cover 92 of the fiber optic module 22 removed to illustrate the internal chamber 94 and other internal components of the fiber optic module 22. FIG. 12 illustrates the fiber optic module 22 assembled, but without the cover 92 installed on the main body 90. The cover 92 includes notches 106 disposed in sides 108, 110 that are configured to interlock with protrusions 112 disposed on the sides 102A, 102B of the main body 90 of the fiber optic modules 22 when the cover 92 is attached to the main body 90 to secure the cover 92 to the main body 90. The cover 92 also contains notches 114, 116 disposed on a front side 118 and rear side 120, respectively, of the cover 92. The notches 114, 116 are configured to interlock with protrusions 122, 124 disposed in the front side 96 and the rear end 98, respectively, of the main body 90 when the cover 92 is attached to the main body 90 to also secure the cover 92 to the main body 90. FIG. 12 does not show protrusions 122, 124.

With continuing reference to FIG. 11, the fiber optic components 23 are disposed through a front opening 126 disposed along a longitudinal axis $L_1$ in the front side 96 of the main body 90. In this embodiment, the fiber optic components 23 are duplex LC adapters 128, which support single or duplex fiber connections and connectors. The duplex LC adapters 128 in this embodiment contain protrusions 130 that are configured to engage with orifices 135 disposed on the main body 90 to secure the duplex LC adapters 128 in the main body 90 in this embodiment. A cable harness 134 is disposed in the internal chamber 94 with fiber optic connectors 136, 138 disposed on each end of optical fibers 139 connected to the duplex LC adapters 128 and the fiber optic component 100 disposed in the rear side 98 of the main body 90. The fiber optic component 100 in this embodiment is a twelve (12) fiber MPO fiber optic adapter 140 in this embodiment. Two vertical members 142A, 142B are disposed in the internal chamber 94 of the main body 90, as illustrated in FIG. 12, to retain the looping of the optical fibers 139 of the cable harness 134. The vertical members 142A, 142B and the distance therebetween are designed to provide a bend radius R in the optical fibers 139 no greater than forty (40) mm and preferably twenty-five (25) mm or less in this embodiment.

Figure 13:
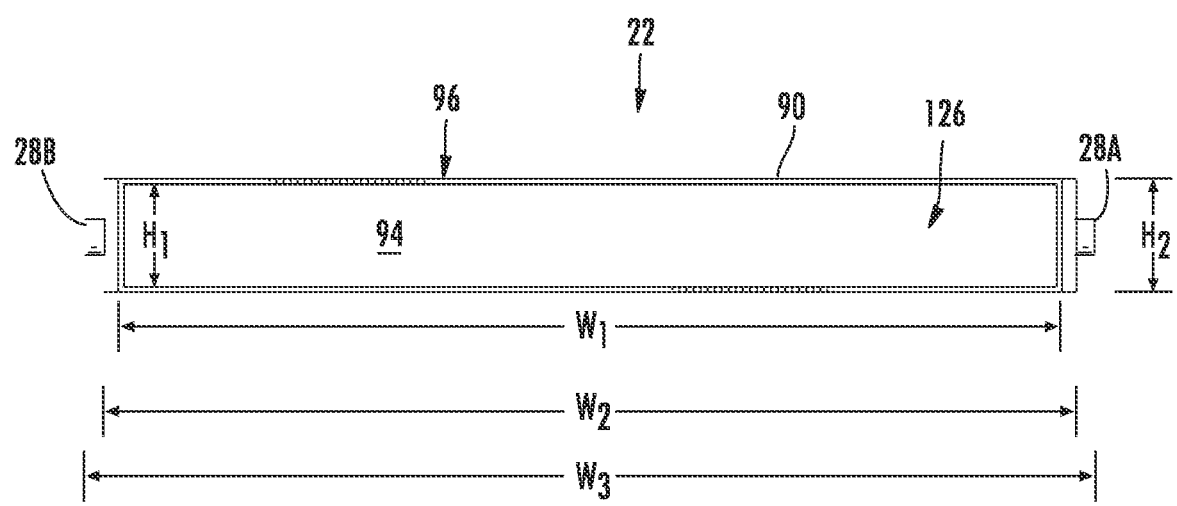
FIG. 13 is a front view of the fiber optic module of FIG. 11 without fiber optic components installed.

FIG. 13 illustrates a front view of the fiber optic module 22 without loaded fiber optic components 23 in the front side 96 to further illustrate the form factor of the fiber optic module 22. As previously discussed, the front opening 126 is disposed through the front side 96 of the main body 90 to receive the fiber optic components 23. The greater the width $W_1$ of the front opening 126, the greater the number of fiber optic components 23 that may be disposed in the fiber optic module 22. Greater numbers of fiber optic components 23 equates to more fiber optic connections, which supports higher fiber optic connectivity and bandwidth. However, the larger the width $W_1$ of the front opening 126, the greater the area required to be provided in the chassis 12 for the fiber optic module 22. Thus, in this embodiment, the width W1 of the front opening 126 is design to be at least eighty-five percent (85%) of the width $W_2$ of the front side 96 of the main body 90 of the fiber optic module 22. The greater the percentage of the width $W_1$ to width $W_2$, the larger the area provided in the front opening 126 to receive fiber optic components 23 without increasing width W2. Width W3, the overall width of the fiber optic module 22, may be 86.6 mm or 3.5 inches in this embodiment. The overall depth D1 of the fiber optic module 22 is 113.9 mm or 4.5 inches in this embodiment (FIG. 12). As previously discussed, the fiber optic module 22 is designed such that four (4) fiber optic modules 22 can be disposed in a 1-U width space in the fiber optic equipment tray 20 in the chassis 12. The width of the chassis 12 is designed to accommodate a 1-U space width in this embodiment.

With three (3) fiber optic equipment trays 20 disposed in the 1-U height of the chassis 12, a total of twelve (12) fiber optic modules 22 can be supported in a given 1-U space. Supporting up to twelve (12) fiber optic connections per fiber optic module 22 as illustrated in the chassis 12 in FIG. 1 equates to the chassis 12 supporting up to one hundred forty-four (144) fiber optic connections, or seventy-two (72) duplex channels, in a 1-U space in the chassis 12 (i.e., twelve (12) fiber optic connections X twelve (12) fiber optic modules 22 in a 1-U space). Thus, the chassis 12 is capable of supporting up to one hundred forty-four (144) fiber optic connections in a 1-U space by twelve (12) simplex or six (6) duplex fiber optic adapters being disposed in the fiber optic modules 22. Supporting up to ten (10) fiber optic connections per fiber optic module 22 equates to the chassis 12 supporting one hundred twenty (120) fiber optic connections, or sixty (60) duplex channels, in a 1-U space in the chassis 12 (i.e., ten (10) fiber optic connections X twelve (12) fiber optic modules 22 in a 1-U space). Thus, the chassis 12 is also capable of supporting up to one hundred twenty (120) fiber optic connections in a 1-U space by ten (10) simplex or five (5) duplex fiber optic adapters being disposed in the fiber optic modules 22.

This embodiment of the chassis 12 and fiber optic module 22 disclosed herein can support a fiber optic connection density within a 1-U space wherein the area occupied by the fiber optic component 23 in twelve (12) fiber optic modules 22 in a 1-U space represents at least fifty percent (50%) of the total fiber optic equipment rack 14 area in a 1-U space (see FIG. 1). In the case of twelve (12) fiber optic modules 22 provided in a 1-U space in the chassis 12, the 1-U space is comprised of the fiber optic components 23 occupying at least seventy-five percent (75%) of the area of the front side 96 of the fiber optic module 22.

Two (2) duplexed optical fibers to provide one (1) transmission/reception pair can allow for a data rate of ten (10) Gigabits per second in half-duplex mode or twenty (20) Gigabits per second in full-duplex mode. Thus, with the above-described embodiment, providing at least seventy-two (72) duplex transmission and reception pairs in a 1-U space employing at least one duplex or simplex fiber optic component can support a data rate of at least seven hundred twenty (720) Gigabits per second in half-duplex mode in a 1-U space or at least one thousand four hundred forty (1440) Gigabits per second in a 1-U space in full-duplex mode if employing a ten (10) Gigabit transceiver. This configuration can also support at least six hundred (600) Gigabits per second in half-duplex mode in a 1-U space and at least one thousand two hundred (1200) Gigabits per second in full-duplex mode in a 1-U space, respectively, if employing a one hundred (100) Gigabit transceiver. This configuration can also support at least four hundred eighty (480) Gigabits per second in half-duplex mode in a 1-U space and nine hundred sixty (960) Gigabits per second in full duplex mode in a 1-U space, respectively, if employing a forty (40) Gigabit transceiver. At least sixty (60) duplex transmission and reception pairs in a 1-U space can allow for a data rate of at least six hundred (600) Gigabits per second in a 1-U space in half-duplex mode or at least one thousand two hundred (1200) Gigabits per second in a 1-U space in full-duplex mode when employing a ten (10) Gigabit transceiver. At least forty nine (49) duplex transmission and reception pairs in a 1-U space can allow for a data rate of at least four hundred eighty-one (481) Gigabits per second in half-duplex mode or at least nine hundred sixty-two (962) Gigabits per second in a 1-U space in full-duplex mode when employing a ten (10) Gigabit transceiver.

The width W1 of front opening 126 could be designed to be greater than eighty-five percent (85%) of the width $W_2$ of the front side 96 of the main body 90 of the fiber optic module 22. For example, the width $W_1$ could be designed to be between ninety percent (90%) and ninety-nine percent (99%) of the width $W_2$. As an example, the width W1 could be less than ninety (90) mm. As another example, the width W1 could be less than eighty-five (85) mm or less than eighty (80) mm. For example, the width W1 may be eighty-three (83) mm and width $W_2$ may be eighty-five (85) mm, for a ratio of width $W_1$ to width $W_2$ of 97.6%. In this example, the front opening 126 may support twelve (12) fiber optic connections in the width $W_1$ to support a fiber optic connection density of at least one fiber optic connection per 7.0 mm of width $W_1$ of the front opening 126. Further, the front opening 126 of the fiber optic module 22 may support twelve (12) fiber optic connections in the width $W_1$ to support a fiber optic connection density of at least one fiber optic connection per 6.9 mm of width $W_1$ of the front opening 126.

Further as illustrated in FIG. 13, height H1 of front opening 126 could be designed to be at least ninety percent (90%) of height $H_2$ of the front side 96 of the main body 90 of the fiber optic module 22. In this manner, the front opening 126 has sufficient height to receive the fiber optic components 23, and such that three (3) fiber optic modules 22 can be disposed in a 1-U space height. As an example, height H1 could be twelve (12) mm or less or ten (10) mm or less. As an example, height $H_1$ could be ten (10) mm and height $H_2$ could be eleven (11) mm (or 7/16 inches), for a ratio of height $H_1$ to width 112 of 90.9%.

Figure 14:
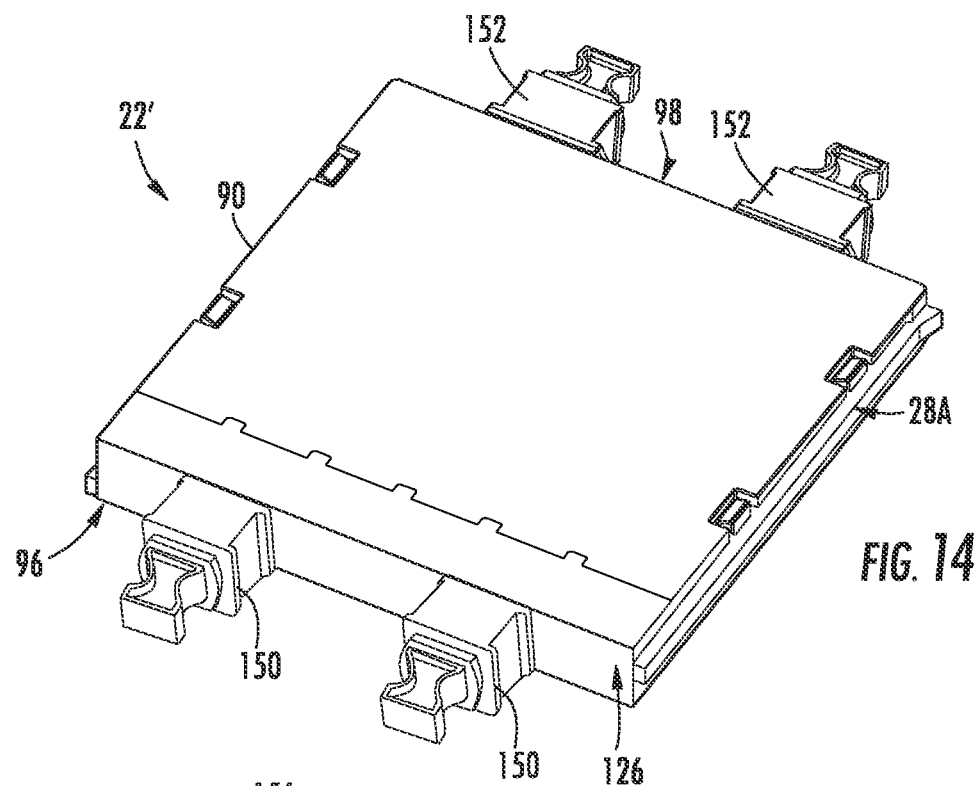
FIG. 14 is a front right perspective view of another alternate fiber optic module that supports twelve (12) fiber MPO fiber optic components and which can be installed in the fiber optic equipment tray of FIG. 3.

Alternate fiber optic modules with alternative fiber optic connection densities are possible. FIG. 14 is a front perspective view of an alternate fiber optic module 22' that can be installed in the fiber optic equipment tray 20 of FIG. 1. The form factor of the fiber optic module 22' is the same as the form factor of the fiber optic module 22 illustrated in FIGS. 1-13. However, in the fiber optic module 22' of FIG. 14, two (2) MPO fiber optic adapters 150 are disposed through the front opening 126 of the fiber optic module 22'. The MPO fiber optic adapters 150 are connected to two (2) MPO fiber optic adapters 152 disposed in the rear side 98 of the main body 90 of the fiber optic module 22'. Thus, if the MPO fiber optic adapters 150 each support twelve (12) fibers, the fiber optic module 22' can support up to twenty-four (24) fiber optic connections.

Thus, in this example, if up to twelve (12) fiber optic modules 22' are provided in the fiber optic equipment trays 20 of the chassis 12, up to two hundred eighty-eight (288) fiber optic connections can be supported by the chassis 12 in a 1-U space. Further in this example, the front opening 126 of the fiber optic module 22' may support twenty-four (24) fiber optic connections in the width W1 (FIG. 13) to support a fiber optic connection density of at least one fiber optic connection per 3.4-3.5 mm of width $W_1$ of the front opening 126. It should be understood that the discussion with regard to modules may also apply to a panel. For purposes of this disclosure, a panel may have one or more adapter on one side and no adapters on the opposite side.

Thus, with the above-described embodiment, providing at least two-hundred eighty-eight (288) duplex transmission and reception pairs in a 1-U space employing at least one twelve (12) fiber MPO fiber optic components can support a data rate of at least two thousand eight hundred eighty (2880) Gigabits per second in half-duplex mode in a 1-U space or at least five thousand seven hundred sixty (5760) Gigabits per second in a 1-U space in full-duplex mode if employing a ten (10) Gigabit transceiver. This configuration can also support at least four thousand eight hundred (4800) Gigabits per second in half-duplex mode in a 1-U space and nine thousand six hundred (9600) Gigabits per second in full-duplex mode in a 1-U space, respectively, if employing a one hundred (100) Gigabit transceiver. This configuration can also support at least one thousand nine hundred twenty (1920) Gigabits per second in half-duplex mode in a 1-U space and three thousand eight hundred forty (3840) Gigabits per second in full-duplex mode in a 1-U space, respectively, if employing a forty (40) Gigabit transceiver. This configuration also supports a data rate of at least four thousand three hundred twenty-two (4322) Gigabits per second in full-duplex mode in a 1-U space when employing a ten (10) Gigabit transceiver employing at least one twelve (12) fiber MPO fiber optic component, or two thousand one hundred sixty-one (2161) Gigabits per second in full-duplex mode in a 1-U space when employing a ten (10) Gigabit transceiver employing at least one twenty-four (24) fiber MPO fiber optic component.

If the MPO fiber optic adapters 150 in the fiber optic module 22' support twenty-four (24) fibers, the fiber optic module 22' can support up to forty-eight (48) fiber optic connections. Thus, in this example, if up to twelve (12) fiber optic modules 22' are provided in the fiber optic equipment trays 20 of the chassis 12, up to five hundred seventy-six (576) fiber optic connections can be supported by the chassis 12 in a 1-U space if the fiber optic modules 22' are disposed in the fiber optic equipment trays 20. Further, in this example, the front opening 126 of the fiber optic module 22' may support up to forty-eight (48) fiber optic connections in the width W1 to support a fiber optic connection density of at least one fiber optic connection per 1.7 mm of width $W_1$ of the front opening 126.

Figure 15:
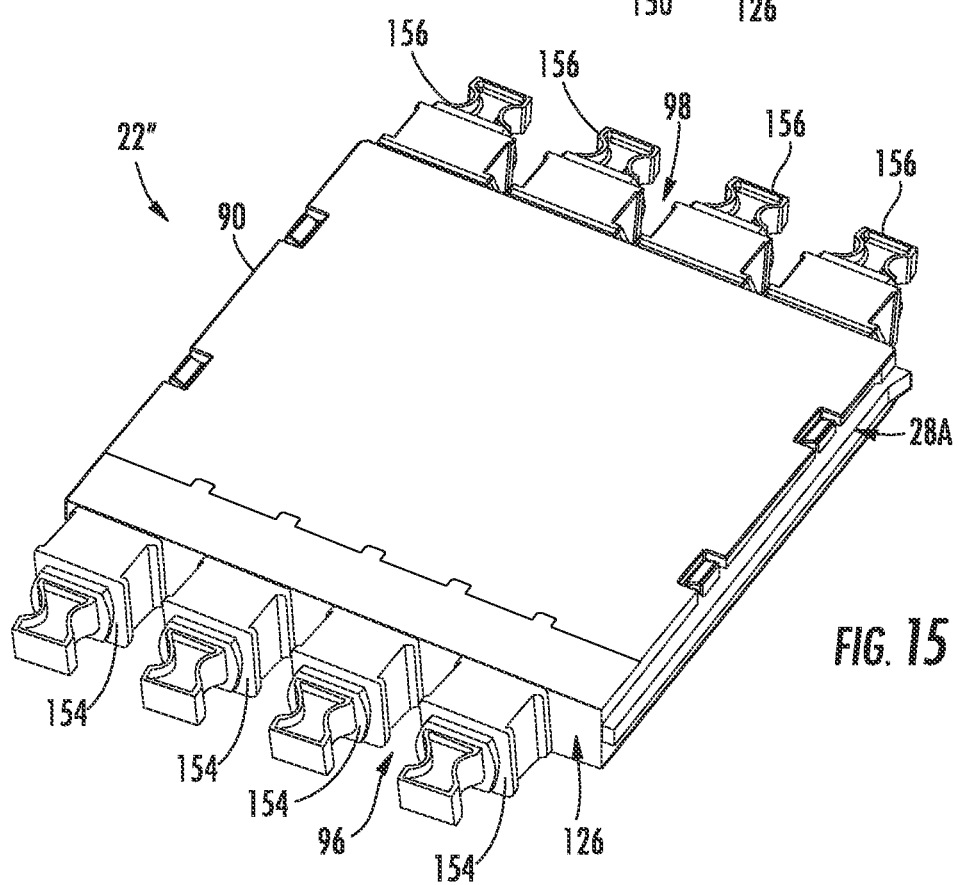
FIG. 15 is front right perspective view of another alternate fiber optic module that supports twenty-four (24) fiber MPO fiber optic components and which can be installed in the fiber optic equipment tray of FIG. 3.

FIG. 15 is a front perspective view of another alternate fiber optic module 22" that can be installed in the fiber optic equipment tray 20 of FIG. 1. The form factor of the fiber optic module 22" is the same as the form factor of the fiber optic module 22 illustrated in FIGS. 1-13. However, in the fiber optic module 22", four (4) MPO fiber optic adapters 154 are disposed through the front opening 126 of the fiber optic module 22". The MPO fiber optic adapters 154 are connected to four (4) MPO fiber optic adapters 156 disposed in the rear end 98 of the main body 90 of the fiber optic module 22'. Thus, if the MPO fiber optic adapters 150 support twelve (12) fibers, the fiber optic module 22" can support up to forty-eight (48) fiber optic connections. Thus, in this example, if up to twelve (12) fiber optic modules 22" are provided in the fiber optic equipment trays 20 of the chassis 12, up to five hundred seventy-six (756) fiber optic connections can be supported by the chassis 12 in a 1-U space. Further in this example, the front opening 126 of the fiber optic module 22" may support twenty-four (24) fiber optic connections in the width W1 to support a fiber optic connection density of at least one fiber optic connection per 1.7 mm of width $W_1$ of the front opening 126.

If the four (4) MPO fiber optic adapters 154 disposed in the fiber optic module 22" support twenty-four (24) fibers, the fiber optic module 22" can support up to ninety-six (96) fiber optic connections. Thus, in this example, if up to twelve (12) fiber optic modules 22" are provided in the fiber optic equipment trays 20 of the chassis 12, up to one thousand one hundred fifty-two (1152) fiber optic connections can be supported by the chassis 12 in a 1-U space. Further, in this example, the front opening 126 of the fiber optic module 22" may support up to ninety-six (96) fiber optic connections in the width W1 to support a fiber optic connection density of at least one fiber optic connection per 0.85 mm of width $W_1$ of the front opening 126.

Further, with the above-described embodiment, providing at least five hundred seventy-six (576) duplex transmission and reception pairs in a 1-U space employing at least one twenty-four (24) fiber MPO fiber optic component can support a data rate of at least five thousand seven hundred sixty (5760) Gigabits per second in half-duplex mode in a 1-U space or at least eleven thousand five hundred twenty (11520) Gigabits per second in a 1-U space in full-duplex mode if employing a ten (10) Gigabit transceiver. This configuration can also support at least four thousand eight hundred (4800) Gigabits per second in half-duplex mode in a 1-U space and at least nine thousand six hundred (9600) Gigabits per second in full-duplex mode in a 1-U space, respectively, if employing a one hundred (100) Gigabit transceiver. This configuration can also support at least three thousand eight hundred forty (3840) Gigabits per second in half-duplex mode in a 1-U space and at least seven thousand six hundred eighty (7680) Gigabits per second in full-duplex mode in a 1-U space, respectively, if employing a forty (40) Gigabit transceiver. This configuration also supports a data rate of at least eight thousand six hundred forty two (8642) Gigabits per second in full-duplex mode in a 1-U space when employing a ten (10) Gigabit transceiver employing at least one twenty-four (24) fiber MPO fiber optic component, or four thousand three hundred twenty one (4321) Gigabits per second in full-duplex mode in a 1-U space when employing a ten (10) Gigabit transceiver employing at least one twenty-four (24) fiber MPO fiber optic component.

Figure 16:
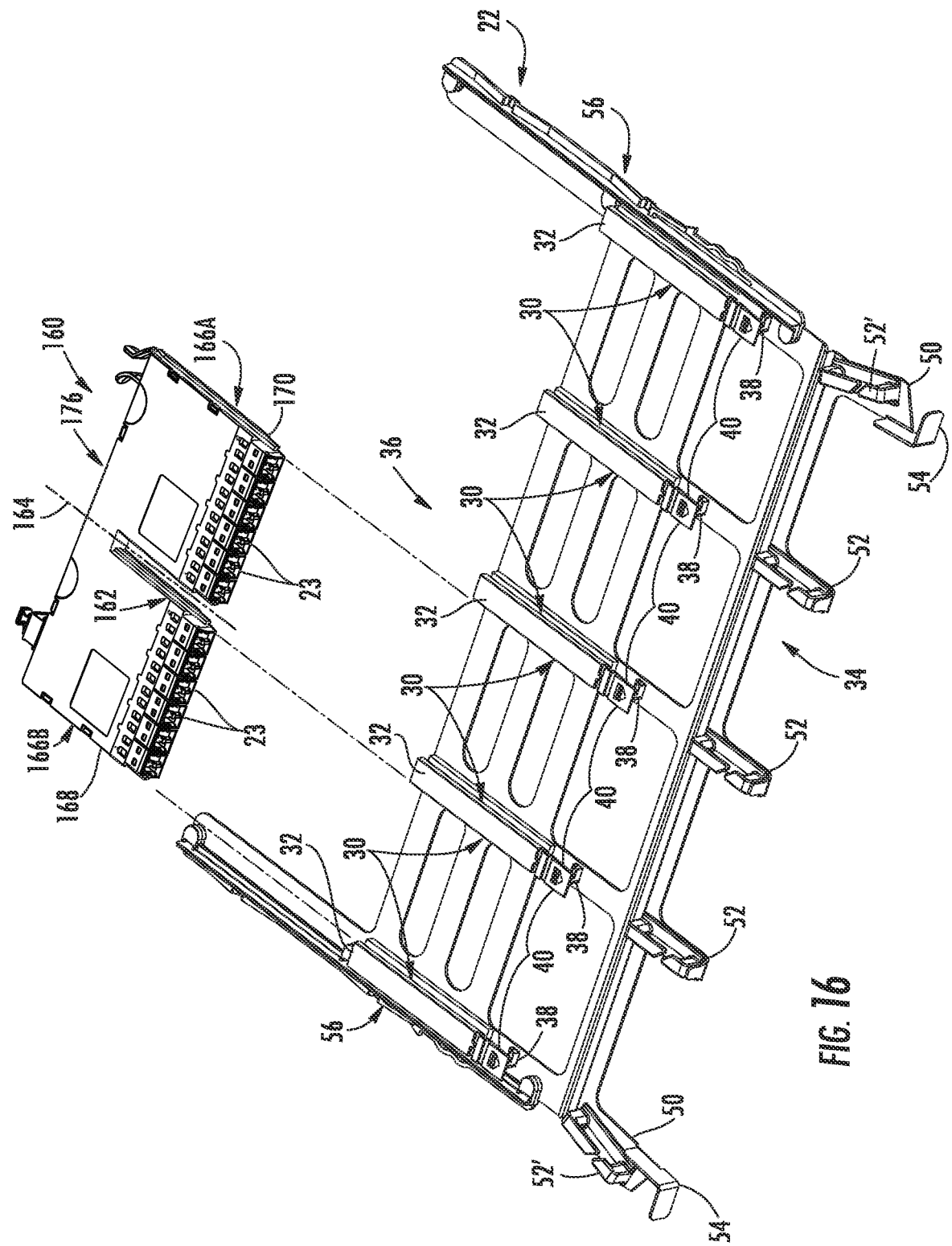
FIG. 16 is a front perspective view of an alternate fiber optic module being installed in the fiber optic equipment tray of FIG. 3.
Figure 17:
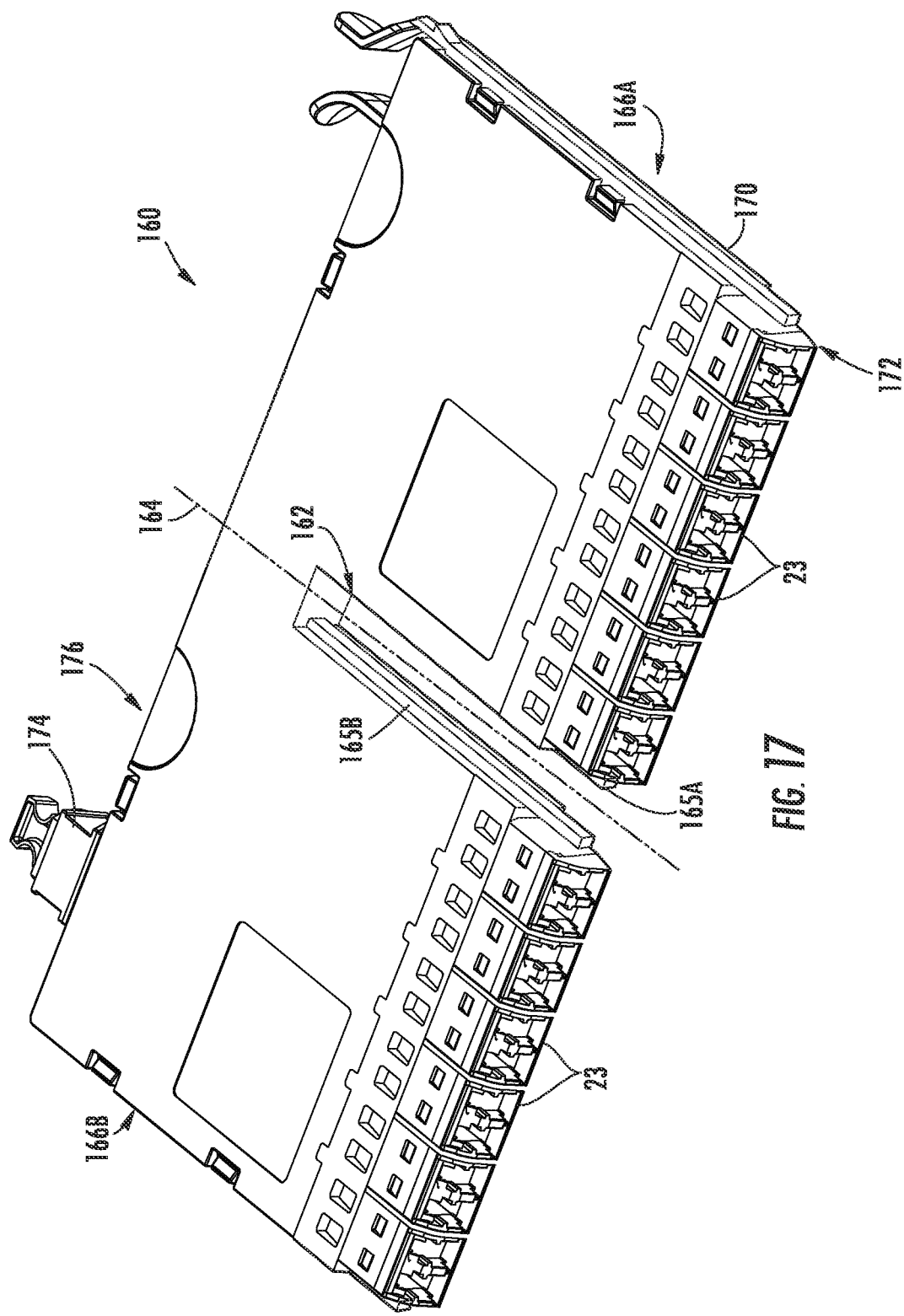
FIG. 17 is front right perspective view of the fiber optic module of FIG. 16.

FIG. 16 illustrates an alternate fiber optic module 160 that may be provided in the fiber optic equipment trays 20 to support fiber optic connections and connection densities and bandwidths. FIG. 17 is a right front perspective view of the fiber optic module 160 of FIG. 16. In this embodiment, the fiber optic module 160 is designed to fit across two sets of module rail guides 32. A channel 162 is disposed through a center axis 164 of the fiber optic module 160 to receive a module rail guide 32 in the fiber optic equipment tray 20. Module rails 165A, 165B, similar to the module rails 28A, 28B of the fiber optic module 22 of FIGS. 1-13, are disposed on the inside the channel 162 of the fiber optic module 160 and configured to engage with tray channels 30 in the fiber optic equipment tray 20. Module rails 166A, 166B, similar to the module rails 28A, 28B of the fiber optic module 22 of FIGS. 1-13, are disposed on each side 168, 170 of the fiber optic module 160 that are configured to engage with tray channels 30 in the fiber optic equipment tray 20. The module rails 166A, 166B are configured to engage with tray channels 30 in a module rail guide 32 disposed between module rail guides 32 engaged with the module rail guides 32 disposed on the sides 168, 170 of the fiber optic module 160.

Up to twenty-four (24) fiber optic components 23 can be disposed in a front side 172 of the fiber optic module 160. In this embodiment, the fiber optic components 23 are comprised of up to twelve (12) duplex LC fiber optic adapters, which are connected to one twenty-four (24) fiber MPO fiber optic connector 174 disposed in a rear end 176 of the fiber optic module 160. Thus, with three (3) fiber optic equipment trays 20 disposed in the height of the chassis 12, a total of six (6) fiber optic modules 160 can be supported in a given 1-U space. Supporting up to twenty-four (24) fiber optic connections per fiber optic module 160 equates to the chassis 12 supporting up to one hundred forty-four (144) fiber optic connections, or seventy-two (72) duplex channels, in a 1-U space in the chassis 12 (i.e., twenty-four (24) fiber optic connections X six (6) fiber optic modules 160 in a 1-U space). Thus, the chassis 12 is capable of supporting up to one hundred forty-four (144) fiber optic connections in a 1-U space by twenty-four (24) simplex or twelve (12) duplex fiber optic adapters being disposed in the fiber optic modules 160. Supporting up to twenty (20) fiber optic connections per fiber optic module 160 equates to the chassis 12 supporting one hundred twenty (120) fiber optic connections, or sixty (60) duplex channels, in a 1-U space in the chassis 12 (i.e., twenty (20) fiber optic connections X six (6) fiber optic modules 160 in a 1-U space). Thus, the chassis 12 is also capable of supporting up to one hundred twenty (120) fiber optic connections in a 1-U space by twenty (20) simplex or ten (10) duplex fiber optic adapters being disposed in the fiber optic modules 160.

Figure 18:
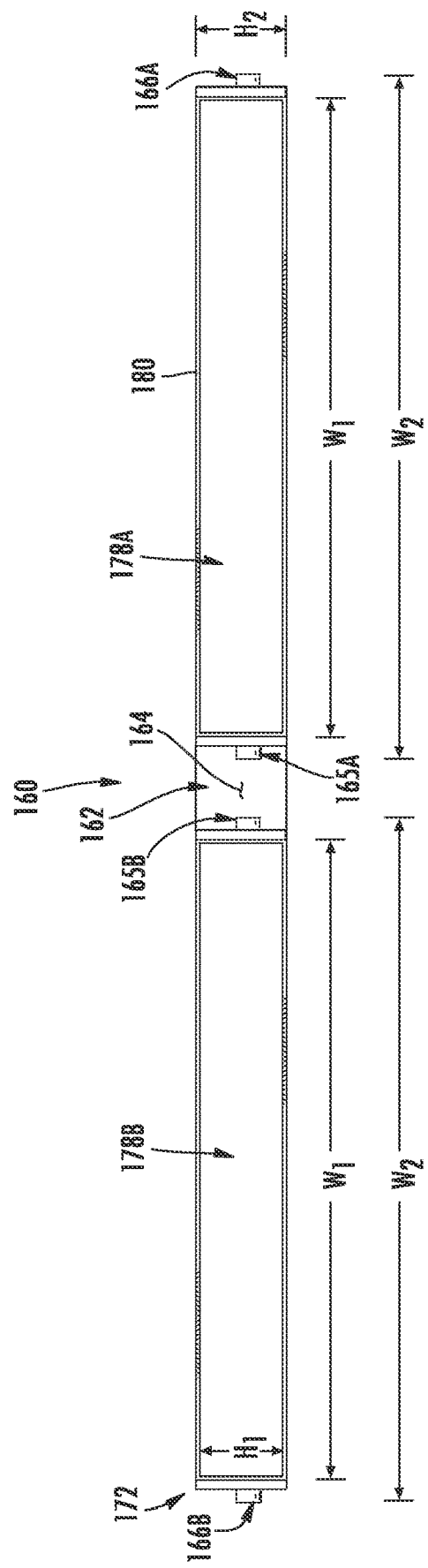
FIG. 18 is a front view of the fiber optic module of FIGS. 16 and 17.

FIG. 18 illustrates a front view of the fiber optic module 160 of FIGS. 16-17 without loaded fiber optic components 23 in the front side 172 to further illustrate the form factor of the fiber optic module 160 in this embodiment. Front openings 178A, 178B disposed on each side of the channel 162 are disposed through the front side 172 of a main body 180 of the fiber optic module 160 to receive the fiber optic components 23. The widths $W_1$ and $W_2$ and the heights $H_1$ and $H_2$ are the same as in the fiber optic module 22 illustrated in FIG. 13. Thus, in this embodiment, the widths W1 of front openings 178A, 178B are designed to be at least eighty-five percent (85%) of the width $W_2$ of the front side 172 of the main body 180 of the fiber optic module 160. The greater the percentage of the width $W_1$ to width $W_2$, the larger the area provided in the front openings 178A, 178B to receive fiber optic components 23 without increasing width W2.

The width W1 of the front openings 178A, 178B could each be designed to be greater than eighty-five percent (85%) of the width $W_2$ of the front side 172 of the main body 180 of the fiber optic module 160. For example, the width $W_1$ could be designed to be between ninety percent (90%) and ninety-nine percent (99%) of the width $W_2$. As an example, the width W1 could be less than ninety (90) mm. As another example, the width $W_1$ could be less than eighty-five (85) mm or less than eighty (80) mm. For example, width $W_1$ may be eighty-three (83) mm and width $W_2$ may be eighty-five (85) mm, for a ratio of width W1 to width W2 of 97.6%. In this example, the front openings 178A, 178B may support twelve (12) fiber optic connections in the widths W1 to support a fiber optic connection density of at least one fiber optic connection per 7.0 mm of width $W_1$ of the front openings 178A, 178B. Further, each of the front openings 178A, 178B may support twelve (12) fiber optic connections in the widths W1 to support a fiber optic connection density of at least one fiber optic connection per 6.9 mm of width $W_1$ of the front openings 178A, 178B.

Further as illustrated in FIG. 18, the height $H_1$ of front openings 178A, 178B could be designed to be at least ninety percent (90%) of the height $H_2$ of the front side 172 of the main body 180 of the fiber optic module 160. In this manner, the front openings 178A, 178B have sufficient height to receive the fiber optic components 23, while three (3) fiber optic modules 160 can be disposed in the height of a 1-U space. As an example, the height H1 could be twelve (12) mm or less or ten (10) mm or less. As an example, the height H1 could be ten (10) mm and height H2 could be eleven (11) mm, for a ratio of height $H_1$ to height $H_2$ of 90.9%.

Figure 19:
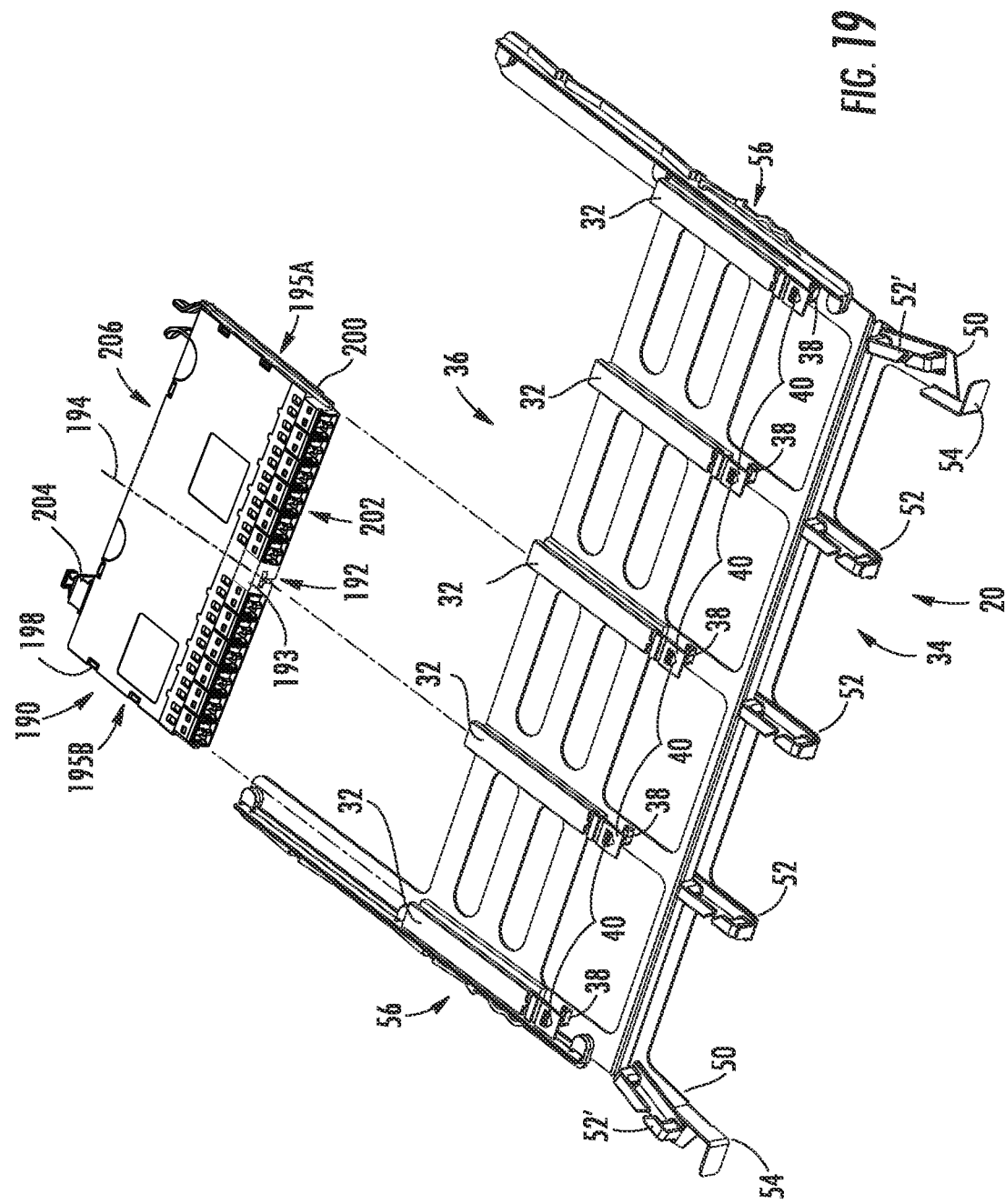
FIG. 19 is a front perspective view of another alternate fiber optic module being installed in the fiber optic equipment tray of FIG. 3.
Figure 20:
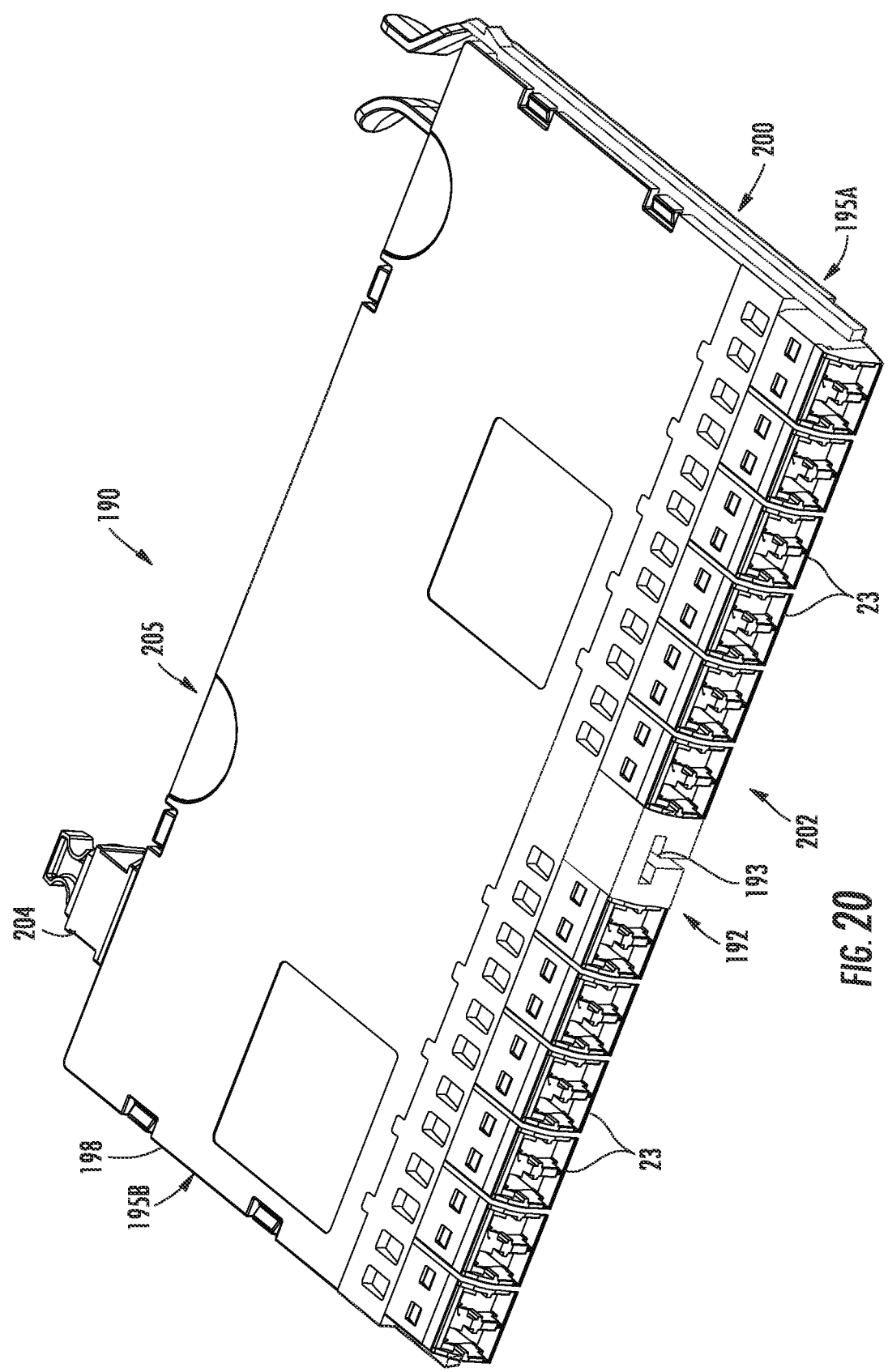
FIG. 20 is front right perspective view of the fiber optic module of FIG. 19.

FIG. 19 illustrates another alternate fiber optic module 190 that may be provided in the fiber optic equipment trays 20 to support fiber optic connections and connection densities and bandwidths. FIG. 20 is a right front perspective view of the fiber optic module 190 of FIG. 19. In this embodiment, the fiber optic module 190 is designed to fit across two sets of module rail guides 32. A longitudinal receiver 192 is disposed through a center axis 194 and is configured to receive a module rail guide 32 in the fiber optic equipment tray 20 through an opening 193 in the receiver 192. Module rails 195A, 195B, similar to the module rails 28A, 28B of the fiber optic module 22 of FIGS. 1-13, are disposed on each side 198, 200 of the fiber optic module 190 that are configured to engage with tray channels 30 in the fiber optic equipment tray 20.

Up to twenty-four (24) fiber optic components 23 can be disposed in a front side 202 of the fiber optic module 190. In this embodiment, the fiber optic components 23 are comprised of up to twelve (12) duplex LC fiber optic adapters, which are connected to one twenty-four (24) fiber MPO fiber optic connector 204 disposed in a rear end 206 of the fiber optic module 190. Thus, with three (3) fiber optic equipment trays 20 disposed in the height of the chassis 12, a total of six (6) fiber optic modules 190 can be supported in a given 1-U space. Supporting up to twenty-four (24) fiber optic connections per fiber optic module 190 equates to the chassis 12 supporting up to one hundred forty-four (144) fiber optic connections, or seventy-two (72) duplex channels, in a 1-U space in the chassis 12 (i.e., twenty-four (24) fiber optic connections X six (6) fiber optic modules 190 in a 1-U space). Thus, the chassis 12 is capable of supporting up to one hundred forty-four (144) fiber optic connections in a 1-U space by twenty (24) simplex or twelve (12) duplex fiber optic adapters being disposed in the fiber optic modules 190. Supporting up to twenty-four (20) fiber optic connections per fiber optic module 190 equates to the chassis 12 supporting one hundred twenty (120) fiber optic connections, or sixty (60) duplex channels, in a 1-U space in the chassis 12 (i.e., twenty (20) fiber optic connections X six (6) fiber optic modules 190 in a 1-U space). Thus, the chassis 12 is also capable of supporting up to one hundred twenty (120) fiber optic connections in a 1-U space by twenty (20) simplex or ten (10) duplex fiber optic adapters being disposed in the fiber optic modules 190.

Figure 21:
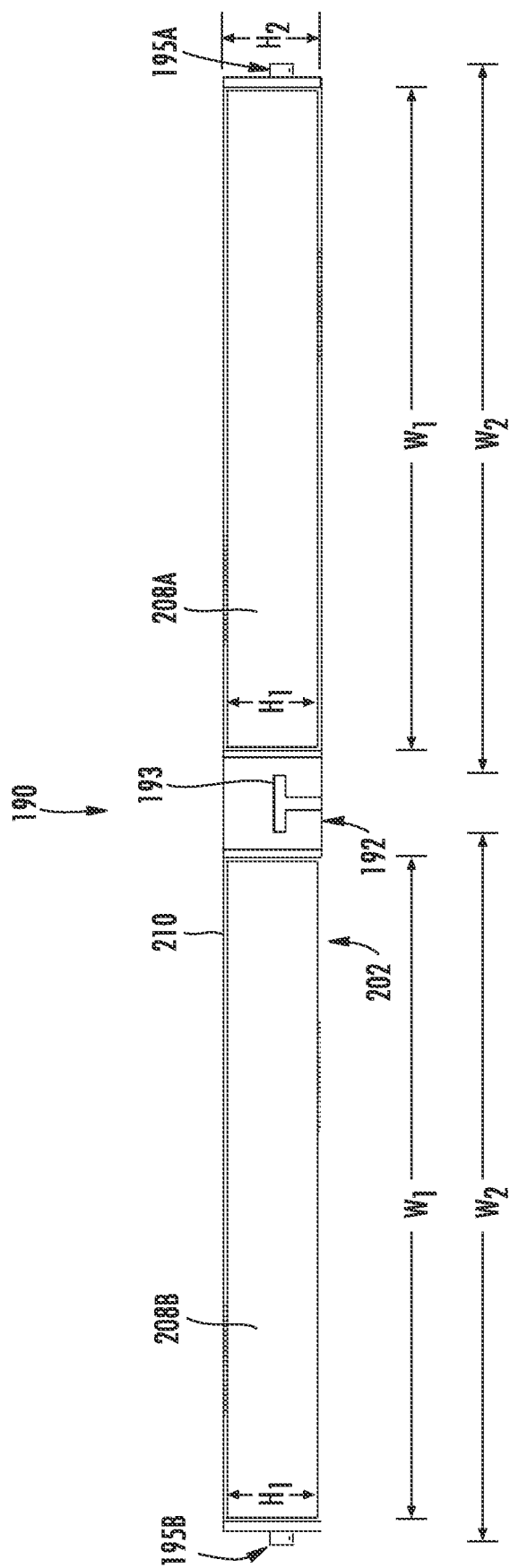
FIG. 21 is a front view of the fiber optic module of FIGS. 19 and 20.

FIG. 21 illustrates a front view of the fiber optic module 190 of FIGS. 19-20 without loaded fiber optic components 23 in the front side 202 to further illustrate the form factor of the fiber optic module 190. Front openings 208A, 208B are disposed on each side of the receiver 192 and through the front side 202 of a main body 210 of the fiber optic module 190 to receive the fiber optic components 23. The widths $W_1$ and $W_2$ and the heights H1 and H2 are the same as in the fiber optic module 22 as illustrated in FIG. 13. Thus, in this embodiment, the width W1 of front openings 208A, 208B is designed to be at least eighty-five percent (85%) of the width $W_2$ of the front side 202 of the main body 210 of the fiber optic module 190. The greater the percentage of the width $W_1$ to width $W_2$, the larger the area provided in the front openings 208A, 208B to receive fiber optic components 23 without increasing the width W2.

The width $W_1$ of front openings 208A, 208B could each be designed to be greater than eighty-five percent (85%) of the width $W_2$ of the front side 202 of the main body 210 of the fiber optic module 190. For example, the width W1 could be designed to be between ninety percent (90%) and ninety-nine percent (99%) of the width $W_2$. As an example, the width $W_1$ could be less than ninety (90) mm. As another example, the width $W_1$ could be less than eighty-five (85) mm or less than eighty (80) mm. For example, width W1 may be eighty-three (83) mm and width W2. may be eighty-five (85) mm, for a ratio of width W1 to width W2 of 97.6%. In this example, the front openings 208A, 208B may support twelve (12) fiber optic connections in the widths $W_1$ to support fiber optic connection density of at least one fiber optic connection per 7.0 mm of width W1 of the front openings 208A, 208B. Further, each of the front openings 208A, 208B may support twelve (12) fiber optic connections in the widths W1 to support a fiber optic connection density of at least one fiber optic connection per 6.9 mm of width $W_1$ of the front openings 208A, 208B.

Further as illustrated in FIG. 21, the height H1 of front openings 208A, 208B could be designed to be at least ninety percent (90%) of the height H2 of the front side 202 of the main body 210 of the fiber optic module 190. In this manner, the front openings 208A, 208B have sufficient height to receive the fiber optic components 23, while three (3) fiber optic modules 190 can be disposed in the height of a 1-U space. As an example, the height H1 could be twelve (12) mm or less or ten (10) mm or less. As an example, the height H₁ could be ten (10) mm and the height H₂ could be eleven (11) mm, for a ratio of height H₁ to height H₂ of 90.9%.

Figure 22:
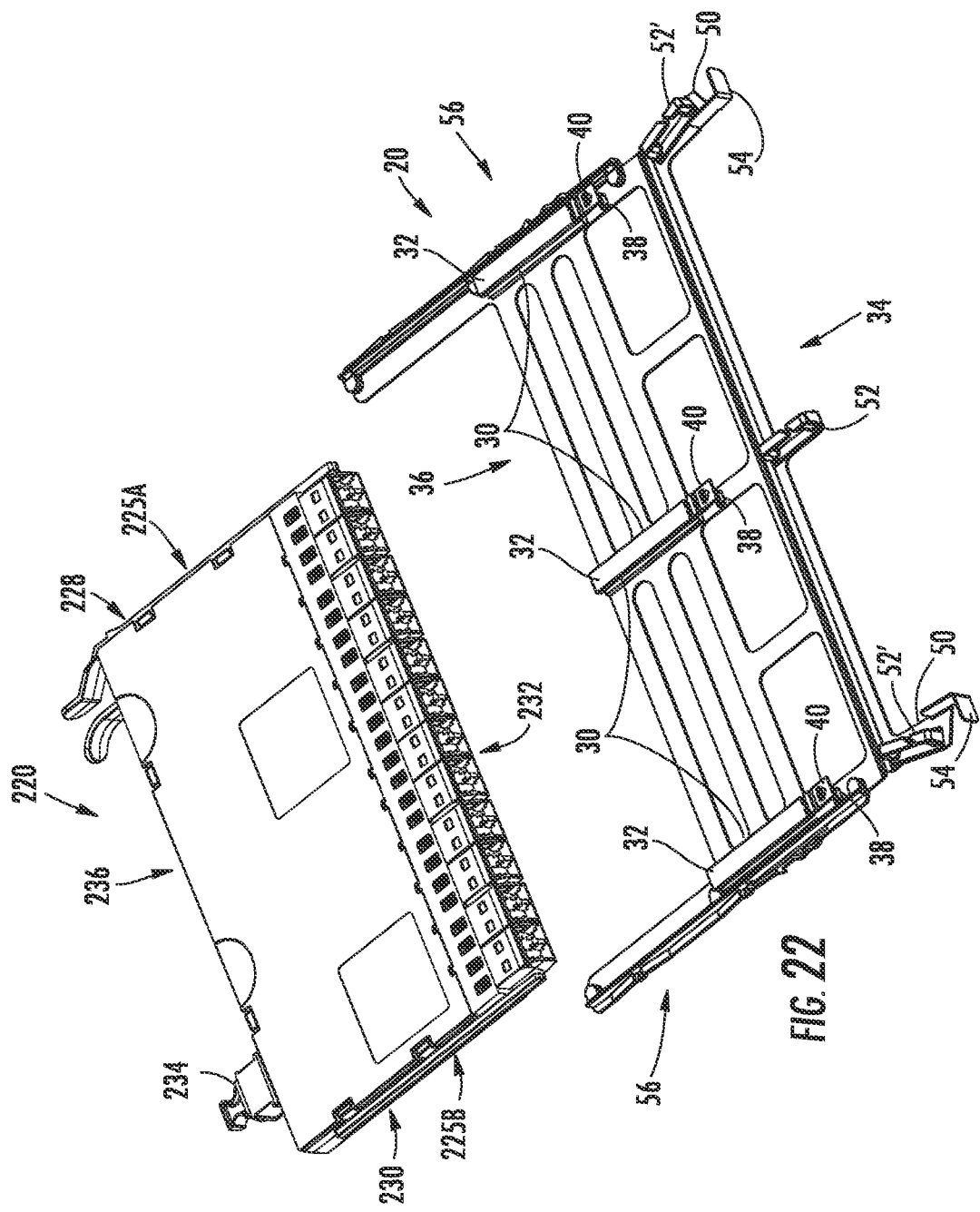
FIG. 22 is a front perspective view of another alternate fiber optic module being installed in an alternate fiber optic equipment tray that can be installed in the chassis of FIG. 1.
Figure 23:
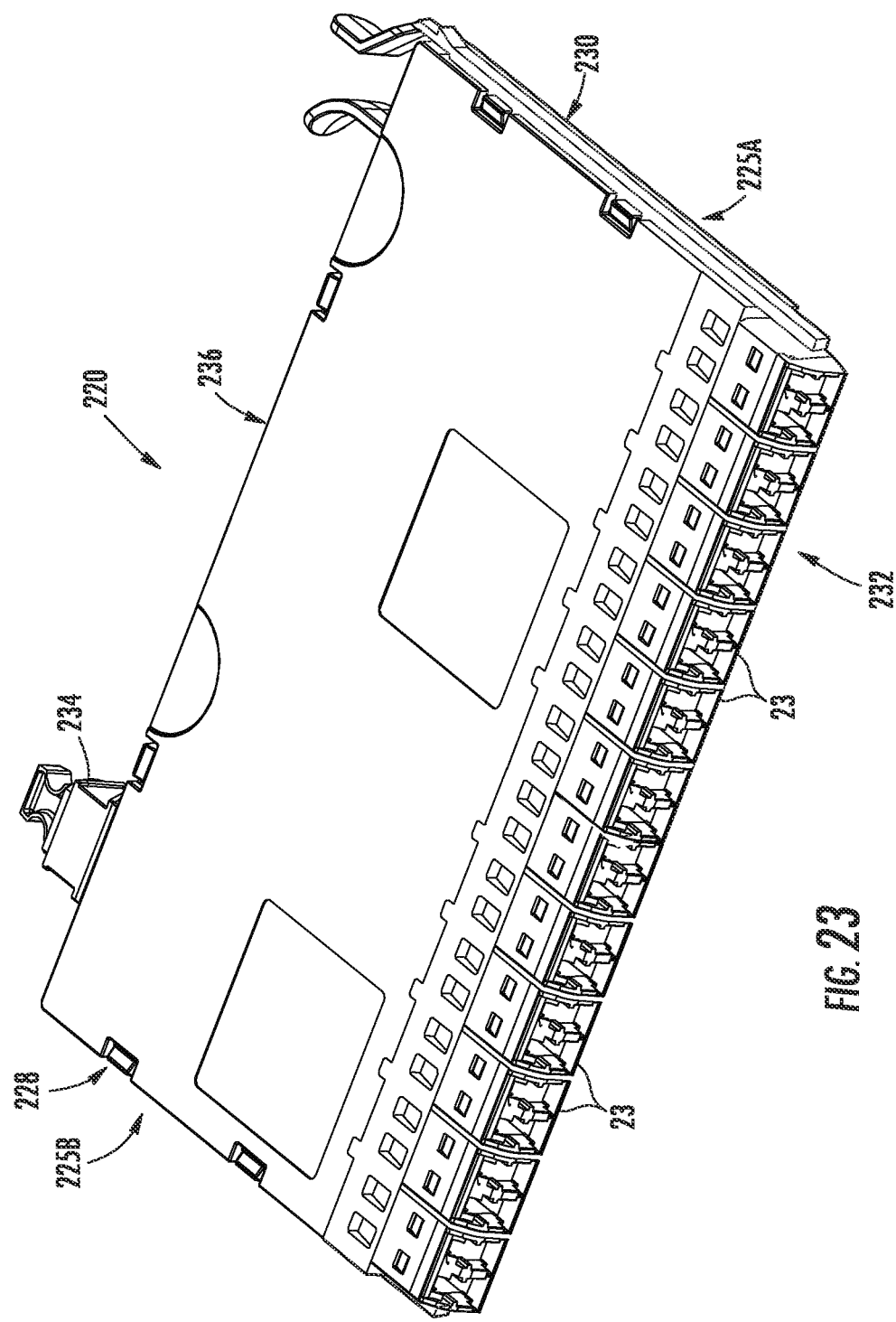
FIG. 23 is front right perspective view of the fiber optic module of FIG. 22.

FIG. 22 illustrates another alternate fiber optic module 220 that may be provided in a fiber optic equipment tray 20' to support a higher number of fiber optic connections and connection densities and bandwidths in a 1-U space. The fiber optic equipment tray 20' in this embodiment is similar to the fiber optic equipment tray 20 previously discussed above; however, the fiber optic equipment tray 20' only contains three (3) module rail guides 32 instead of five (5) module rail guides 32. Thus, the fiber optic equipment tray 20' only supports two fiber optic modules 220 across a 1-U width space. Thus, the fiber optic module 220 does not have to provide the channel 162 or receiver 192 of the fiber optic modules 160, 190, respectively, to be disposed within the fiber optic equipment tray 20'. FIG. 23 is a right front perspective view of the fiber optic module 220 of FIG. 22. The fiber optic module 220 is designed to fit across one set of module rail guides 32 in the fiber optic equipment tray 20'. Module rails 225A, 225B, similar to the module rails 28A, 28B of the fiber optic module 22 of FIGS. 1-13, are disposed on each side 228, 230 of the fiber optic module 220 that are configured to engage with tray channels 30 in the fiber optic equipment tray 20', as illustrated in FIG. 22.

Up to twenty-four (24) fiber optic components 23 can be disposed in a front side 232 of the fiber optic module 220. In this embodiment, the fiber optic components 23 are comprised of up to twelve (12) duplex LC fiber optic adapters, which are connected to one twenty-four (24) fiber MPO fiber optic connector 234 disposed in a rear end 236 of the fiber optic module 220. Thus, with three (3) fiber optic equipment trays 20' disposed in the height of the chassis 12, a total of six (6) fiber optic modules 220 can be supported in a given 1-U space. Supporting up to twenty-four (24) fiber optic connections per fiber optic module 220 equates to the chassis 12 supporting up to one hundred forty-four (144) fiber optic connections, or seventy-two (72) duplex channels, in a 1-U space in the chassis 12 (i.e., twenty-four (24) fiber optic connections X six (6) fiber optic modules 220 in a 1-U space). Thus, the chassis 12 is capable of supporting up to one hundred forty-four (144) fiber optic connections in a 1-U space by twenty (24) simplex or twelve (12) duplex fiber optic adapters being disposed in the fiber optic modules 220. Supporting up to twenty (20) fiber optic connections per fiber optic module 220 equates to the chassis 12 supporting one hundred twenty (120) fiber optic connections, or sixty (60) duplex channels, in a 1-U space in the chassis 12 (i.e., twenty (20) fiber optic connections X six (6) fiber optic modules 220 in a 1-U space). Thus, the chassis 12 is also capable of supporting up to one hundred twenty (120) fiber optic connections in a 1-U space by twenty (20) simplex or ten (10) duplex fiber optic adapters being disposed in the fiber optic modules 220.

Figure 24:
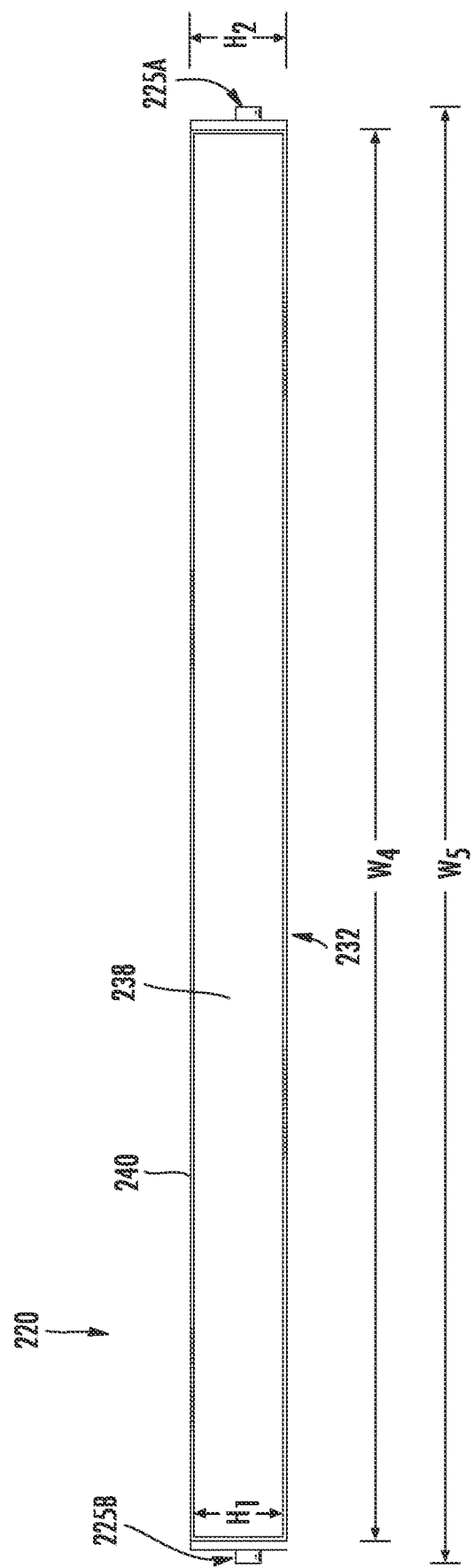
FIG. 24 is a front view of the fiber optic module of FIGS. 22 and 23.

FIG. 24 illustrates a front view of the fiber optic module 220 of FIGS. 22-23 without loaded fiber optic components 23 in the front side 232 to further illustrate the form factor of the fiber optic module 220 in this embodiment. A front opening 238 is through the front side 232 of a main body 240 of the fiber optic module 220 to receive the fiber optic components 23. Width W₄ of the front opening 238 is twice the width W₁ of the front opening 98 in the fiber optic module 22 illustrated in FIG. 13. Width W₅ of the front side 232 is one hundred eighty-eight (188) mm. the width W2 of the front side 96 in the fiber optic module 22 illustrated in FIG. 13. The heights H1 and H2 are the same as in the fiber optic module 22 illustrated in FIG. 13. Thus, in this embodiment, the width W₄ of the front opening 238 is designed to be at least eighty-five percent (85%) of the width Ws of the front side 232 of the main body 240 of the fiber optic module 220. The greater the percentage of the width W₄ to the width W₅, the larger the area provided in the front opening 238 to receive fiber optic components 23 without increasing the width W4.

Width W4 of the front opening 238 could be designed to be greater than eighty-five percent (85%) of the width W₅ of the front side 232 of the main body 240 of the fiber optic module 220. For example, the width W₄ could be designed to be between ninety percent (90%) and ninety-nine percent (99%) of the width of W₅. As an example, the width W4 could be less than one hundred eighty (180) mm. As another example, the width W4 could be less than one hundred seventy (170) mm or less than one hundred sixty (160) mm. For example, width W₄ may be one hundred sixty-six (166) mm and width W₅ may be 171 mm, for a ratio of width W₄ to width W₅ of 166/171=97%. In this example, the front opening 238 may support twenty-four (24) fiber optic connections in the width W4 to support a fiber optic connection density of at least one fiber optic connection per 7.0 mm of width W₄ of the front opening 238. Further, the front opening 238 may support twenty-four (24) fiber optic connections in the width W₄ to support a fiber optic connection density of at least one fiber optic connection per 6.9 mm of width W₄ of the front opening 238.

Further, as illustrated in FIG. 24, the height H1 of the front opening 238 could be designed to be at least ninety percent (90%) of the height H₂ of the front side 232 of the main body 240 of the fiber optic module 220. In this manner, the front opening 238 has sufficient height to receive the fiber optic components 23, while three (3) fiber optic modules 220 can be disposed in the height of a 1-U space. As an example, the height H1 could be twelve (12) mm or less or ten (10) mm or less. As an example, the height H1 could be ten (10) mm and height H₂ could be eleven (11) mm, for a ratio of height H₁ to height H₂ of 90.9%.

Figure 25:
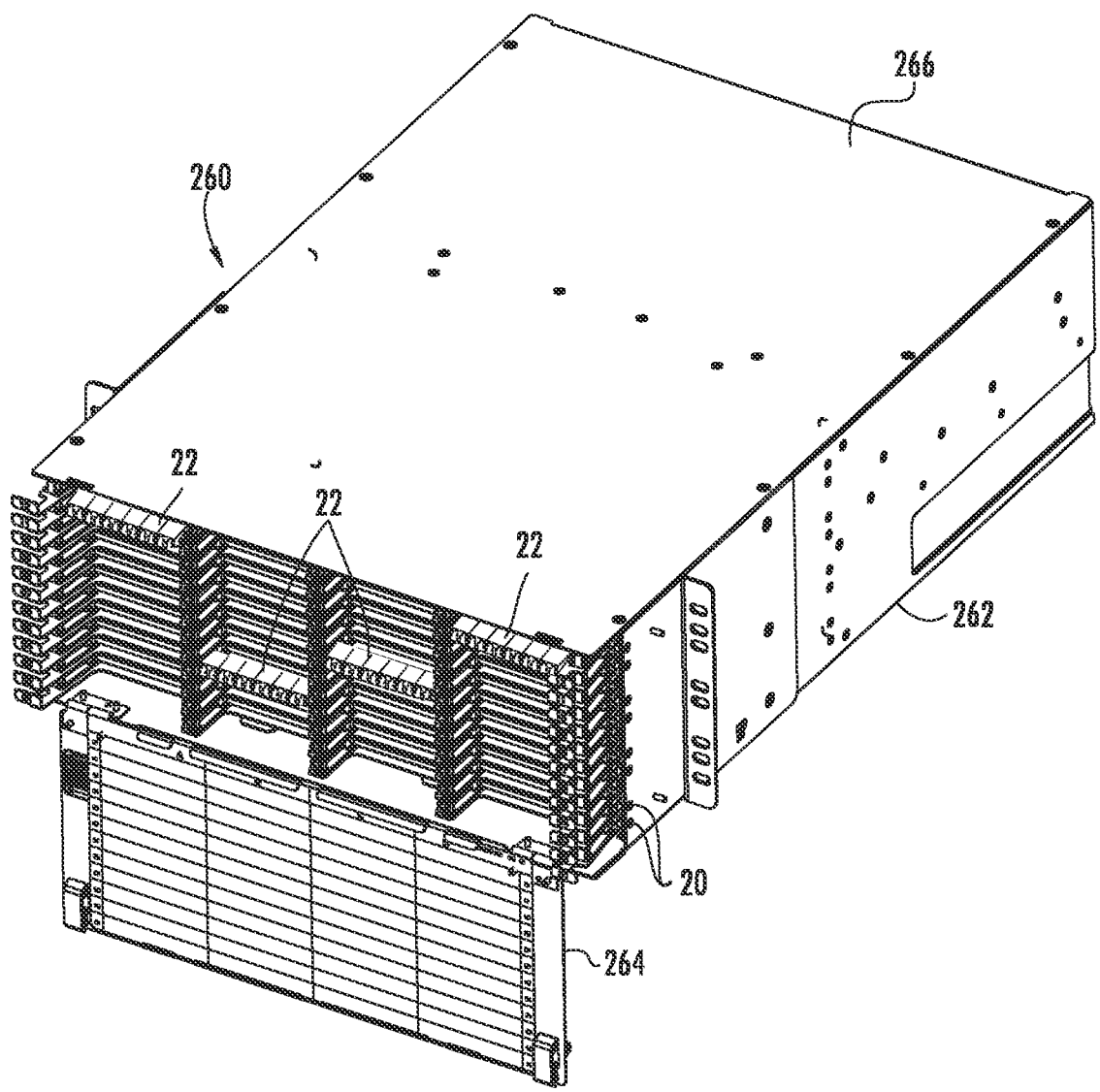
FIG. 25 is a front perspective view of alternate exemplary 4-U size fiber optic chassis that can support the fiber optic equipment trays and fiber optic modules according to the fiber optic equipment tray and fiber optic modules disclosed.

FIG. 25 illustrates another embodiment of fiber optic equipment 260 that can include fiber optic equipment trays previously described above and illustrated to support fiber optic modules. The fiber optic equipment 260 in this embodiment includes a 4-U sized chassis 262 configured to hold fiber optic equipment trays each supporting one or more fiber optic modules. The supported fiber optic equipment trays may be any of the fiber optic equipment trays 20, 20' previously described above and thus will not be described again here. The supported fiber optic modules may be any of the fiber optic modules 22, 22', 22", 160, 190, 220 previously described above and thus will not be described again here. In this example, the chassis 262 is illustrated as supporting twelve (12) fiber optic equipment trays 20 each capable of supporting fiber optic modules 22.

The tray guides 58 previously described are used in the chassis 262 to support tray rails 56 of the fiber optic equipment trays 20 therein and to allow each fiber optic equipment tray 20 to be independently extended out from and retracted back into the chassis 262. A front door 264 is attached to the chassis 262 and is configured to close about the chassis 262 to secure the fiber optic equipment trays 20 contained in the chassis 262. A cover 266 is also attached to the chassis 262 to secure the fiber optic equipment trays 20. However, in the chassis 262, up to twelve (12) fiber optic equipment trays 20 can be provided. However, the fiber optic connection densities and connection bandwidths are still the same per 1-U space. The fiber optic connection densities and connection bandwidth capabilities have been previously described and equally applicable for the chassis 262 of FIG. 25, and thus will not be described again here.

Thus, in summary, the table below summarizes some of the fiber optic connection densities and bandwidths that are possible to be provided in a 1-U and 4-U space employing the various embodiments of fiber optic modules, fiber optic equipment trays, and chassis described above. For example, two (2) optical fibers duplexed for one (1) transmission/ reception pair can allow for a data rate of ten (10) Gigabits per second in half-duplex mode or twenty (20) Gigabits per second in full-duplex mode. As another example, eight (8) optical fibers in a twelve (12) fiber MPO fiber optic connector duplexed for four (4) transmission/reception pairs can allow for a data rate of forty (40) Gigabits per second in half-duplex mode or eighty (80) Gigabits per second in full-duplex mode. As another example, twenty optical fibers in a twenty-four (24) fiber MPO fiber optic connector duplexed for ten (10) transmission/reception pairs can allow for a data rate of one hundred (100) Gigabits per second in half-duplex mode or two hundred (200) Gigabits per second in full-duplex mode. Note that this table is exemplary and the embodiments disclosed herein are not limited to the fiber optic connection densities and bandwidths provided below.

| Connector Type | Max Fibers Per 1RU | Max Fibers per 4RU | Number of Connectors per 1 RU Space | Number of Connectors per 4 RU Space | Bandwidth per 1U using 10 Gigabit Transceivers (duplex) | Bandwidth per 1U using 40 Gigabit Transceivers (duplex) | Bandwidth per 1U using 100 Gigabit Transceivers (duplex) |
| --- | --- | --- | --- | --- | --- | --- | --- |
| Duplexed LC | 144 | 576 | 72 | 288 | 1,440 Gigabits/s. | 960 Gigabits/s. | 1,200 Gigabits/s. |
| 12-F MPO | 576 | 2,304 | 48 | 192 | 5,760 Gigabits/s. | 3,840 Gigabits/s. | 4,800 Gigabits/s. |
| 24-F MPO | 1,152 | 4,608 | 48 | 192 | 11,520 Gigabits/s. | 7,680 Gigabits/s. | 9,600 Gigabits/s. |

Many modifications and other embodiments of the invention set forth herein will come to mind to one skilled in the art to which the invention pertains having the benefit of the teachings presented in the foregoing descriptions and the associated drawings. These modifications include, but are not limited to, number or type of fiber optic equipment, fiber optic module, fiber optic equipment tray, features included in the fiber optic equipment tray. Any size equipment, including but not limited to 1-U, 2-U and 4-U sizes may include some or all of the aforementioned features and fiber optic modules disclosed herein and some or all of their features. Further, the modifications are not limited to the type of fiber optic equipment tray or the means or device to support fiber optic modules installed in the fiber optic equipment trays. The fiber optic modules can include any fiber optic connection type, including but not limited to fiber optic connectors and adapters, and number of fiber optic connections, density, etc.

Further, as used herein, the terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive optical fiber is ClearCurve® Multi-mode fiber commercially available from Corning Incorporated.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A fiber optic apparatus, comprising:
   a chassis;
   a fiber optic connection equipment provided in the chassis; and
   a fiber optic equipment drawer disposed in the fiber optic connection equipment;
   wherein the fiber optic connection equipment is configured to support, within the fiber optic equipment drawer, a fiber optic connection density of at least four hundred thirty-four (434) fiber optic connections per U space, based on using at least one multiple fiber component, wherein the at least one multiple fiber component comprises a twelve (12) fiber MPO fiber optic component or a twenty-four (24) fiber MPO fiber optic component.

2. The fiber optic apparatus of claim 1, wherein the fiber optic connection equipment is configured to support a fiber optic connection density of at least five hundred seventy-six (576) fiber optic connections per U space.

3. The fiber optic apparatus of claim 1, wherein the at least one multiple fiber component comprises at least one multiple fiber connector or at least one multiple fiber adapter.

4. The fiber optic apparatus of claim 1, wherein the at least one multiple fiber component comprises a twelve (12) fiber MPO fiber optic component.

5. The fiber optic apparatus of claim 1, wherein the at least one multiple fiber component is disposed in at least one fiber optic module received by the fiber optic equipment drawer; and
   wherein the at least one fiber optic module comprises a front side configured to support a plurality of first fiber optic components, a rear side configured to support at least one second fiber optic component, an internal chamber, and a plurality of optical fibers disposed within the internal chamber and arranged to establish optical connections between the at least one second fiber optic component and the plurality of first fiber optic components, with the at least one second fiber optic component comprising the at least one multiple fiber component.

6. A fiber optic apparatus, comprising:
   a chassis; and
   a fiber optic connection equipment provided in the chassis; and a fiber optic equipment drawer disposed in the fiber optic connection equipment;

wherein the fiber optic connection equipment comprises a plurality of fiber optic modules that are independently translatable relative to the fiber optic equipment drawer, with each fiber optic module of the plurality of fiber optic modules comprising a front side configured to support a plurality of first fiber optic components, a rear side configured to support at least one second fiber optic component, an internal chamber, and a plurality of optical fibers disposed within the internal chamber and arranged to establish optical connections between the at least one second fiber optic component and the plurality of first fiber optic components; and wherein the fiber optic connection equipment is configured to support a fiber optic connection density of at least eight hundred sixty-six (866) fiber optic connections per U space.

7. The fiber optic apparatus of claim 6, wherein the fiber optic connection density is based on using at least one multiple fiber component as the at least one second fiber optic component or a fiber optic component of the plurality of first fiber optic components.

8. The fiber optic apparatus of claim 7, wherein the at least one multiple fiber component comprises a twenty-four (24) fiber MPO fiber optic component.

9. The fiber optic apparatus of claim 8, wherein the twenty-four (24) fiber MPO fiber optic component comprises at least thirty-six (36) twenty-four (24) fiber MPO fiber optic components.

10. The fiber optic apparatus of claim 8, wherein the twenty-four (24) fiber MPO fiber optic component comprises at least forty-eight (48) twenty-four (24) fiber MPO fiber optic components.

11. The fiber optic apparatus of claim 7, wherein the at least one multiple fiber component comprises at least one multiple fiber connector or at least one multiple fiber adapter.

12. The fiber optic apparatus of claim 6, wherein the fiber optic connection equipment is configured to support a fiber optic connection density of at least one thousand one hundred fifty-two (1152) fiber optic connections per U space.

13. The fiber optic apparatus of claim 1, wherein the fiber optic connection equipment comprises a plurality of fiber optic modules that are independently translatable relative to the fiber optic equipment drawer, with each fiber optic module of the plurality of fiber optic modules comprising a front side configured to support a plurality of first fiber optic components, a rear side configured to support at least one second fiber optic component, an internal chamber, and a plurality of optical fibers disposed within the internal chamber and arranged to establish optical connections between the at least one second fiber optic component and the plurality of first fiber optic components.

14. The fiber optic apparatus of claim 13, wherein each fiber optic module of the plurality of fiber optic modules is installable on the fiber optic equipment drawer from both a front end and a rear end of the fiber optic equipment drawer.

15. The fiber optic apparatus of claim 1, wherein the at least one multiple fiber component comprises a twenty-four (24) fiber MPO fiber optic component.

16. A fiber optic apparatus, comprising:
a chassis;
a fiber optic connection equipment provided in the chassis; and
a plurality of fiber optic equipment drawers disposed in the fiber optic connection equipment;

the fiber optic connection equipment configured to support, within the plurality of fiber optic equipment drawers, a fiber optic connection density of at least four hundred thirty-four (434) fiber optic connections per U space, based on using at least one multiple fiber component;

wherein the at least one multiple fiber component comprises a twelve (12) fiber MPO fiber optic component or a twenty-four (24) fiber MPO fiber optic component.

17. The fiber optic apparatus of claim 16, wherein the at least one multiple fiber component comprises at least one multiple fiber connector or at least one multiple fiber adapter.

18. The fiber optic apparatus of claim 16, wherein the at least one multiple fiber component comprises a twelve (12) fiber MPO fiber optic component.

19. The fiber optic apparatus of claim 16, wherein the at least one multiple fiber component comprises a twenty-four (24) fiber MPO fiber optic component.

20. The fiber optic apparatus of claim 16, wherein the at least one multiple fiber component is disposed in at least one fiber optic module.

21. The fiber optic apparatus of claim 16, wherein:
the fiber optic connection equipment comprises a plurality of fiber optic modules that are independently translatable relative to the plurality of fiber optic equipment drawers;
each fiber optic module of the plurality of fiber optic modules comprises a front side configured to support a plurality of first fiber optic components, a rear side configured to support at least one second fiber optic component, an internal chamber, and a plurality of optical fibers disposed within the internal chamber and arranged to establish optical connections between the at least one second fiber optic component and the plurality of first fiber optic components; and
each fiber optic equipment drawer of the plurality of fiber optic equipment drawers is configured to receive multiple fiber optic modules of the plurality of fiber optic modules.

22. The fiber optic apparatus of claim 21, wherein each fiber optic equipment drawer of the plurality of fiber optic equipment drawers is configured to receive fiber optic modules of the plurality of fiber optic modules from both a front end and a rear end of the fiber optic equipment drawer for installation of the fiber optic modules in the fiber optic equipment drawer.

23. The fiber optic apparatus of claim 1, wherein the fiber optic connection equipment is configured to support a fiber optic connection density in a range of four hundred thirty-four (434) to one thousand, one hundred fifty-two (1152) fiber optic connections per U space.

24. The fiber optic apparatus of claim 5, wherein the fiber optic connection equipment is configured to support a fiber optic connection density in a range of four hundred thirty-four (434) to one thousand, one hundred fifty-two (1152) fiber optic connections per U space.

25. The fiber optic apparatus of claim 6, wherein the fiber optic connection equipment is configured to support a fiber optic connection density in a range of eight hundred sixty-six (866) to one thousand, one hundred fifty-two (1152) fiber optic connections per U space.

26. The fiber optic apparatus of claim 16, wherein the fiber optic connection equipment is configured to support a fiber optic connection density in a range of four hundred thirty-four (434) to one thousand, one hundred fifty-two (1152) fiber optic connections per U space.

27. The fiber optic apparatus of claim 21, wherein the fiber optic connection equipment is configured to support a fiber optic connection density in a range of four hundred thirty-four (434) to one thousand, one hundred fifty-two (1152) fiber optic connections per U space.

\* \* \* \* \*